(12) United States Patent
Kennedy et al.

(10) Patent No.: US 6,697,408 B2
(45) Date of Patent: Feb. 24, 2004

(54) Q-SWITCHED CAVITY DUMPED CO2 LASER FOR MATERIAL PROCESSING

(75) Inventors: John T. Kennedy, Granby, CT (US); Richard A. Hart, North Granby, CT (US); Lanny Laughman, Bolton, CT (US); Joel Fontanella, Tolland, CT (US); Anthony J. Demaria, West Hartford, CT (US); Leon A. Newman, Glastonbury, CT (US); Robert Henschke, East Hampton, CT (US)

(73) Assignee: Coherent, Inc., Santa Clara, CA (US)

( * ) Notice: Subject to any disclaimer, the term of this patent is extended or adjusted under 35 U.S.C. 154(b) by 113 days.

(21) Appl. No.: 10/116,360

(22) Filed: Apr. 4, 2002

(65) Prior Publication Data

US 2002/0167974 A1 Nov. 14, 2002

Related U.S. Application Data

(60) Provisional application No. 60/281,431, filed on Apr. 4, 2001.

(51) Int. Cl.[7] ................................................. H01S 3/22
(52) U.S. Cl. ....................... 372/55; 372/10; 372/27; 372/32.1; 372/8; 372/98; 372/29.012
(58) Field of Search ............................... 372/55, 10, 27, 372/98, 38.18, 29.012

(56) References Cited

U.S. PATENT DOCUMENTS

| 3,577,097 A | * | 5/1971 | Hilberg ........................ 372/12 |
| 3,581,230 A | * | 5/1971 | Smith ........................... 372/11 |
| 3,673,504 A | * | 6/1972 | Hilberg ..................... 372/38.03 |
| 3,711,791 A | * | 1/1973 | Erickson ....................... 372/10 |
| 3,772,611 A | | 11/1973 | Smith ......................... 331/94.5 |
| 3,790,278 A | * | 2/1974 | Buczek et al. ................. 356/28 |
| 3,820,038 A | | 6/1974 | Tomlinson ................... 331/94.5 |
| 3,824,717 A | * | 7/1974 | Evtuhov et al. ............. 359/330 |
| 4,030,839 A | | 6/1977 | Rickert ........................ 356/251 |
| 4,169,251 A | | 9/1979 | Laakmann .................. 331/94.5 |
| 4,174,504 A | | 11/1979 | Chenausky et al. ........ 331/94.5 |
| 4,176,327 A | | 11/1979 | Wayne et al. ............... 331/94.5 |
| 4,363,126 A | | 12/1982 | Chenausky et al. ........... 372/38 |
| 4,498,179 A | | 2/1985 | Wayne et al. .................. 372/27 |
| 4,499,582 A | | 2/1985 | Karning et al. ................ 372/93 |

(List continued on next page.)

FOREIGN PATENT DOCUMENTS

WO WO 98/40939 9/1998

OTHER PUBLICATIONS

"Lasers", Anthony E. Siegman, University Science books, pp. 712–727 (1788).

(List continued on next page.)

*Primary Examiner*—Leon Scott, Jr.
(74) *Attorney, Agent, or Firm*—Stallman & Pollock LLP

(57) ABSTRACT

This disclosure discusses techniques for obtaining wavelength selected simultaneously super pulsed Q-switched and cavity dumped laser pulses utilizing high optical damage threshold electro-optic modulators, maintaining a zero DC voltage bias on the CdTe electro-optic modulator (EOM) so as to minimize polarization variations depending on the location of the laser beam propagating through the CdSe EOM crystal, as well as the addition of one or more laser amplifiers in a compact package and the use of simultaneous gain switched, Q-switched and cavity dumped operation of $CO_2$ lasers for generating shorter pulses and higher peak power for the hole drilling, engraving and perforation applications.

45 Claims, 47 Drawing Sheets

U.S. PATENT DOCUMENTS

| | | | | |
|---|---|---|---|---|
| 4,660,204 | A | * | 4/1987 | Dewhirst et al. ............. 372/16 |
| 4,675,872 | A | * | 6/1987 | Popek et al. ................... 372/10 |
| 4,719,639 | A | | 1/1988 | Tulip ............................ 372/66 |
| 4,787,090 | A | | 11/1988 | Newman et al. ............. 372/82 |
| 4,815,094 | A | | 3/1989 | Cantoni ....................... 372/93 |
| 4,891,819 | A | | 1/1990 | Sutter, Jr. et al. ............ 372/82 |
| 5,177,748 | A | | 1/1993 | Zhang ......................... 372/18 |
| 5,220,576 | A | | 6/1993 | Krueger et al. .............. 372/87 |
| 5,299,223 | A | | 3/1994 | van der Wal ................. 372/94 |
| 5,353,297 | A | | 10/1994 | Koop et al. .................... 372/64 |
| 5,365,532 | A | | 11/1994 | Klaras et al. ................. 372/31 |
| 5,491,579 | A | | 2/1996 | Justus et al. ................ 359/241 |
| 5,600,668 | A | | 2/1997 | Erichsen et al. .............. 372/87 |
| 5,610,936 | A | | 3/1997 | Cantoni ....................... 372/93 |
| 5,654,782 | A | | 8/1997 | Morokawa et al. ......... 349/143 |
| 5,748,663 | A | | 5/1998 | Chenausky .................. 372/64 |
| 5,881,087 | A | | 3/1999 | Sukhman et al. ............. 372/61 |
| 6,061,377 | A | | 5/2000 | Brassart et al. ............... 372/66 |
| 6,459,314 | B2 | * | 10/2002 | Kim ........................... 327/161 |
| 2002/0167974 | A1 | * | 11/2002 | Kennedy et al. .............. 372/10 |
| 2003/0156615 | A1 | * | 8/2003 | Kennedy et al. .............. 372/55 |

OTHER PUBLICATIONS

"Reflection Polarizers for the vacuum ultraviolet using Al+MgF2 mirrors and an MgF2 plate", Hass, et al., Applied Optics, vol. 17, Jan. 1, 1978.

"Polarization Studies in the vacuum Ultraviolet", Hamm, et al. Journal of the Optical Society of America, vol. 55, No. 11, pp 1460–1463 (1965).

"Reflective device for polarization rotation", Greninger, Applied Optics vol. 27, No. 4 pp 774–776 (1988).

International Search Report for International Application No. PCT/US 02/10766, filed on Apr. 4, 2002.

"Radiofrequency–Discharge–Excited CO2 Lasers", Hall, et al. pp. 165–258.

"Review CW High Power CO2 Lasers", Anthony J. DeMaria, Proceeding of the IEEE, vol. 61, pp. 731–745 (1973).

"Power Scaling of Laser Area Transverse RF Discharge CO2 Lasers", Abramski, et al., Applied Physics Letter, vol. 54, pp. 1833–1835 (1989).

BeO Capillary CO2 Waveguide Laser, Bukhardt, et al., Optics Communications, vol. 6, pp. 193–195 (Oct. 1972).

"Hollow Metallic and Dielectric Wave–guides for Long Distance Optical Transmission and Lasers", Marcatilli, et al., Bell System Technical Journal, vol. 43, pp. 1783–1809 (1964).

* cited by examiner

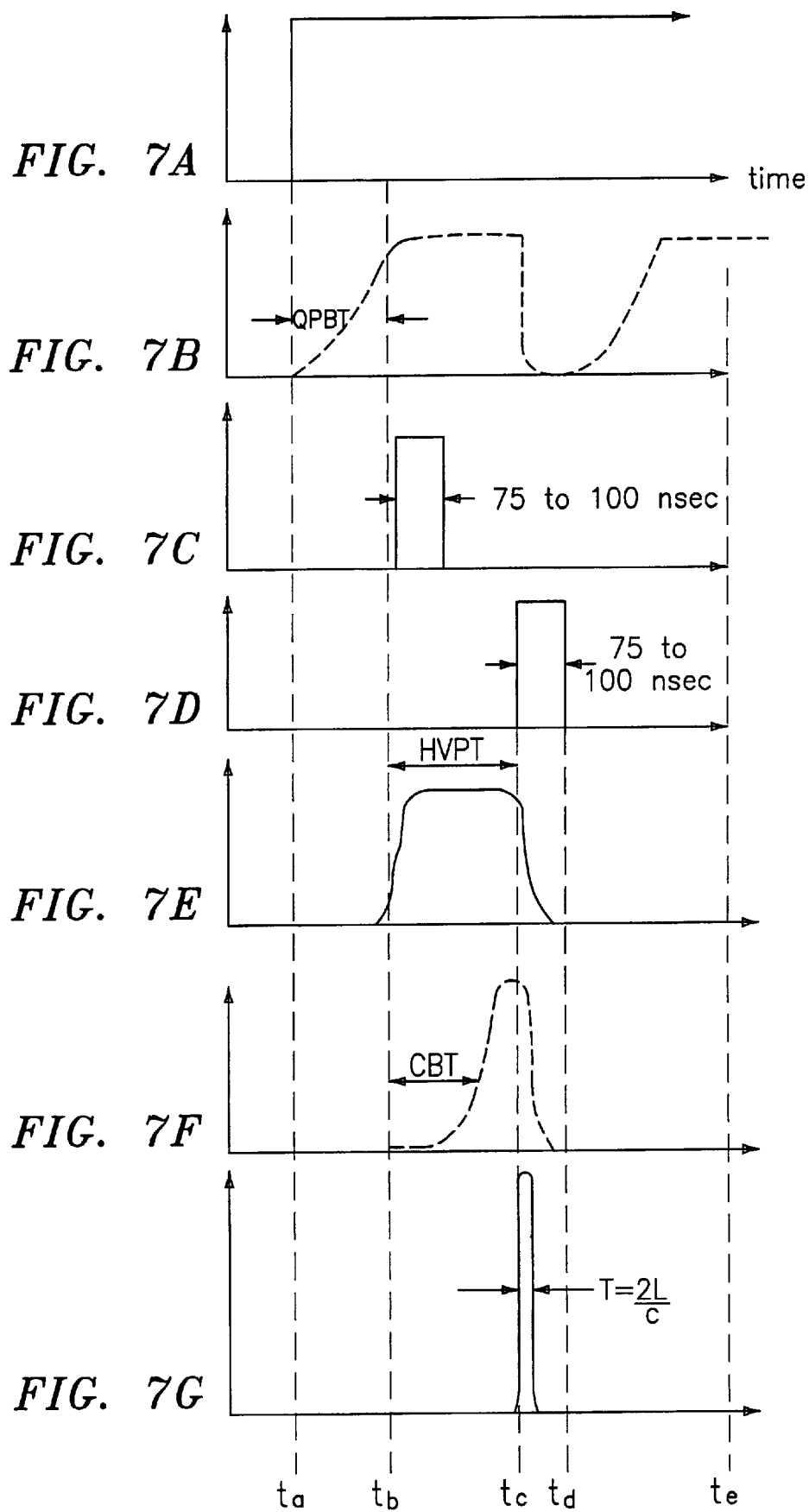

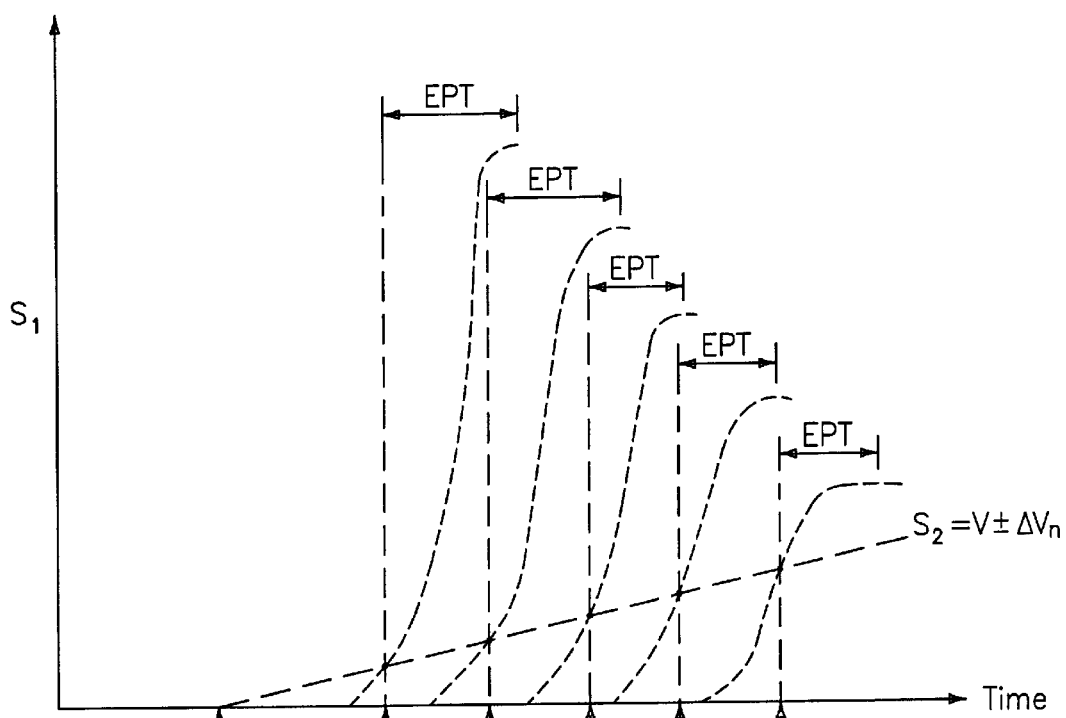
FIG. 10A
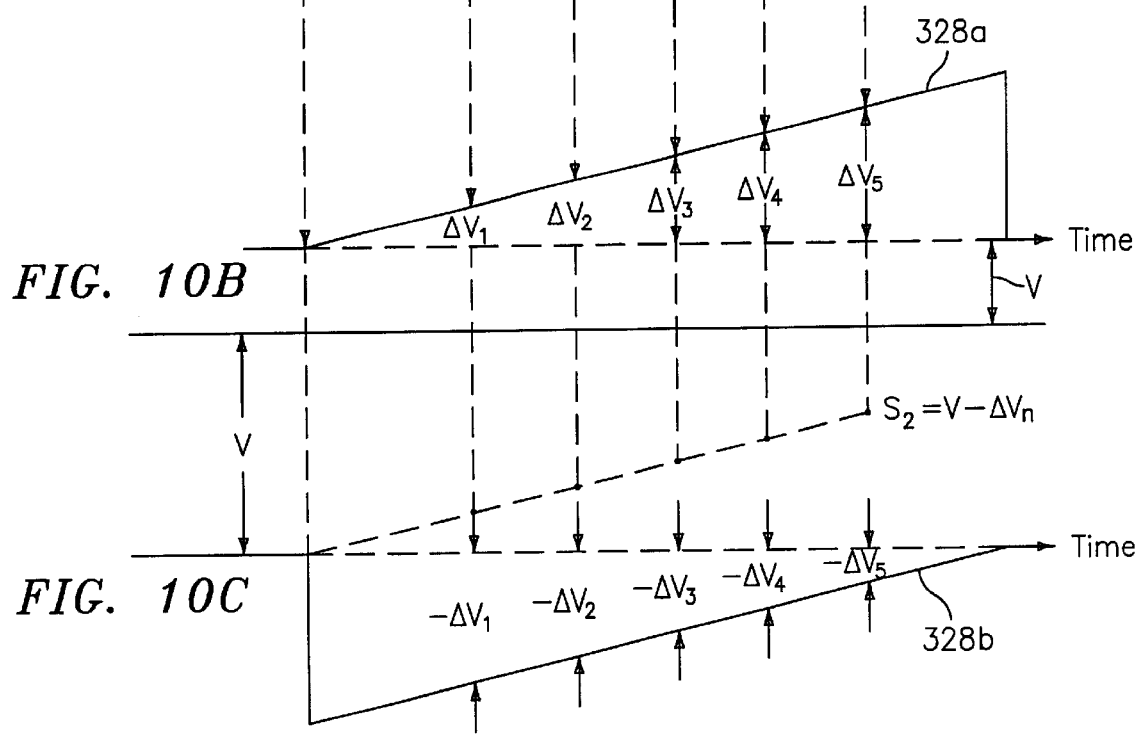
FIG. 10B
FIG. 10C

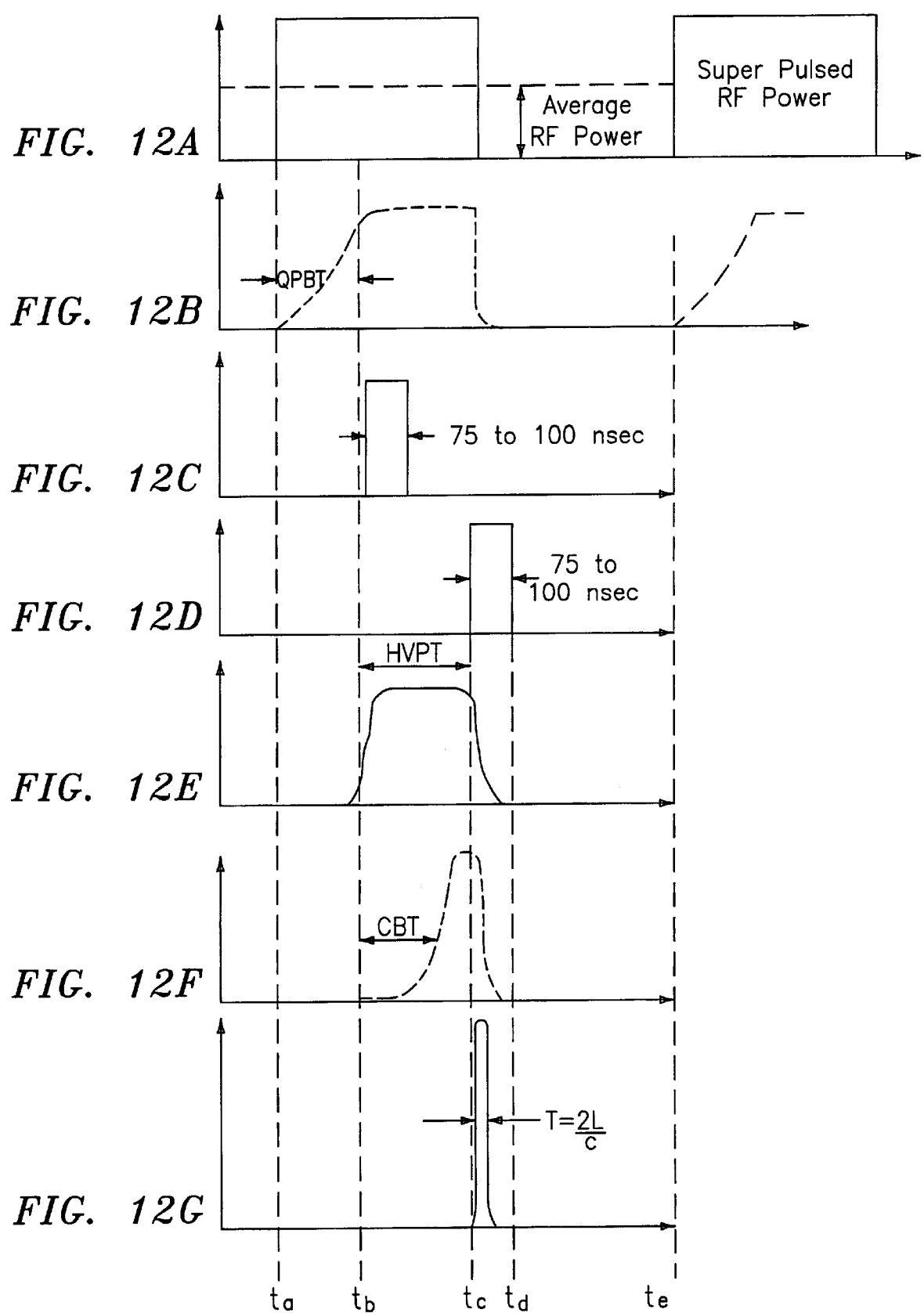

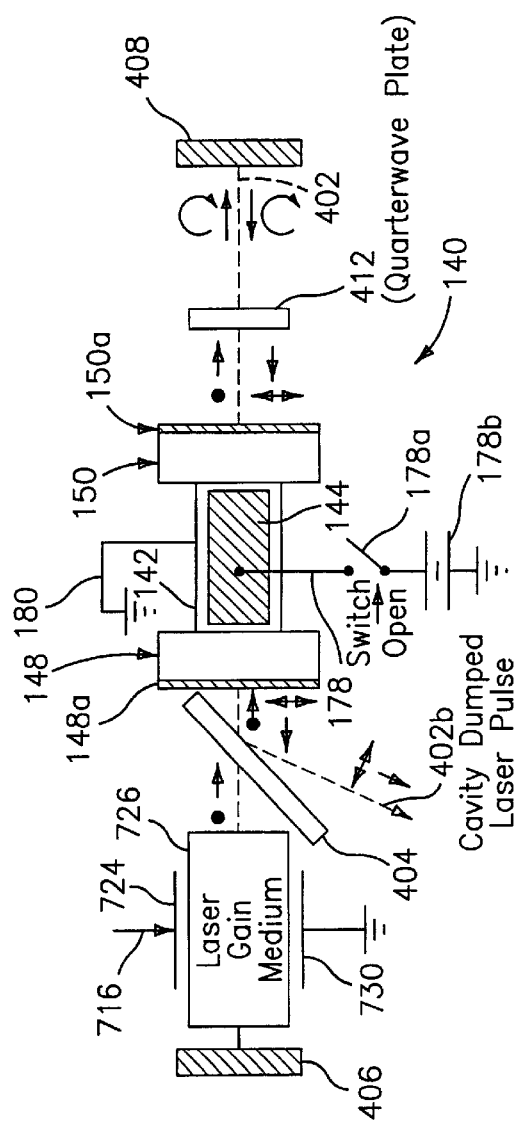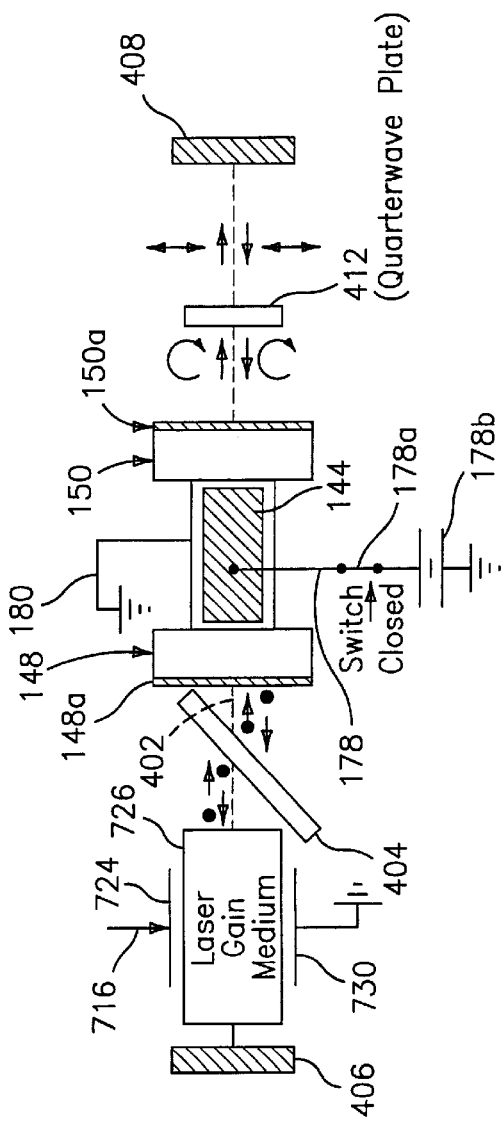

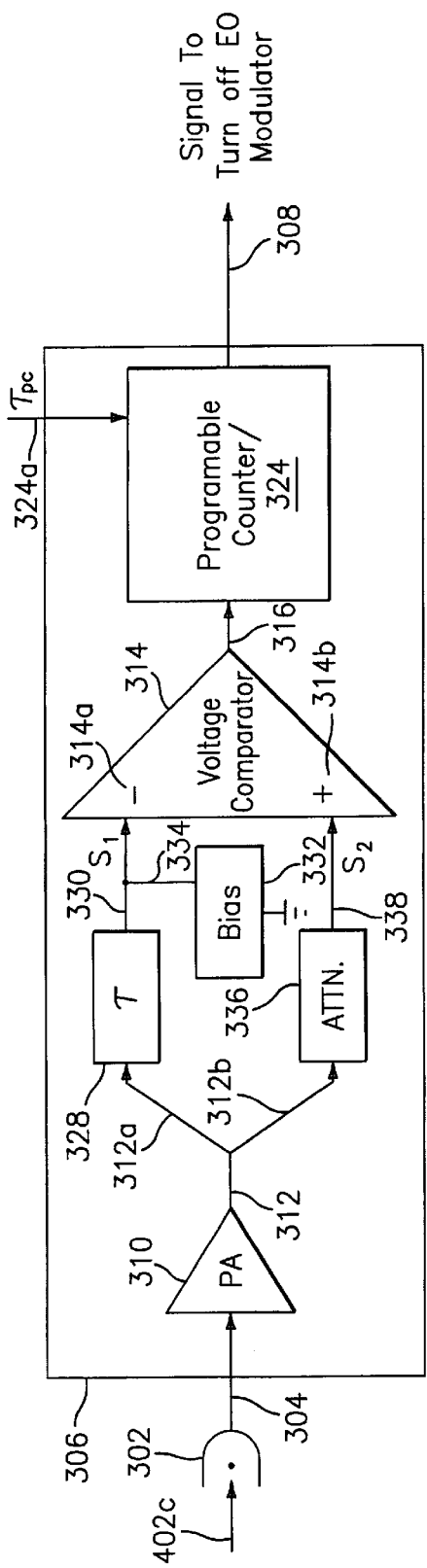
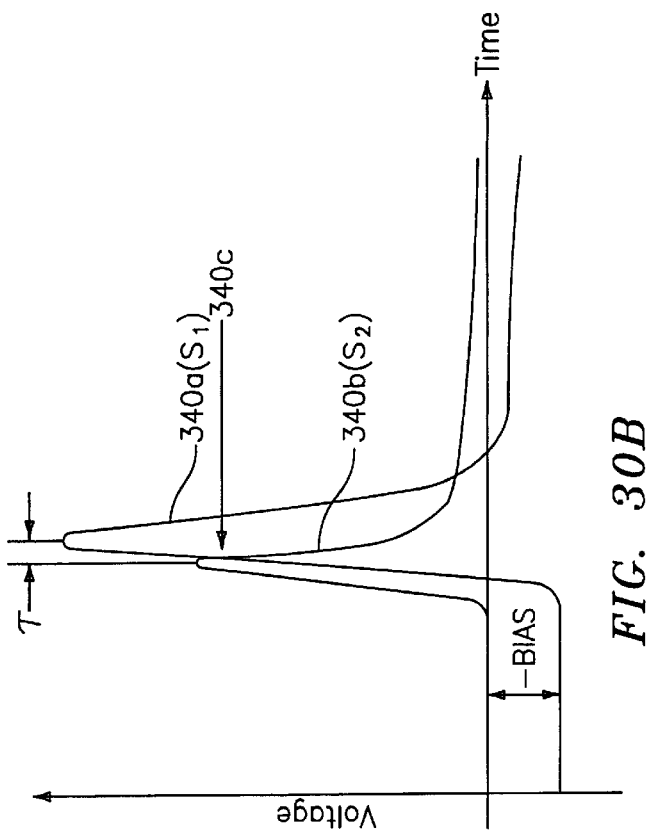
FIG. 30A
FIG. 30B

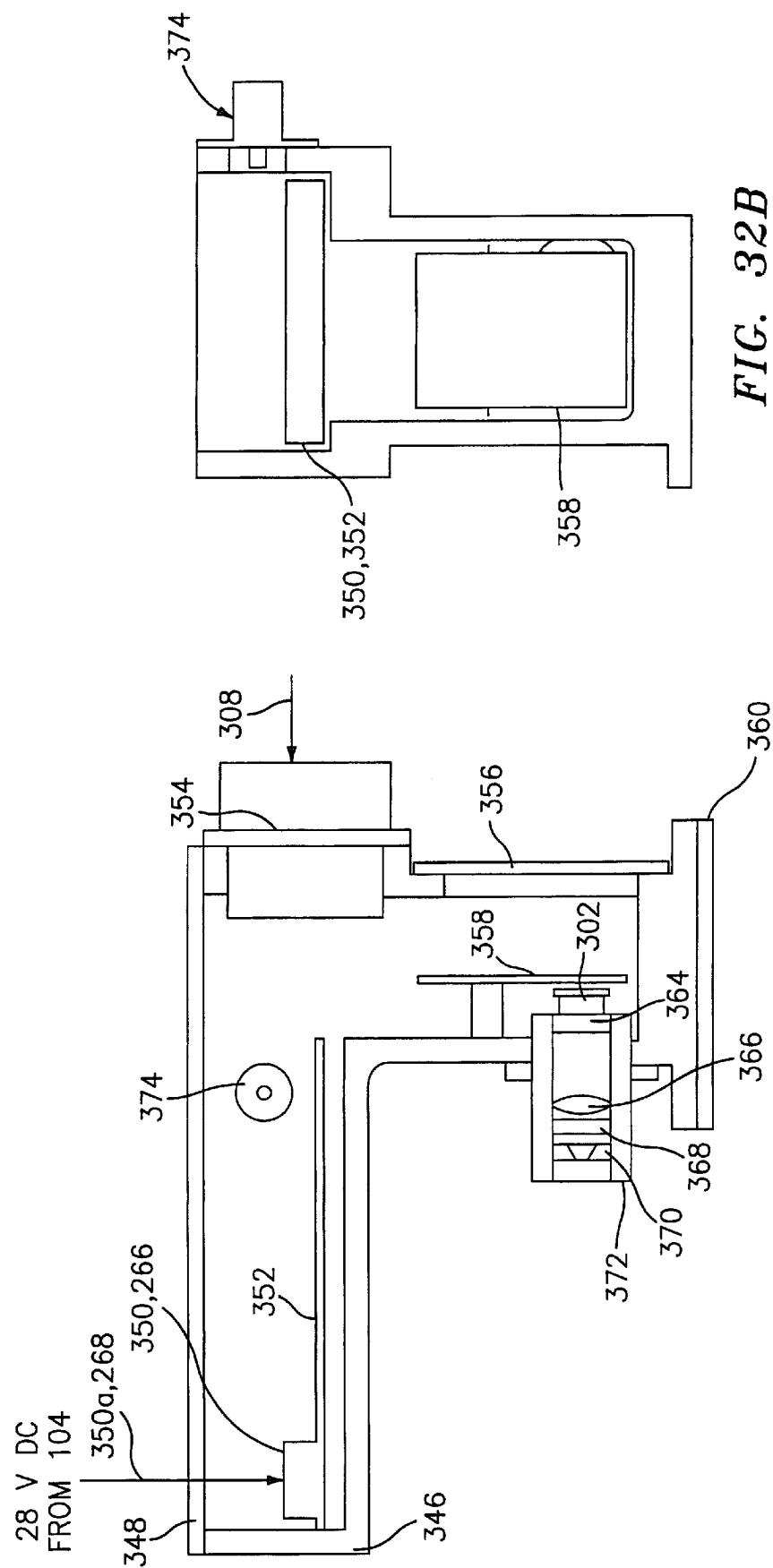

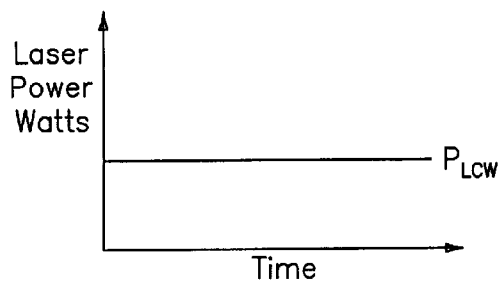
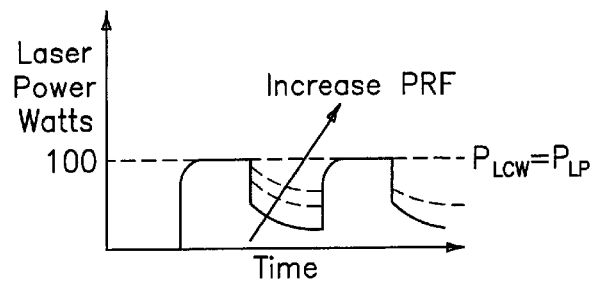
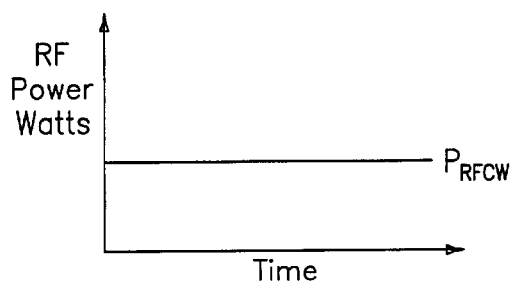
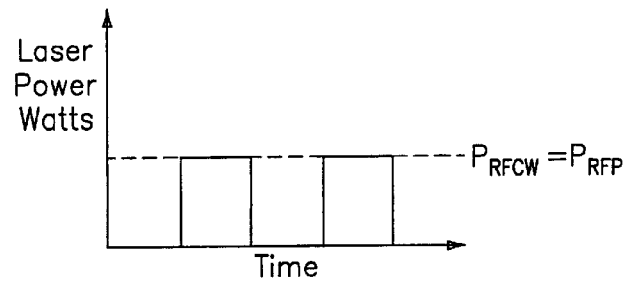
*FIG. 46A*    *FIG. 46C*
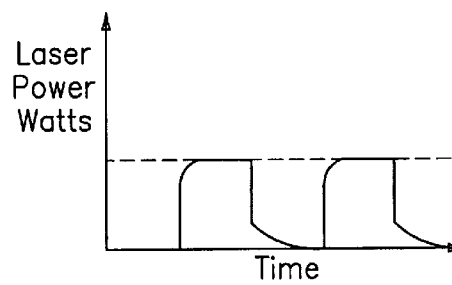
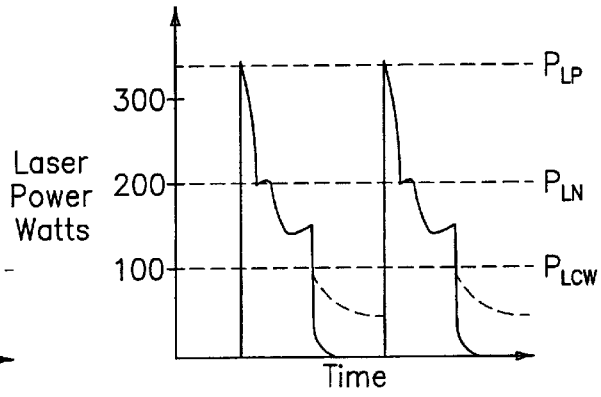
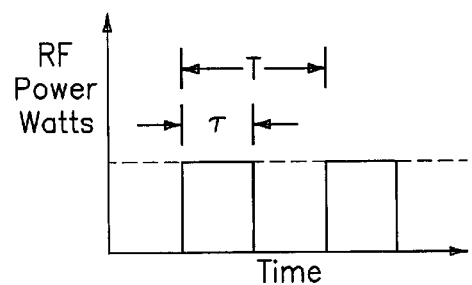
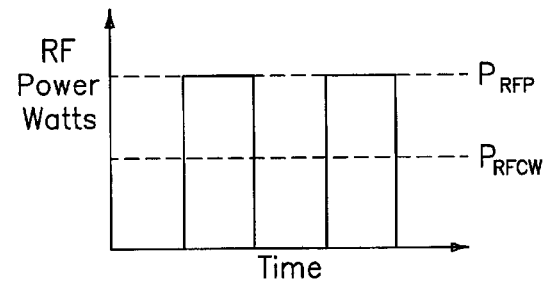
*FIG. 46B*    *FIG. 46D*

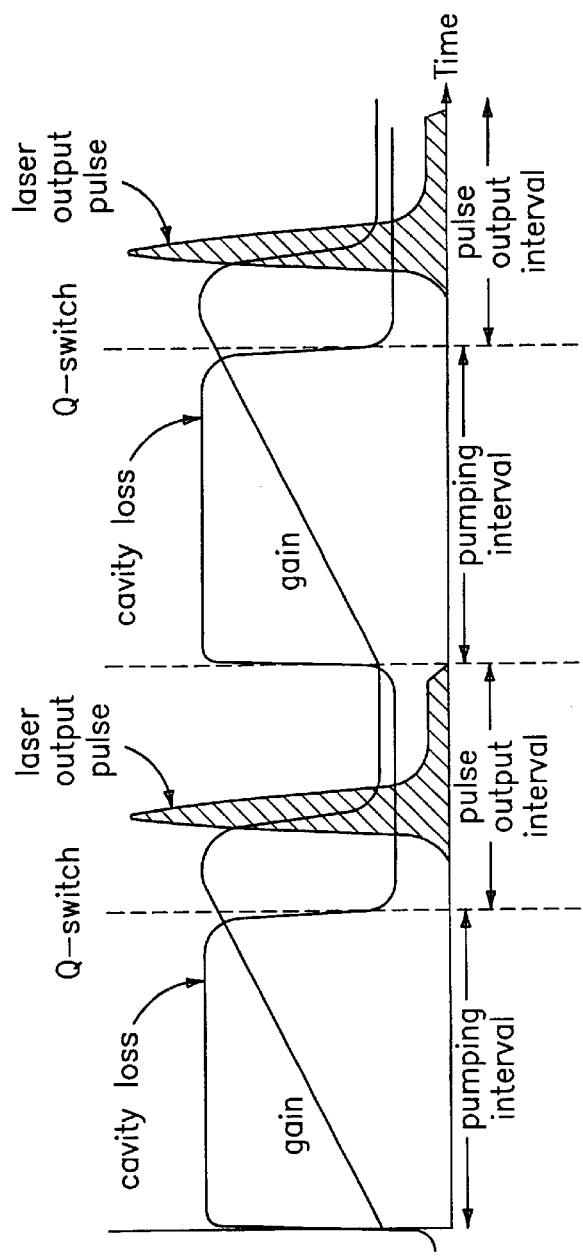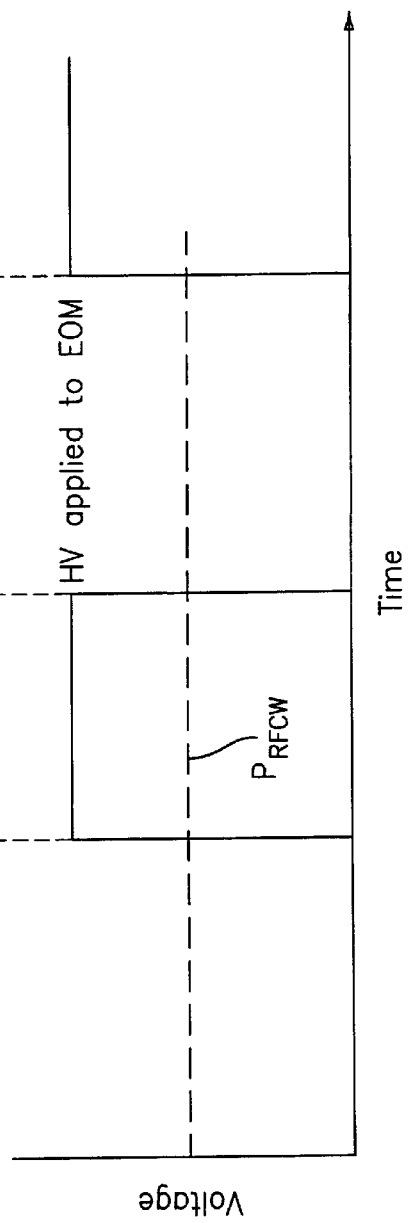
FIG. 47A
FIG. 47B

Q-SWITCHED CAVITY DUMPED CO2 LASER FOR MATERIAL PROCESSING

RELATED APPLICATIONS

This patent application claims the benefit of the filing date of U.S. Provisional Patent Application No. 60/281,431, filed on Apr. 4, 2001, which is incorporated herein by reference in its entirety.

TECHNICAL FIELD

This invention relates to short pulse simultaneously Q-switched/cavity dumped and simultaneously super pulsed, Q-switched and cavity dumped $CO_2$ lasers and more particularly to such lasers in material processing

BACKGROUND

It has become well appreciated in the laser machining industry that machined feature quality is improved as one utilizes shorter laser pulse widths and higher laser peak intensity in drilling holes. More specifically, the geometry of holes drilled with lasers become more consistent, and exhibits minimal recast layers and heat-affected zone around the holes as the laser pulses become shorter and their peak intensity becomes higher (XiangLi Chen and Xinbing Liu; *Short Pulsed Laser Machining. How Short is Short Enough*, J. Laser Applications, Vol. 11, No. 6, December 1999, which is incorporated herein by reference).

It is desirable to have the highest quality at the lowest cost but often one must choose a compromise. High-machined feature quality means low recast layer and heat-affected zone thickness, small surface roughness, accurate and stable machined dimensions. Low cost of ownership means a quick return on the investment made in the purchase of the laser machining equipment. Low cost of ownership also involves low maintenance, low operational costs, and high process speeds and yields in addition to low equipment cost. The choice of the laser parameters such as wavelength (IR, near IR, visible or UV lasers) and operational pulse format (milliseconds, microseconds, tenths of microseconds, nanoseconds, picosecond or femtosecond duration pulses) depends on the particular process, material design tolerance, as well as cost of ownership of the laser system.

Moving from lasers that function in the IR region (i.e. $CO_2$) to the near IR (i.e. YAG or YLF), to the visible (i.e. doubled YAG or YLF), to the near UV (i.e. tripled YAG, YLF or excimer lasers), the trend is toward higher equipment cost in terms of dollar per laser average output power and lower average power output (which are disadvantages) while also having a trend toward higher power density (w/cm$^2$) because of the ability to focus shorter wavelengths to smaller spot sizes (which is an advantage).

Moving toward shorter pulsed widths, the laser costs and the peak power per pulse and therefore power density (w/cm$^2$) both tend to increase, while the average power output tends to decrease which results in the cost in terms of dollars per laser output power to increase.

The recast layer and heat-affected zone thickness are greatly reduced when using nanosecond pulses over millisecond and microsecond wide laser pulses (XiangLi Chen and Xinbing Liu; *Short Pulsed Laser Machining: How Short is Short Enough*, J. Laser Applications, Vol. 11, No. 6, December 1999). These improvements result from the higher laser beam intensity associated with the higher peak powers that are obtained with shorter laser pulses that utilize Q-switching, mode locking and other associated techniques and the fact that the pulse duration is shorter than the thermal diffusion time. For example, the typical thermal diffusion time for a 250 micron diameter hole is approximately 0.1 millisecond. In spite of the lower energy per pulse, high drilling speeds can still be cost effectively obtained because of the high pulse repetition rate obtained with these technologies. The high laser beam intensity provided by short laser pulses technology results in vaporization-dominated material removal rather than the melt-expulsion-dominated mechanisms using millisecond wide laser pulses. It is also known that shorter pulse width yield more limited heat diffusion into the surrounding material during the laser pulse. Hole-to-hole dimensional stability is also improved because the hole is drilled by the material being nibbled away by tens to hundreds of laser pulses of smaller pulse energy but occurring at a high pulse repetition frequency rather than by a few high-energy pulses. For the same reason, thermal and mechanical shocks from nanosecond pulses are also reduced compared with millisecond pulses. These advantageous effects obtained with nanosecond laser pulses have been detected by observing fewer micocracks occurring when holes were drilled in brittle materials such as ceramic and glass when utilizing nanosecond laser pulses.

When the intensity is further increased through laser mode locking techniques to get down to the subnanosecond pulse width (i.e. picoseconds and femtosecond region), additional reductions in the recast and heat-affected zones are observed. Since a typical electron energy transfer time is in the order of several picoseconds, femtosecond laser pulse energy is deposited before any significant electron energy transfer occurs within the skin depth of the material. This forms a plasma that eventually explodes and evaporates the material leaving almost no melt or heat-affected zone. Due to the small energy per pulse (~1 mJ), any shock that is generated is weak resulting in no microcracks even in brittle ceramic alumna material. Femtosecond pulses are not presently obtainable with $CO_2$ lasers due to the narrow gain of the laser line. Femtosecond pulses are presently obtainable with solid-state lasers.

For the same total irradiated laser energy, femtosecond pulses remove two to three times more material than the nanosecond pulses. However, even "hero" type, one of a kind experimental, state of the art laser research and development systems that operate in the femtosecond range deliver only several watts of average power, while nanosecond lasers yield one or two order of magnitude higher power output. Consequently, femtosecond lasers are still too low in average power to deliver the required processing speeds for most commercial applications. It has been reported (XiangLi Chen and Xinbing Liu; *Short Pulsed Laser Machining: How Short is Short Enough*, J. Laser Applications, Vol. 11, No. 6, December 1999) that a 1W femtosecond laser requires more than a minute to drill a 1.0 mm deep hole of 0.1 mm diameter. Present femtosecond lasers have such high cost that their use is cost effective for only special high value applications that unfortunately have relative low unit volume market potential. For example, Lawerance Livermore National Lab has made use of the fact that femtosecond laser pulse energy is deposited essentially with no thermal transfer to cut and shape highly sensitive explosive materials without denotation.

It is well known that the trend for optical absorption in metals as a function of wavelength is toward lower absorption with increasing wavelengths as shown in FIG. 1. Consequently, the near IR, visible and ultra violet wavelength regions are most effective in machining most metals. This advantage does not exist in plastic material. The data contained in FIG. 1 is not relevant once a plasma is initiated on the metal surface because all of the laser energy is absorbed in the plasma, which in turn imparts the energy to the material. Once the plasma is initiated, the absorption as a function of wavelength variation for metals becomes essentially flat. Consequently, one can paint the surface of the metal for greater absorption at longer wavelengths and the higher absorption advantage of shorter laser wavelengths is effectively eliminated.

The electronics industry has needs to shrink the size of semiconductor and hybrid packages, and greatly increase the density of printed circuit boards because of the market desire for smaller cellular phones, paging systems, digital cameras, lap top and hand held computers, etc. These needs have resulted in interest in the use of lasers to form small vertical layer-to-layer electrical paths (via) in printed circuit boards. The short pulse $CO_2$ laser is particularly attractive for drilling via holes in printed circuit boards because of 1) the high absorption of the printed circuit board or hybrid circuits resin or ceramic material at the $CO_2$ wavelength when compared to YAG or YLF lasers which operate in the near IR and in the visible and UV wavelength regions with harmonic generating technique; 2) the lower cost per watts associated with $CO_2$ lasers when compared to YAG lasers, 3) and because of the high reflectivity of copper at $CO_2$ wavelengths, which enables $CO_2$ laser via hole drilling equipment to drill through the resin layer down to the copper layer where the drilling is stopped because of the high reflectivity of the copper interconnect material at the $CO_2$ laser wavelengths. These are called "blind via," which connect the outer layer of a circuit to the underlying inner layer within the multi layer board. The major disadvantages of $CO_2$ lasers in via hole drilling is the larger spot size obtainable with its 10.6 micron wavelength when compared to shorter wavelength laser. Another disadvantage is that pulse widths below several nanosecond are difficult to obtain with $CO_2$ lasers. The major advantages of $CO_2$ Q-switched lasers are: they offer lower cost per watt of laser output when compared with solid state lasers, the higher absorption of their radiation by resin and ceramic board materials, their ability to operate at high PRF, their ability to generate substantial output power under Q-switched operation, and their ability to stop drilling when the radiation gets to the copper layer.

The advantages of drilling via holes in printed circuit boards with laser systems have enabled laser systems to capture 70% of the via hole machine drilling market in 1999 (David Moser; *Laser Tools For Via Formation*, Industrial Laser Solutions, p. 35, May, 2000, which is incorporated herein by reference), with the remaining 25% of the market held by photo-via and the remaining 5% by other techniques, such as mechanical drilling, punch and plasma etching.

The upper $CO_2$ laser transition level has a relatively long decay rate for storing larger than normal population inversion (385 torr$^{-1}$ sec$^{-1}$ at 300 K and approximately 1300 torr$^{-1}$ sec$^{-1}$ at 500 K). The lower $CO_2$ laser levels for both the 9.4 and 10.4 transitions are approximately an order of magnitude faster so a large population inversion between the lower levels and the upper level can be easily maintained. Laser mediums that have transitions with long lifetime upper energy levels are good candidates for application of Q-switched techniques (A. E. Siegrnan; *Lasers*, Chapt. 26, University Science Books, 1986, which is incorporated herein by reference). The long lifetime of the upper levels store energy by building up a higher than normal population with respect to the lower laser level. Consequently, $CO_2$ lasers are good candidates for performing Q-switching (G. W. Flynn et al; *Progress and Applications of Q-switching Techniques Using Molecular Gas Lasers*, IEEE J. Quant. Electronics, Vol. QE-2, p. 378–381, Sept. 1966, which is incorporated herein by reference). Consequently, $CO_2$ lasers are good candidates for simultaneously Q-switching and cavity dumping in order to obtain shorter pulse widths than obtainable from just Q-switching.

Q-switching is a widely used technique in which a larger than normal population inversion is created within a laser medium by initially providing for a large loss within the feedback cavity. After a large inversion is obtained, one quickly removes the large optical loss within the feedback cavity, thereby quickly switching the cavity Q back to its usual large value (i.e. low loss value). This results in a very short intense burst of laser output, which dumps all the excess population inversion into the short laser pulse (A. E. Siegman; Lasers, Chapt. 26, University Science Books, 1986).

FIG. 47A illustrates the time dependent variation of the losses within the feedback cavity that can be obtained with either a rotating feedback mirror, an electro-optics modulator (i.e. switch) or with an acousto-optics switch inserted in the lasers feedback cavity under continuous pumping condition shown in FIG. 47B. FIG. 47A also illustrates the time dependent gain variation experience by the continuously excited laser under the internal optical cavity loss variations illustrated. The gain is allowed to rise for an optimum time of about one or two population decay time of the upper $CO_2$ laser level. At such an optimum time, the cavity loss is switched from a high loss to the normal loss condition (or the Q of the cavity is switched from a low to a high value condition) by applying a high voltage pulse to the electro-optic modulator (EOM) as shown in FIG. 47B. Since the gain greatly exceeds the losses at this point, laser oscillations by stimulated emission begins with the output building up exponentially, resulting in the emission of a giant laser output pulse whose peak power is hundreds of times larger than the continuous power of the laser. The pulse has a long tail, which will eventually decay down to the lasers' CW power level as long as the gain exceeds the feedback cavity loss. This tail is detrimental to most hole drilling process. The use of simultaneously Q-switched and cavity dumped process as revealed in this invention will eliminate this long pulse tail problem associated with Q-switching. When the high loss cavity condition is again switched on, the laser action stops and the described dynamic process is repeated.

To the present time, Q-switched and cavity dumped $CO_2$ lasers have not found extensive commercial application, as have Q-switched solid-state lasers (whose upper state life times are measured in seconds instead of tenths of seconds as for the $CO_2$ laser). Nearly all of the Q-switched $CO_2$ laser applications to date have addressed predominately military and scientific applications. Some of the reasons for the lack of interest in commercial $CO_2$ Q-switched and cavity dumped lasers are high cost of the electro-optic crystal (namely CdTe), limited suppliers for the electro-optic (EO) crystals, large performance variation between different optical paths within an EO crystal and large performance variation between different crystals. There is also difficulty in obtaining good anti reflection thin-film coatings on CdTe crystals. In addition, acousto optic modulators in the IR have higher attenuation and poorer extinction performance than in the visible region, as well as larger thermal distortion and poorer reliability. Based upon these EO crystal limitations $CO_2$ lasers were considered to have poorer reliability than the Q-switched solid state laser which was mostly attributed to the CdTe crystals. Consequently, superpulse operation, or mechanically Q-switched $CO_2$ lasers and TEA $CO_2$ laser techniques have been utilized to satisfy most short pulse $CO_2$ laser industrial needs to date (A. J. DeMaria; *Review of CW High Power $CO_2$ Lasers*, Proceedings of the IEEE, pg. 731–748, June 1973, which is incorporated herein by reference).

For these reasons, techniques such as gated CW and super pulse, along with external cavity acousto-optic deflection of either CW or super pulsed lasers into a aperture have been predominately utilized to date with $CO_2$ lasers to obtain IR laser pulses for industrial applications. Each of these techniques are deficient when compared with $CO_2$ Q-switching or simultaneous Q-switching and cavity dumped operation in one or more of the following: 1) longer pulse widths with slower rise time, 2) lower pulse repetition frequencies (PRF), 3) lower over all laser efficiencies, 4) long duration tails associated with the pulses and 5) lower peak powers. TEA lasers have also been used to date, but they suffer from higher time jitter from pulse to pulse, higher pulsed voltage requirements to energize the laser along with associate acoustic shock noise from the discharge, low pulse repetition rates and non-sealed off laser operation which requires gas flow.

Thus it is desirable to make both the Q-switched and Q-switched and cavity dumped $CO_2$ laser lower in cost, more reliable, to enable the cost effective utilization of the present state of the art of CdTe electro-optics crystal technology without sacrificing Q-switching performance, and obtaining higher peak power and shorter pulses by simultaneously utilizing super pulse and Q-switching techniques as well as cavity dumping techniques. It is desirable to make simultaneously Q-switched and cavity dumped $CO_2$ lasers commercially practical because pulse widths of 7–20 nsec are obtainable while Q-switched $CO_2$ lasers provide pulse widths of 100–150 nsec. Shorter pulse have advantages for numerous hole drilling applications, especially for via hole drilling of printed circuit board and for laser marking of stressed glass containers holding a vacuum or partial vacuum or a pressure higher than ambient pressure such as automobile headlights, flat panel displays, cathode ray tubes for TVs and computers, street lights, light bulbs stressed plate glass in automobiles or pressured glass or plastic containers containing soft drinks, beer, etc.

FIG. 2 illustrates a block diagram of a laser material processing system. The system includes the laser head and its power unit, which may or may not have an internal controller. An RF power unit is preferred. The RF power unit can be operated CW or in the super pulsed mode. The super pulsed mode is used to obtain increased peak power laser pulses. The laser head and its power unit and controller are usually provided by a laser supplier, while the controller for the XY scanning system, the scanners, the keyboard, the optical shutter and a display unit are usually the responsibility of the original equipment manufacturer. The original equipment manufacturer (OEM) controller commands the scanning system and the display unit and sends signals to the laser controller, which in turn commands the laser head. If the laser is liquid cooled, a chiller is required which either the laser manufacturer or the systems OEM can supply. Usually, the OEM chooses to supply the chiller. Laser beam shaping optics are usually required between the laser head and the scanners. Either the laser manufacturer or the OEM system manufacturer can supply the laser beam shaping optics. This overview block diagram is essentially identical to a block diagram used to describe laser engraving, marking, cutting and drilling systems for desk top manufacturing type applications with the software being basically the differentiating portion of the system. The system OEM normally is responsible for the optical scanner, the system controller and its software and the displays.

The OEM system controller tells the XY optical scanning system where to point and informs the laser head through the controller within the laser's head power unit when to turn on or off and how much power is to be emitted. The OEM system controller also monitors and supervisors the chiller, and displays the desired information on the display unit to the system operator who usually enters commands through the keyboard that address the system controller. The system controllers and the laser power unit controller also perform appropriate diagnostics to protect the system from inadequate cooling, RF impedance mismatch between the laser discharge and the RF power supply, and safety features such opening and closing the systems optical shutter, etc.

FIG. 3 illustrates the modifications to FIG. 2 for the case when a simultaneously Q-switched, cavity dumped laser is utilized in the material processing system. In addition to commanding the laser power supply, the system controller performs calculations utilizing the input from the operator provided through the keyboard and issues commands regarding the laser modulation format (i.e. gated output or super pulse output for example, the timing of the Q-switched or the simultaneously Q-switched, cavity dumped laser laser pulse along with pulse duration and repetition frequency, etc.) and monitoring the status of the laser head and its power supply as well as the chiller. The system controller also issues commands (and may receive signals) from the Q-switched power module. The system controller receives signal from an operator through a keyboard and commands as well as monitors the status of the optical shutter, which can be inserted either before or after the optical scanners. In some cases, the optical shutter is specified for inclusion at the direct exit of the laser beam out of the laser housing. If the shutter is included as part of the laser housing, the laser manufacturer supplies the optical shutter and its circuitry. The status of the system is displayed to the operator of the keyboard by an appropriate display unit. The Q-switching module of FIG. 3 is in principle the same for either a solid state or gas laser system with the major difference being the use of a different electro-optical crystal.

In addition to utilizing Q-switched or a simultaneously Q-switched, cavity dumped lasers and even shorter pulsed laser systems, such as mode locked laser systems for hole drilling applications, the laser system of FIG. 3 can also be utilized to mark, encode or drill stressed glass vessels or structures as well as to perforate or punch holes in paper without charring. The advantage of utilizing simultaneously Q-switched cavity dumped lasers over Q-switched lasers to mark or encode stressed glass containers, which have a pressure difference between the inside and outside surfaces of the containers, arises because they can provide an order of magnitude shorter laser pulse widths. The use of simultaneously super pulsed Q-switched and cavity dumped lasers for marking and machining stressed glass containers has not been appreciated nor recognized because such short pulse $CO_2$ laser systems for such applications have not been presently commercially available. Such containers include, for example, sealed glass automotive headlights, streetlights, cathode ray tubes, flat panel displays and beer, soda, and champagne bottles. Tempered glass surfaces of safety glass doors, windows, and automotive side windows are also good candidates for laser marking or encoding with short laser pulses because the generation of microcracks in brittle materials such as glass and ceramic materials are greatly reduced by Q-switched or cavity dumped laser pulses. If longer pulsed laser radiation is used to mark such stress containers and glass surfaces, micro cracks are created at the location where the laser marks or encodes the glass. These microcracks become enlarged and propagate with time under the stress load that the brittle material is subjected. $CO_2$ laser radiation is strongly absorbed by glass and ceramics so they are the laser of choice for such applications. Because of their size, power, cost and processing speed, $CO_2$ lasers are preferred for non-metal processing of materials. UV radiations are also absorbed by glass material and are considered alternate lasers for such applications, but at higher cost and slower processing speeds.

The high laser beam intensity provided by short pulse laser technology results in the vaporization-dominated material removal rather than the melt-expulsion-dominated mechanisms using longer duration pulses. Thermal and mechanical shocks are reduced with the short laser pulse system of FIG. 3 when compared with longer pulse systems of FIG. 2. Consequently, micro cracks are greatly reduced under laser marking or encoding with short pulse lasers. Simultaneously Q-switched cavity dumped laser output pulses do not have the long tails associated with Q-switched laser pulses. Consequently, the formation of micro cracks at the glass location, which is marked or encoded is reduced to a larger extent then with the Q-switched $CO_2$ laser. The application of the laser system of FIG. 3 thereby opens up the market of direct marking or encoding on stressed glass containers and structures. Currently ink jets or other similar devices are used to mark or encode such glass containers and structures. Inkjets have well known disadvantages over laser marking/encoding system. Some of these disadvantages are their mark is not permanent and can rub off through handling, and exposure to the environment, the inks and solvents are consumables and recurring costs can be high, the inks and solvents are toxics and dirty up the factory environment and the down time of inkjet marking systems is high which adds to their operating costs. The major advantage of inkjet marking systems for this application is low initial capital cost.

The drilling of numerous small holes in paper or plastic parts without charring the edges of the paper or plastic material is desired in many industries. Some examples are in the tobacco filtration, and in the banking and billing industries for perforating checks and other financial documents. In the past TEA lasers, which suffer from low pulse repetition frequencies, were used for these applications. It has not been appreciated that Q-switched and simultaneously Q-switched and cavity dumped lasers lasers can be utilized to perforate such materials. If higher energies are required than those available with a single sealed-off Q-switched cavity dumped laser, then a laser amplifier can be used to increase the pulse energy of the Q-switched cavity dumped laser. Q-switched lasers and simultaneously Q-switched cavity dumped lasers have pulse repetition frequencies of greater than 100 kHz while TEA lasers have an upper practical limit of PRF of 500 Hz.

SUMMARY OF THE INVENTION
Background on Cavity Dumping

Simultaneous Q-switched cavity dumped techniques can be used in $CO_2$ lasers to obtain pulse widths of approximately 7 to 20 nanoseconds depending upon the length of the laser feedback cavity. Cavity dumping is a technique in which the output coupling out of the laser cavity is suddenly increased to a very large value. This is as if one of the end laser mirrors had been removed so that all of the circulating energy within the cavity is "dumped" into an output pulse. For perfect dumping, the output pulse will be exactly one cavity round-trip time T in duration, and contains all of the optical energy contained within the cavity. FIG. 4 shows an apparatus by which this can be accomplished.

The laser cavity comprising mirrors 406, 408 of FIG. 4 contains a polarizing beam splitter 405, which makes the cavity 406, 408 oscillate normally with a given polarization, for example, with a vertically oriented linear polarization as illustrated in FIG. 4. In order to dump the cavity energy, the voltage across the electro-optic modulator 140 (e.g. a Pockels cell) is suddenly switched (in a time short compared to T, or typically a few nanoseconds) to a value which makes the transparent electro-optic crystal 142 become birefringent, with a value corresponding to a quarter-wave plate for single pass, or a half-wave plate for double pass. The laser radiation that was linearly polarized in the plane of the page, becomes circularly polarized as it passes through the crystal 142 going to the right and then coming back through the crystal 142 to the left, after being reflected off mirror 408 has its polarization converted into a polarization perpendicular to the plane of the page after coming back out of the crystal 142. All the energy in this polarization coming back to the polarizing beam-splitter 405 (which can either be an specially coated dielectric plate, as shown, or a polarizing prism, such as a Glan-Thompson prism) is then reflected (e.g. dumped) out of the cavity 406, 408 as shown at 407. The pulsed radiation 407 has a pulse width essentially equal to the time required for light to make one round trip between the mirrors 406 and 408. As a practical matter, a fixed quarter-wave plate (not shown) is often added to the EOM 140, and the EOM 140 is then initially biased to a fixed voltage, typically several thousand volts, required to cancel the fixed quarter-wave plate. Since it is easier to short out or "crowbar" the EOM voltage from a high initial value down to zero volts in a few nanoseconds (nsec) than it is to switch the same voltage from zero volts up to the necessary high voltage value in the same length of time, cavity dumping may be accomplished by suddenly switching off the voltage across the EOM, leaving only the fixed quarter-wave plate. This approach is not well suited with CdTe EOM crystals due to traces of impurities which adversely affect the performance of these crystals in electro-optical modulator applications under prolonged exposure to high voltage. In addition, the temperature changes in the quarter wave plate causes variations of the polarization of the radiation propagating through the 1/4 $\lambda$ plate.

Consider as an example, a CW laser oscillator running in steady-state with an approximate 5% output coupling mirror (R=95%), the circulating intensity inside the laser cavity is then 20 times as large as the CW output intensity from the laser. If this circulating intensity is suddenly cavity dumped, the peak power output during the dumped pulse can be up to 20 times as large as the average or CW power output from the laser. By reducing the output coupling essentially to zero, one can make both the circulating radiation intensity and thus the "dumpable" peak power still larger. It has been found that coated metal mirrors are well suited for highly reflecting feedback mirrors without suffering mirror damage under the high intensity radiation within the laser cavity.

If one further allows the intensity inside the cavity to build back up again, and one then again dumps the laser cavity, using repetitive cavity dumping, one can obtain most of the available power output from the laser medium as output in the form of repeated pulses, which have substantially higher peak power than the average power from the laser. With proper choice of repetition frequency, the average power in the dumped output can approach the full average power available with optimum coupling in CW operation; but the higher peak powers can make this energy much more effective in drilling, cutting, welding, and other nonlinear laser processes.

BRIEF DESCRIPTION OF THE DRAWINGS

FIGS. 7A–7G is a graphical representation of the temporal sequence of events in the operation of a continuous wave pumped Q-switched, cavity dumped $CO_2$ laser.

FIG. 10A is a first graphical representation of the temporal characteristics of an electrical signal indicative of the radiation of the laser of FIG. 5.

FIGS. 10B and 10C are first graphical representations of the temporal characteristics of bias signals for comparison with the electrical signal of FIG. 10A.

FIGS. 12A–12G are graphical representations showing the temporal sequence of events in the operation of a simultaneously super pulse pumped Q-switched, cavity dumped $CO_2$ laser.

FIG. 24A is a first schematic diagram of an electro-optical modulator within a laser cavity with no voltage applied across the electro-optical crystal resulting in a state of high optical loss within the laser cavity.

FIG. 24B is a first schematic diagram of an electro-optical modulator in a laser cavity with a nonzero voltage applied across the electro-optical crystal resulting in a state of low optical loss within the laser cavity.

FIG. 30A is a second schematic diagram of an electronic circuit for truncating a portion of output pulse in a $CO_2$ Q-switched laser.

FIG. 30B is a graphical depiction of the variations in the triggering of the output of the circuit of FIG. 30A as a function of the time delay and attenuation of the output pulse in a $CO_2$ Q-switched laser.

FIGS. 32A and 32B are schematic depictions of the housing and the arrangement of the electronic circuits of FIGS. 29A and 30A.

FIGS. 46A–46D is a graphical depiction of the operation of a $CO_2$ laser wherein FIG. 46A depicts an RF continuous wave operation, FIG. 46B depicts RF amplitude gated operation at low repetition frequency, FIG. 46C depicts RF amplitude gated operation at high repetition frequency and FIG. 46D depicts RF super pulsed pumped operation.

FIG. 47A is a graphical depiction of the cavity loss, gain and laser output pulse in a repetitively pulsed Q-switched laser.

FIG. 47B is a graphical depiction of the continuous wave radio frequency power input to a Q-switched $CO_2$ laser and the high voltage signal delivered to an electro-optic modulator to effect Q-switching.

DETAILED DESCRIPTION OF THE INVENTION

Simultaneously Q-Switched Cavity Dumped $CO_2$ Laser Housing

Figure 13:
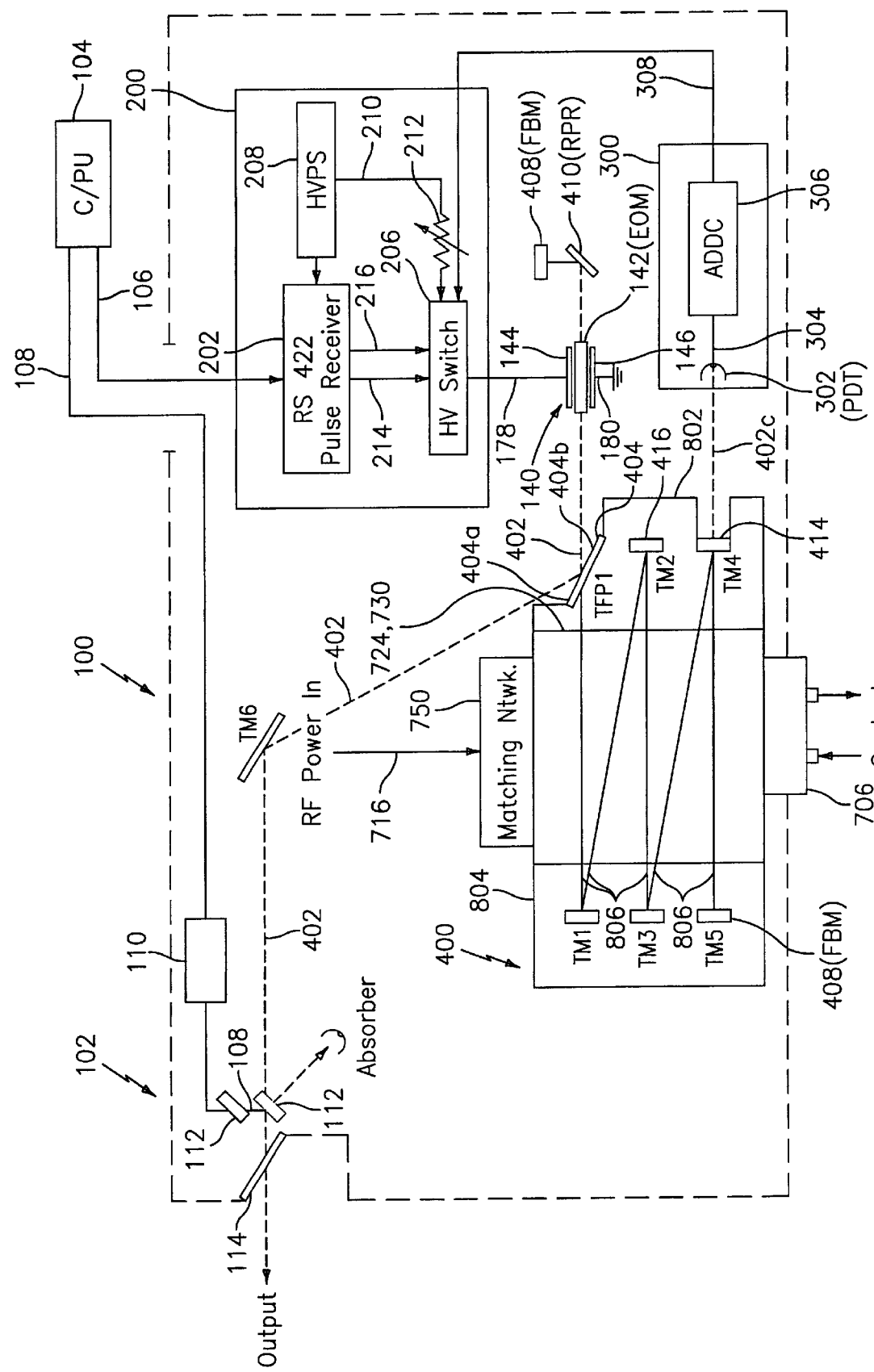
FIG. 13 is a first schematic diagram of a simultaneously Q-switched cavity dumped $CO_2$ laser system for material processing.

FIG. 13 illustrates a schematic overview of a laser assembly 100, including a laser housing 102 for a sealed-off, folded waveguide, electro-optically Q-switched cavity dumped $CO_2$ laser head 400. A multiple (e.g. five) pass zig-zag folded waveguide is shown at 806 within the laser head 400 for illustration purposes. A three pass, or, more than five pass, folded waveguide configuration could also be used in the hermetically sealed laser head 400. It will be understood that another option is to have a free space folded beam path. Since output power of waveguide lasers scales with discharge length, more folds can be added if higher average power is desired. Turning mirrors (TM4) 414 utilize a metal O-ring to maintain the hermetical seal as disclosed in U.S. patent application Ser. No. 09/612,733 entitled High Power Waveguide Laser, filed on Jul. 10, 2000 (which is incorporated herein by reference in its entirety) and in U.S. provisional Patent Application Serial No. 60/041,092 entitled RF Excited Waveguide Laser filed on Mar. 14, 1997 (which is incorporated herein by reference in its entirety). The FBM 406 and 408 form the laser cavity by trapping laser radiation therebetween. The TM 414 transmits approximately 1% or less of the radiation out of the hermetically sealed laser head 400. The mirror holder flange 804 for the FBM 406 and the TM 414 are as disclosed in U.S. provisional patent application Serial No. 60/041,092 entitled RF Excited Waveguide Laser filed on Mar. 14, 1997. Turning mirrors 416, do not transmit radiation out of the laser head 400. The holders 802 for turning mirrors 416 are the same as the disclosed in U.S. provisional Patent Application Serial No. 60/041,092 entitled RF Excited Waveguide Laser filed on Mar. 14, 1997.

Figure 14:
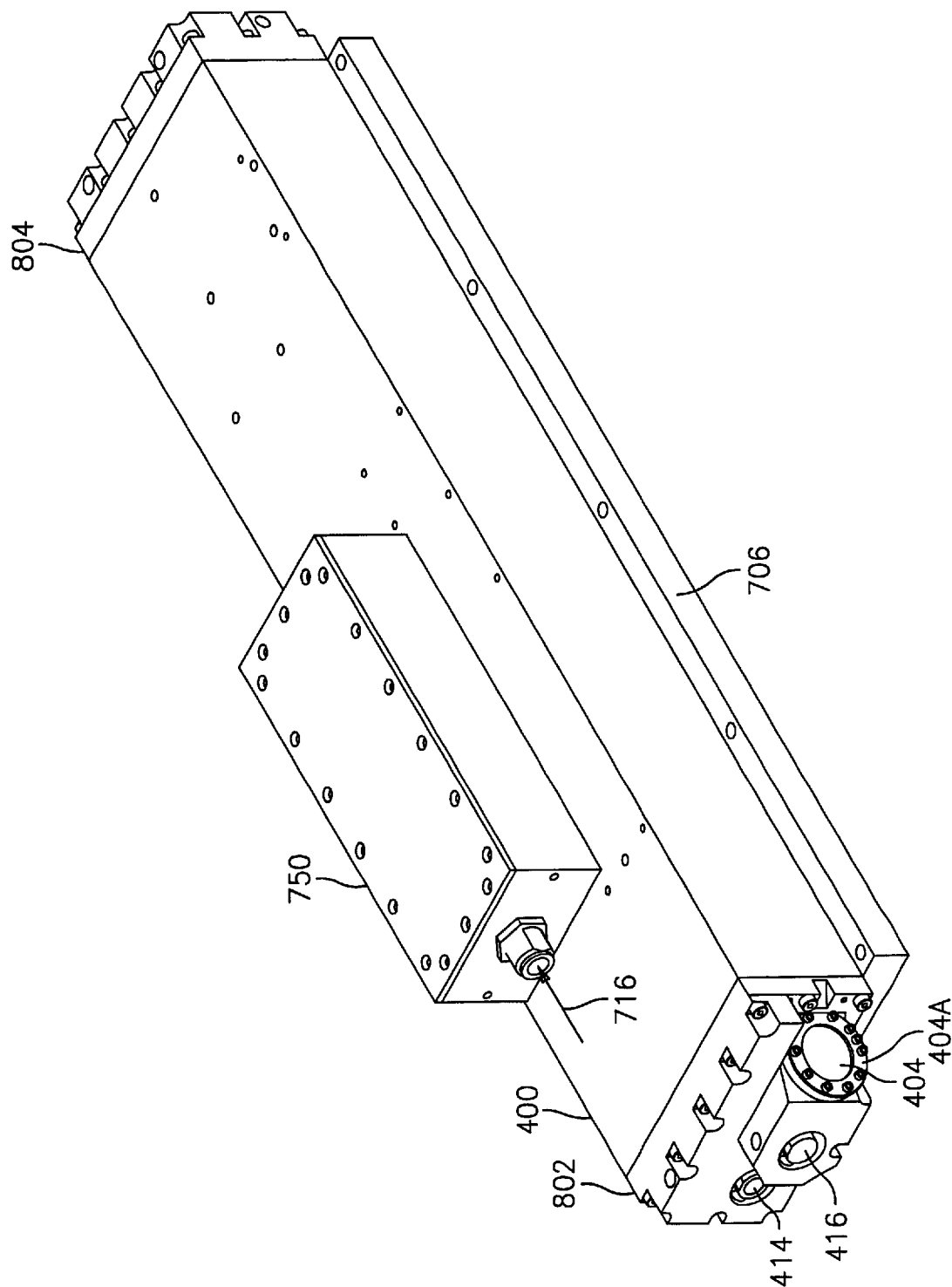
FIG. 14 is an isometric view of a laser head using an NV folded waveguide requiring six mirrors, with a heat exchanger, mirror holding flanges and a housing for a RF phase matching network used in FIG. 13.

The mirror holder 802 for the thin film polarizer (TFP) 404 mounted on the laser head 400 is a modified version of that for TM4 414. The modification is needed because of the larger diameter and the angle required for TFP 404. It is also a modified version of the mirror holder for thin film polarizer 114. The modification over the TFP 114 holder is required because of the need for thin film polarizer 404 to be mounted on the laser head 400, which requires a hermetical seal. TFP 114 is mounted on the laser housing 102 where a hermetical seal is not required. There is an option to place a window 404b in place of TFP 404 and then place TFP 404 outside of the laser head 400. FIG. 14 illustrates an isometric view of the laser head 400 with mirror holders 802 and 804 containing the TFP 404 and its retainer ring 404a, as well as mirrors 416 and 414.

Figure 15:
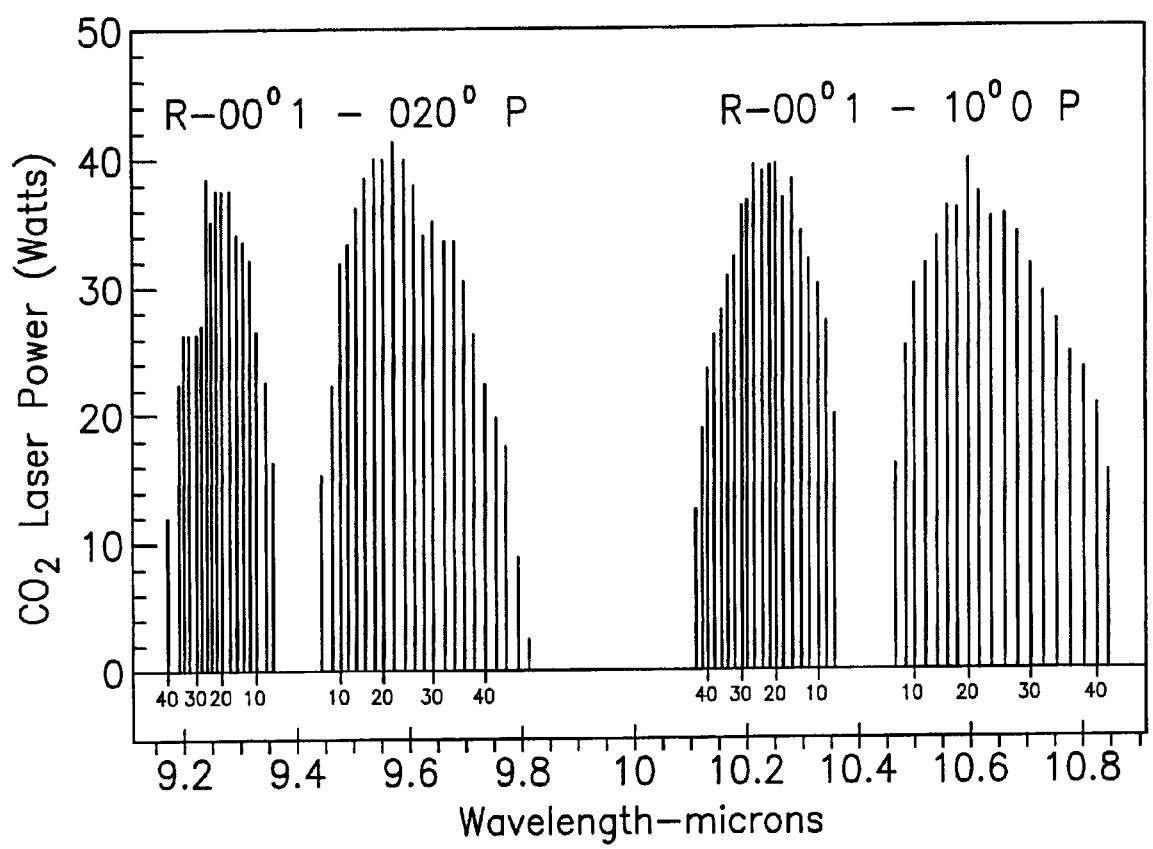
FIG. 15 is a graphical depiction of the output power of $CO_2$ lasers at various laser wavelengths.

For many plastic materials, $CO_2$ laser operation in the 9.2 microns wavelength band, a wavelength of approximately 9.25 microns is preferred over a wavelength of 10.6 microns or other wavelengths because of the increased absorption of the material at 9.25 microns. When operation at a lower $CO_2$ gain line is desired as in this case, it becomes necessary to suppress lasing at higher gain lines. This is especially true under Q-switching, or simultaneously Q-switching and cavity dumping laser operations because of the very high gain that is built-up under the high optical loss (i.e. laser hold-off) condition. FIG. 15 illustrates the relative power output of the various gain lines that can be emitted by a $CO_2$ laser. Additional lines can be obtained with the use of $CO_2$ isotopes gas fill. Note that high gains occur at wavelength of approximately 9.3, 9.6, 10.25 and 10.6 microns. One can utilize a grating to select any one of these high gain lines or lower gain lines and discriminate against the rest. Unfortunately gratings are expensive, easily damaged by high intensity laser radiation and optically lossey. Since the laser beam is folded in FIG. 13, one can utilize one or more state-of-the-art mirrors that have thin-films deposited on them to reflect the desired gain line back into the cavity, thereby favoring the desired line or lines for oscillation.

Figure 16:
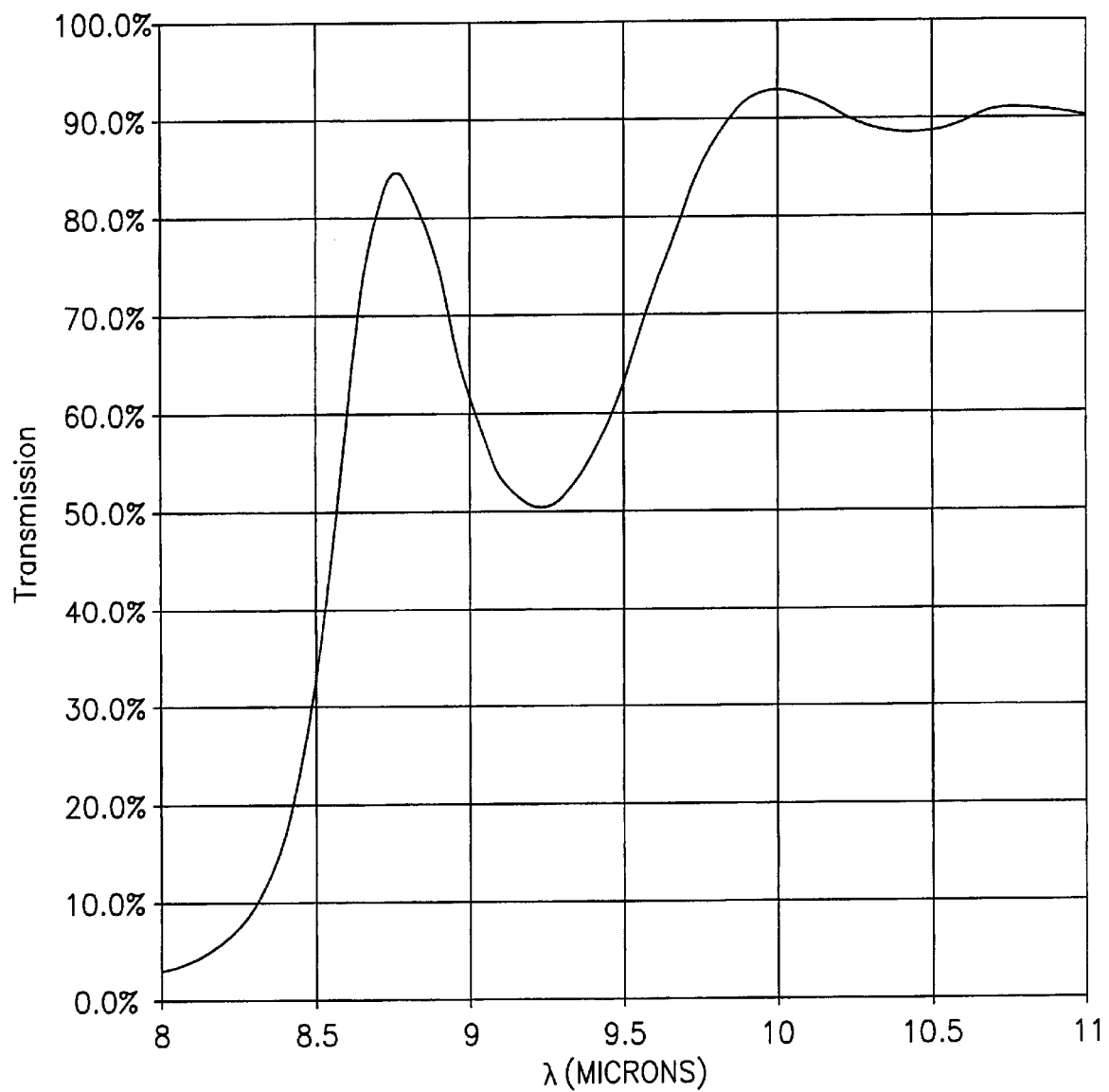
FIG. 16 is a graphical depiction of the transmission of an output coupling mirror for a $CO_2$ laser as a function of wavelength.

FIG. 16 shows the functional relationship of transmission vs wavelength of a coated ZnSe mirror that has a 50% transmission at a wavelength of about 9.25 microns, approximately 90% transmission at wavelengths of about 10.25 and 10.6 microns and approximately 70% transmission at a wavelength of 9.6 microns. These are the highest gain lines for $CO_2$ lasers. This mirror performance is well suited for a Q-switched laser feedback mirror if one was to be used in place of 408 in the laser head 400 of FIG. 13 because it transmits more of the undesired wavelengths out of the laser cavity, defined between FBM 406 and feedback mirror 408, if oscillation at a wavelength of 9.25 microns is desired.

Figure 17:
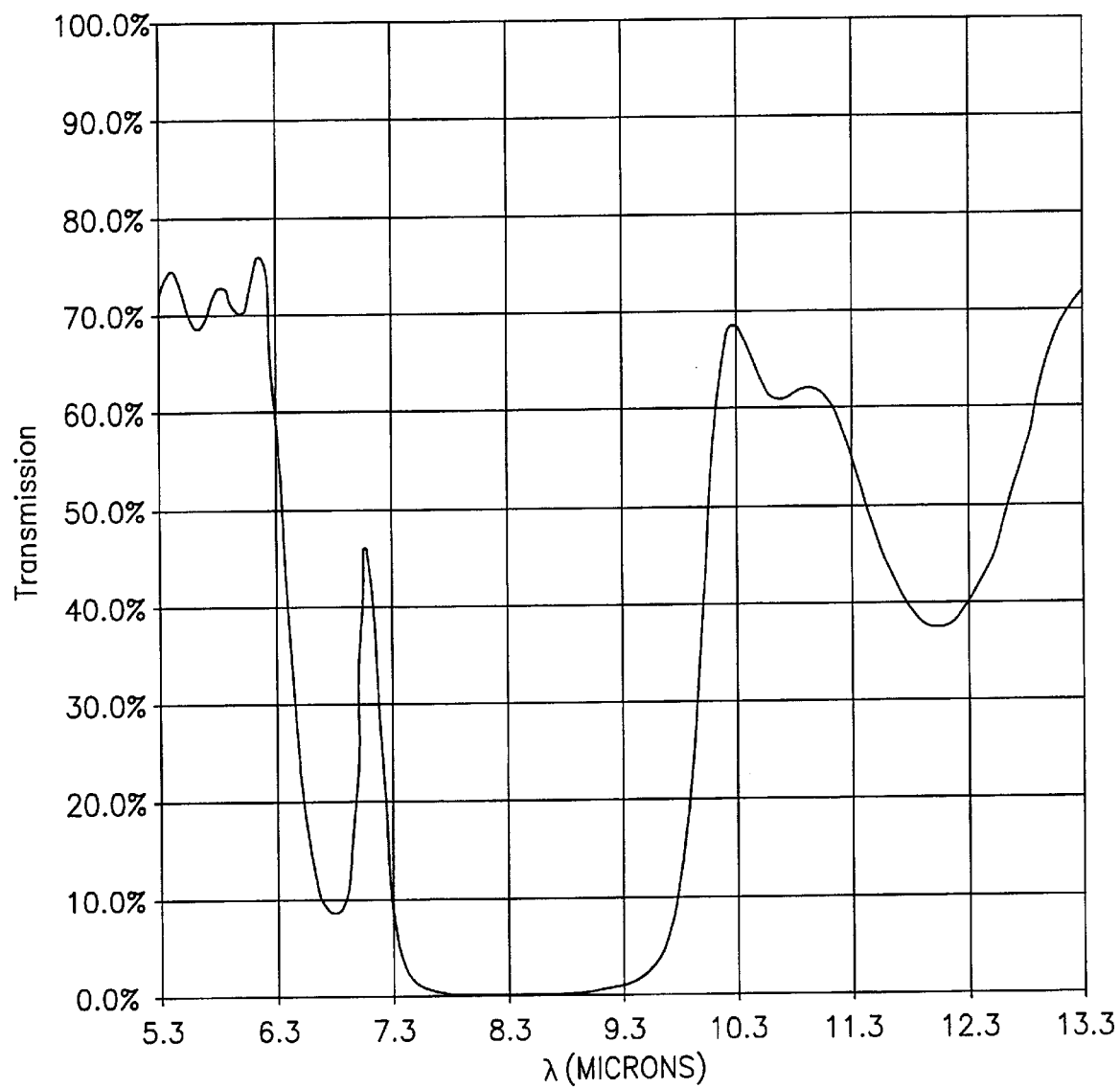
FIG. 17 is a graphical depiction of the transmission of a turning mirror for a $CO_2$ laser as a function of wavelength used in FIGS. 13, 14 and 18.

For the simultaneously Q-switched and cavity dumped laser, the mirror of FIG. 16 is not used. The discrimination against undesired gain lines is obtained by applying thin film reflecting wavelength coatings on one or more of the turning mirrors 416 so that they have higher reflectivity at the desired wavelength and lower reflectivity at the undesired wavelengths. This characteristic beneficially contributes to the oscillation at the desired wavelength while assisting in the prevention of oscillation at undesired wavelengths. It may not be necessary to coat all three of these mirrors, one can coat only as many as required to prevent undesired oscillation on other gain lines. FIG. 17 illustrates the functional relationship of the transmission vs wavelength of a ZnSe thin-film coated mirror that has only 1% transmission (i.e. 99% reflectivity) at a wavelength of 9.25 microns and higher transmission (i.e. lower reflectivity) at the higher $CO_2$ gain lines with wavelengths of 9.6, 10.25 and 10.6 microns. These specific characteristics favor the oscillation at a wavelength of 9.25 micron and discriminate against the oscillation on the other gain lines. This coating can also be used on turning mirrors $TM_1$, $TM_2$ and $TM_3$ 416 as required for additional wavelength discrimination.

Mirror 414 of FIG. 13 has high reflectivity at the desired wavelength (e.g. 9.25 microns). It none-theless transmits a small amount of radiation out of the cavity (about 1% or less at a wavelength of 9.25 microns). The small radiation output of mirror 414 is detected by a detector 302 such as a pyro-detector whose electrical signal 304 is fed to an Automatic Down Delay Circuit (ADDC) 306. The purpose of the ADDC 306 in the Q-switched case is to clip the long tail of the Q-switched laser pulse after a selected time delay, $\tau_{pc}$, from the beginning of the laser pulse. For the Q-switched cavity dumped case, the ADDC 306 is used to quickly take the voltage away from the EOM at the peak of the Q-switched pulse trapped between the mirrors 406 and 408. At this point the laser radiation contained between mirrors 406 and 408 is at a maximum. The voltage across the EOM converts the cavity to a high loss state and the energy within the cavity is dumped out of the cavity by the $TFP_1$ 404. In the cavity dumped case the ADDC must be faster than in the Q-switched case and its signal is fed directly to the HV switch instead of to the RS422 Pulse Receiver as in the Q-switched case. Mirror 406 directs the pulse to TFP2 and out of the laser housing to the workpiece. Mirror 414 and thin film polarizer 404 are hermetically sealed to the laser head.

Figure 18:
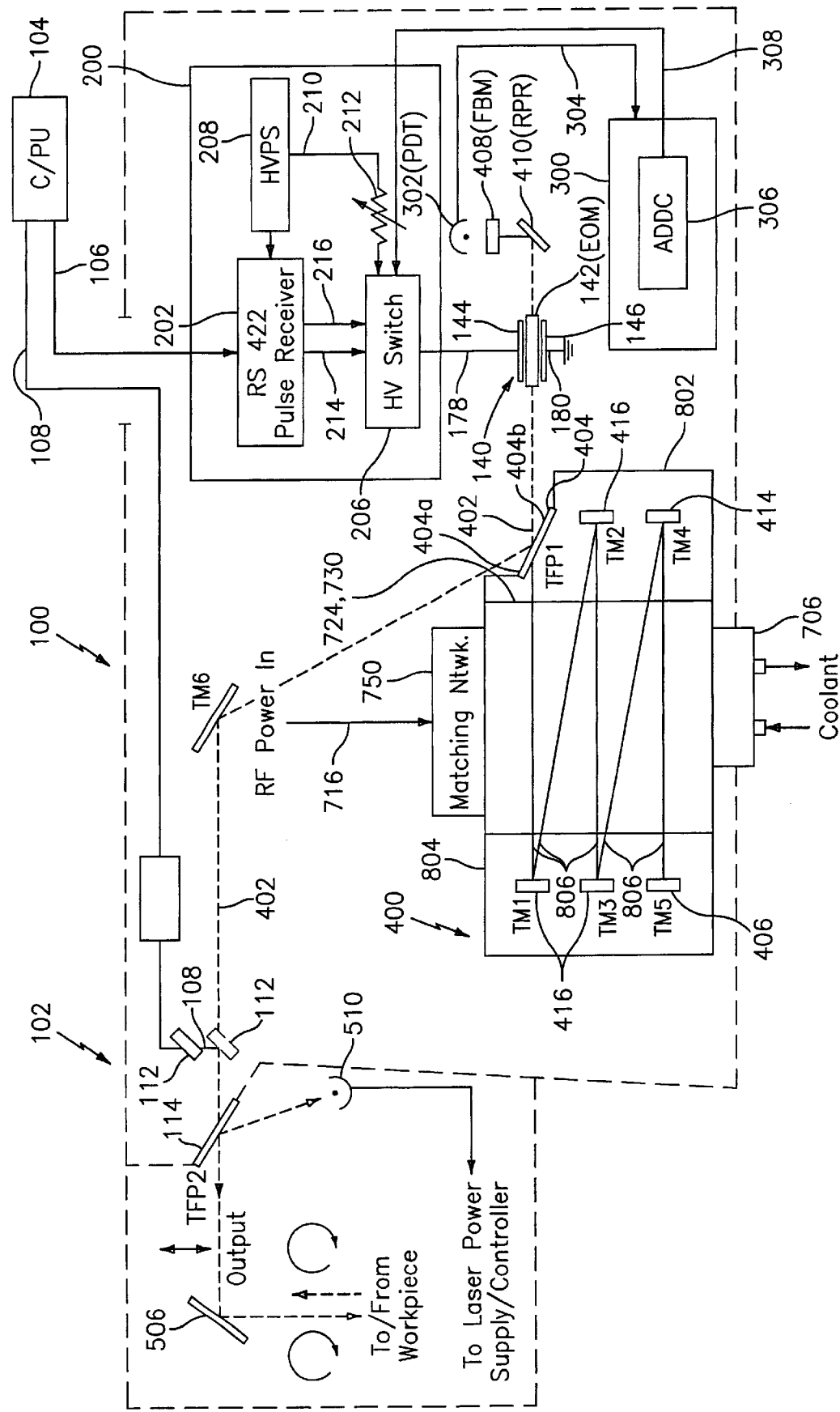
FIG. 18 is a second schematic diagram of a simultaneously Q-switched cavity dumped $CO_2$ laser system for material processing.

From a cost, reliability and vacuum integrity standpoint it is wise to minimize openings in a laser head that has to be hermetically sealed. Consequently, as seen in FIG. 18, one may use the option of having feedback mirror (FBM) 408 of FIG. 13 to have a small amount of transmission (about ½ to 1%) (i.e. by not using a metal coated mirror for example) and detecting this output radiation with the detector 302 for supplying the electrical signal 304 to the ADDC 306. This alternative allows mirror 414 to utilize the same mirror holder as for mirror 416, and allows mirror 414 to be placed inside the laser head 400 so that a hermetically sealing metal O-ring will not be required for mirror 414 since it no longer needs to emit radiation outside the laser head 400. It also allows mirror 414 to serve as an additional optical filter to discriminate against other wavelengths if needed. Both reflecting mirrors 406 and 408 are highly reflecting in order to trap the laser radiation within the laser cavity until released by the EOM.

Figure 25A:
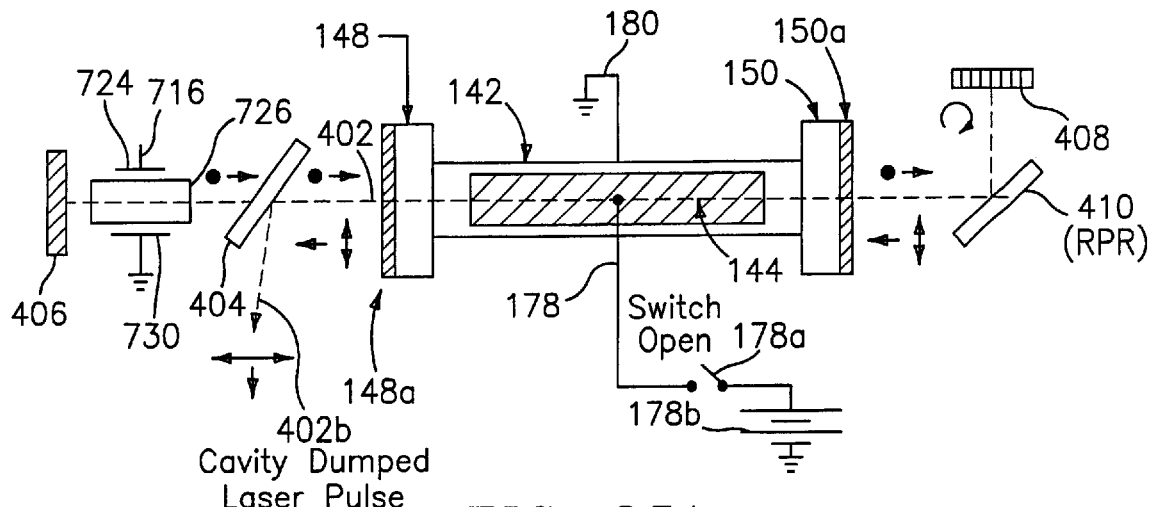
FIG. 25A is a second schematic diagram of an electro-optical modulator within a laser cavity with no voltage applied across the electro-optical crystal resulting in a state of high optical loss within the laser cavity.
Figure 25B:
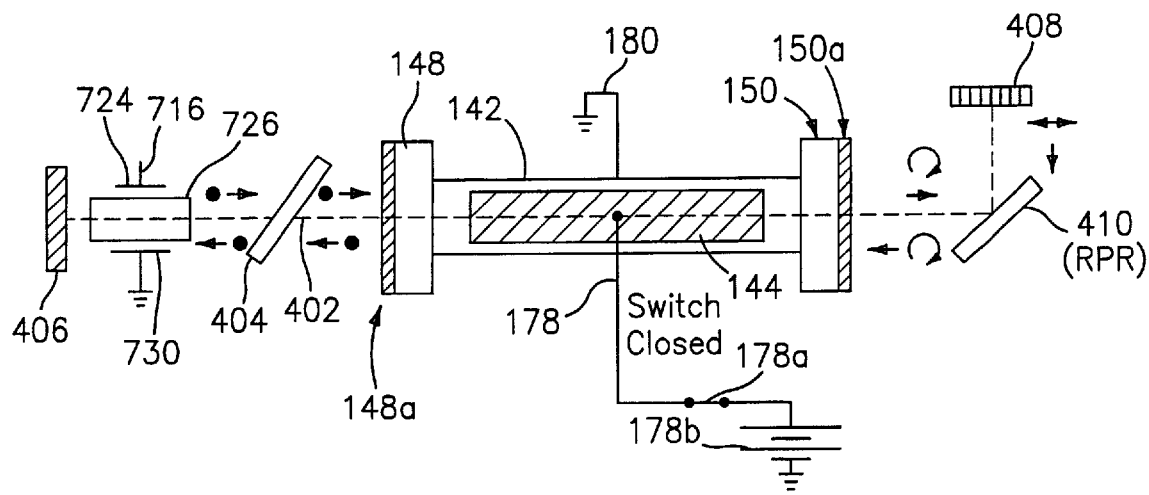
FIG. 25B is a second schematic diagram of an electro-optical modulator within a laser cavity with a nonzero voltage applied across the electro-optical crystal resulting in a state of low optical loss within the laser cavity.

The thin-film polarizer (TFP) 404 of FIGS. 13 and 18 serves the same function as the TFP 404 of FIGS. 24A and 24B and 25A and 25B as will be explained in the narrative associated with those figures. In FIGS. 24A and 24B, the laser radiation polarized perpendicular to the plane of the page passes through TFP 404 of FIGS. 25A–25B, 13 and 18, then it passes through an electro-optic modulator (EOM) 140 through a ¼ wave polarization rotator 412 to the FBM 408. In FIGS. 25A and 25B the polarization exiting TFP 404 passes through the electro-optic modulator 140 off the reflective phase retarder (RPR) 410 to the FBM 408. FIGS. 13 and 18 illustrate how the pulsed signal 106 from the laser head's power supply controller unit 104 is feed to the EOM 140 by a pulse receiver 202 such as a RS422 differential transistor/transistor logic (TTL) circuit. This circuit 202 provides good noise immunity for the rest of the electronics interfacing with the laser assembly 100 from the high voltage (i.e. several kV's) pulse switching circuit 206 that drives the EOM 140. The pulse receiver 202 provides electrical isolation by not having a common ground with the laser head 400. The high voltage power supply 208 provides DC power to both the pulse receiver 202 and to the switching circuit 206.

The power supply controller unit 104 of the laser system 100 provides signals to a driver 110 of an optical shutter 112 to block or unblock the output 402 from the laser head 400. This optical shutter is added so that the operator can manually open the shutter to operate the laser, as is well known in the art.

High Optical Damage Threshold Electro-Optic Modulator

Active optical CdTe crystals are utilized extensively as electro-optic modulators for $CO_2$ lasers. It is generally difficult to get anti-reflection coatings to adhere well to the entrance and exciting surfaces of the CdTe modulator crystals. These films can easily be damaged when inserted into $CO_2$ laser feedback cavities. Anti-reflection coatings are used to reduce optical losses when these crystals are inserted within a laser feedback cavity to switch the cavity losses from a higher loss condition (i.e. low cavity Q) to a low loss condition (i.e. high cavity Q). Peeling and optical damaging of these coatings by the intense laser radiation is a common damage failure for these modulators when used to Q-switch $CO_2$ lasers. Solving the thin film optical damage problem of the EO modulation crystals would result in a significant increase in the failure damage safety margin of Q-switched $CO_2$ lasers and in the material drilling systems in which they are utilized.

Figure 19:
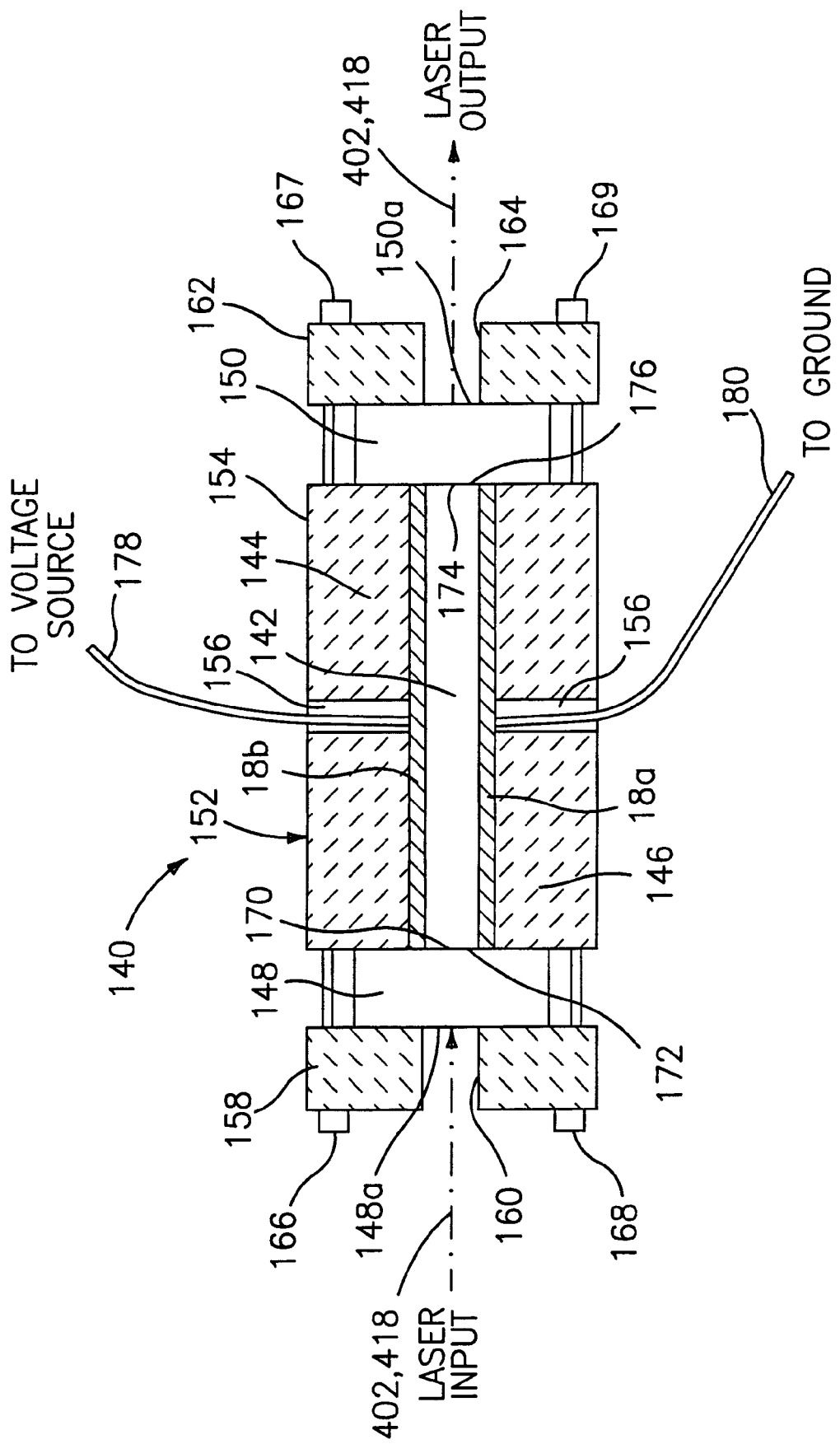
FIG. 19 is a first cross-sectional side view of an electro-optical modulator of FIGS. 13 and 18.

The anti-reflecting thin film damage problem is much less severe with passive optical IR window materials such as ZnSe or GaAs (U.S. Pat. No. 5,680,412, which is incorporated herein by reference). Since CdTe and ZnSe have refractive indices, n, which are close to one another (i.e. n=2.6 and 2.4 respectively) at $CO_2$ laser wavelengths, optically polished ZnSe windows can be placed in optical contact with the entrance and exit surfaces of a CdTe EO crystal and not experience high transmission losses through either direction of the CdTe/ZnSe interface. The losses for a ZnSe/CdTe/ZnSe electro-optical modulator structure are a little higher than for thin film coated CdTe EO modulators, but the trade-off between the improvement in the reliability of the laser and the slightly higher losses is worth it. FIG. 19 illustrates such a ZnSe/CdTe/ZnSe EO modulator structure at 140. High optical damage threshold anti-reflection thin film coatings on ZnSe are easily deposited and are commercially available. Item 142 is the CdTe EO crystal and items 148 and 150 are the ZnSe transparent windows in optical and thermal contact with the CdTe EO crystal 142.

The problem experienced in the deposition of anti-reflection coatings on CdTe is believed to arise from the fact that in order to get good adherence films, the CdTe needs to be heated to a high enough temperature so as to cause the material to decompose; i.e. Te is driven off of the surfaces of the CdTe crystal 142 to be coated. This leaves a Cd enriched surface that presents an electrical conducting path between electrodes 146 and 144 of the EO modulator of FIG. 19. Under the high voltage applied to the electrodes of the CdTe crystal 142 this poor electrical conducting path along the surfaces of the crystal causes electric current to flow between the electrodes 144, 146 which in turn causes non-uniform heating at the interface of the thin film anti-reflection coatings and the CdTe crystal surface. This leads to a weakened bond between the two materials. In addition, the periodic stress imposed by the pulsating laser radiation also contributes to the optical damage in the poor bond between the anti-reflecting films and the CdTe substrate, which causes the Q-switched laser performance to deteriorate with time. ZnSe can be heated to the necessary temperature for the deposition of good adherence anti-reflecting films without decomposition of the material. It is fortuitous that the refractive index between ZnSe and CdTe crystals is sufficiently close so as to yield low optical losses at their contacting surfaces if these two materials are placed in optical contact.

FIG. 19 illustrates in a side view of the basic components of an electro-optical modulator 140 containing, for example, a CdTe crystal 142 having conductive electrodes 144, 146 applied on opposite sides thereof. The CdTe crystal 142 is disposed between two transparent windows 148, 150 whose refractive index matches or comes close to matching the crystal 142. For the case of the CdTe EO crystal, ZnSe is suitable. The outer faces 148a and 150a of the transparent windows 148, 150 are anti-reflection coated. It is assumed that the deposition of a high optical damage threshold thin film coating on crystal 142 is difficult if not impossible while such coatings are easily depositable on windows 148, 150. The EO modulator housing 152 includes dielectric support member 154, which has an opening 156 so that electrical contact can be made to electrodes 144, 146. The EO modulator housing 152 has end support members 158, 162, each having an opening 160, 164 through which laser radiation 402 can pass through the window/EO crystal assembly. End members 158, 162 are secured to member 154 by fasteners 166, 167, 168, 169. The laser beam 402 is positioned with respect to the optical axis 418 of crystal 142 for amplitude or phase modulation.

Figure 20:
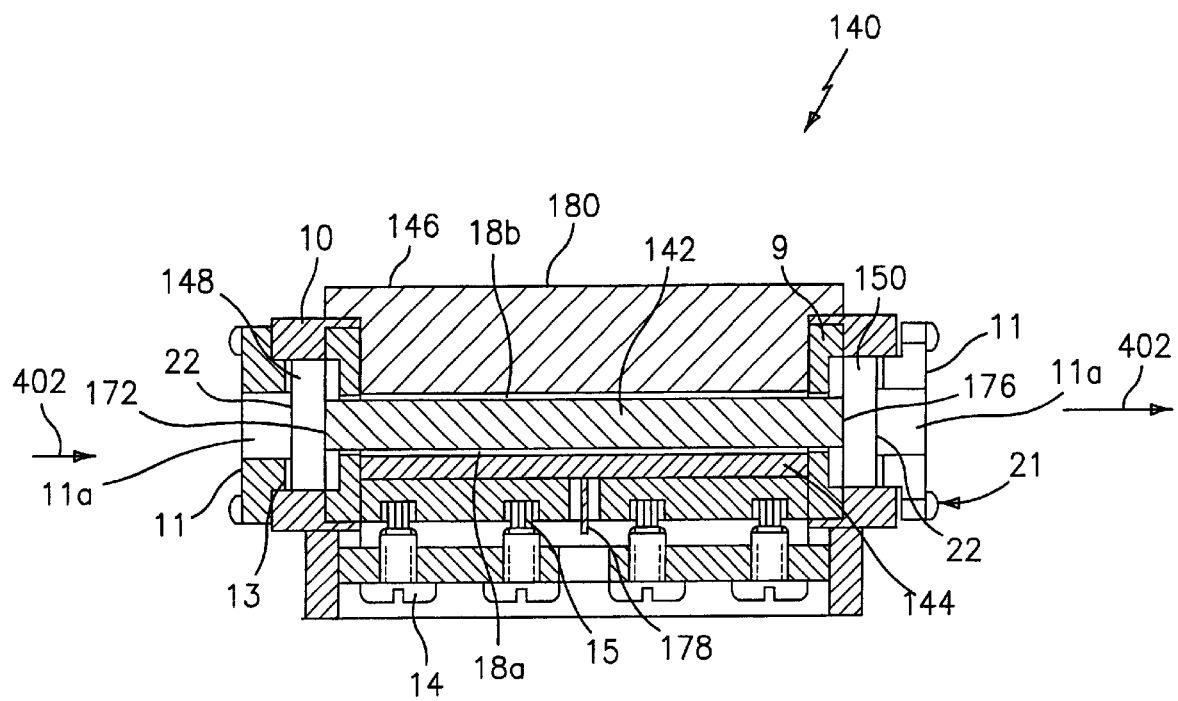
FIG. 20 is a second cross-sectional side view of an electro-optic modulator illustrating greater detail than in FIG. 19 on how not to stress the electro-optic modulator crystal.
Figure 21:
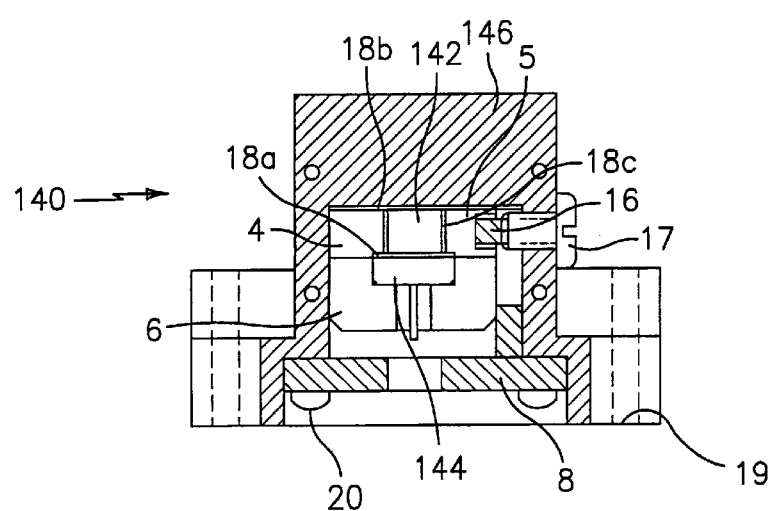
FIG. 21 is a cross-sectional end view of an electro-optical modulator of FIG. 21.

FIGS. 20 and 21 illustrate side and end views, respectively, of the EO modulator assembly 140 in greater detail. Since CdTe is birefringent, mechanical stress can cause changes in the polarization rotation. Consequently, to obtain optimum optical performance, it is important not to stress the EO crystal 142 by holding it so tight that normal thermal expansion and contraction will stress the crystal 142 thereby causing changes in the polarization of the laser radiation propagating through the crystal 142, independent of any voltage applied across the crystal 142. The crystal 142 is contained in a metal housing 2, which is fabricated, for example, of Aluminum (Al). Item 18b is a thin (e.g. 0.10 inches in thickness) cushion, such as an Indium strip, which is placed between the metal housing 2 (which serves as a ground electrode) and the CdTe crystal 142 and the ceramic spacers (items 4 and 5). Item 18a is also a thin cushion, such as an Indium strip, that is placed between the CdTe crystal 142 and the entire length of the hot copper electrode 144. A spring associated with screws 17 provide cushions for the crystal 142 from being over stressed by the tightening of bolts 14 and 17. Since CdTe is also a piezoelectric material, the Indium strip also acts as an acoustic absorber for the ultrasonic energy generated by the CdTe crystal as the voltage is repetitively applied and removed across the crystal 142. This acoustic absorption is important for proper operation of the CdTe electro-optic modulator 140. The electrically "hot" positive electrode 144 is pressed against the EO crystal 142 by a dielectric 6, which has a hole in it to enable making an electrical contact to the hot electrode 144. The dielectric 6 is spring loaded 15 so as to gently press the hot electrode 144 against the EO crystal 142 by the threaded bolts 14. The bolts 14 are threaded through a metal cover 8 fabricated from the same material as the metal housing 2. This cover 8 is bolted into the metal housing 2 by bolts 20. There is a thin plate 18c of Indium metal between the metal housing 2 and the EO crystal 142 and between dielectrics 4 and 5 and the EO crystal 142 to cushion the crystal 142 against the housing 2, to absorb the acoustic energy generated by the piezoelectric action of the CdTe crystal 142 when the voltage is repetitively applied and removed from the crystal 142 and also to ensure good electrical contact between the electrodes and the EO crystal 142. Dielectrics 4, 5 hold the EO crystal 142 sideways, again by spring action 16 upon which pressure is exerted by the threaded bolt 16. Optically polished transparent windows 148, 150 are pressed up against the optically polished end faces 172, 176 of the EO crystal 142 by the use of wave springs 13 which are compressed by the retainer spring holder 11 by bolts 21. The retainer spring holder 11 has a hole 11a in it to provide passage of a laser beam 402 through the ZnSe window/CdTe EO crystal/ZnSe window arrangement 172, 142, 176. The outer surfaces 22 of the transparent windows 148, 150, which are not in contact with the EO crystal end faces 172, 176, are coated with an anti-reflection coating to minimize optical transmission loss through the structure 140. Items 9 and 10 are an insert and a window holder, respectively, to ensure that excessive compression cannot be directed toward the transparent window 148, 150 and crystal interface. Springs 15 and 16 are used to prevent stressing the CdTe crystal 142 so that its birefringence does not cause undesired rotation of the polarization of the laser radiation passing through the crystal 142.

Maintaining Zero DC Bias on CdTe EO Crystals for Q-Switched/Cavity Dumped IR Lasers CdTe electro-optic modulator crystals contain traces of impurities at very low concentration levels, which adversely affect the performance of these crystals in electro-optical modulator applications. The concentrations are so low that they are difficult to control in the crystal growing process. Consequently, the yield in growing these crystals with the same phase retardation performance for a given applied voltage from crystal to crystal is not high, especially if the crystal is operated by requiring that an external DC bias be maintained across the crystal for a long time. The reasons why these impurities adversely effect EO modulator performance in Q-switched lasers are as follows. It is well known that the voltage, $V_o$, required to be placed across an EO crystal in order to change the phase of the optical radiation propagating therethrough by ½λ (or 180 degrees) is given by:

$$V_o = \frac{\lambda_o}{2n_o^3 r_{41}} \times \frac{d}{l} \quad (1)$$

where $\lambda_o$ is the wavelength of the radiation ×10$^{-4}$ cm, $$\frac{d}{l}$$

is the aperture/length ratio of the crystal, $n_o$ is the refractive index of the crystal (=2.6 in CdTe) and $r_{41}$ is the electro-optic coefficient (=6.8×10$^{-10}$ cm/volt in CdTe) (A. J. Beauliea; *Transversely Excited Atmospheric Pressure CO$_2$ lasers*, Applied Phys. Letters, Vol. 16, pg. 504–506, June 1970, which is incorporated herein by reference). Typically a CdTe crystal of d=0.5 cm and l=5 cm requires a voltage of $V_o$=4.35 kV to obtain ½ λ phase retardation.

Figure 22:
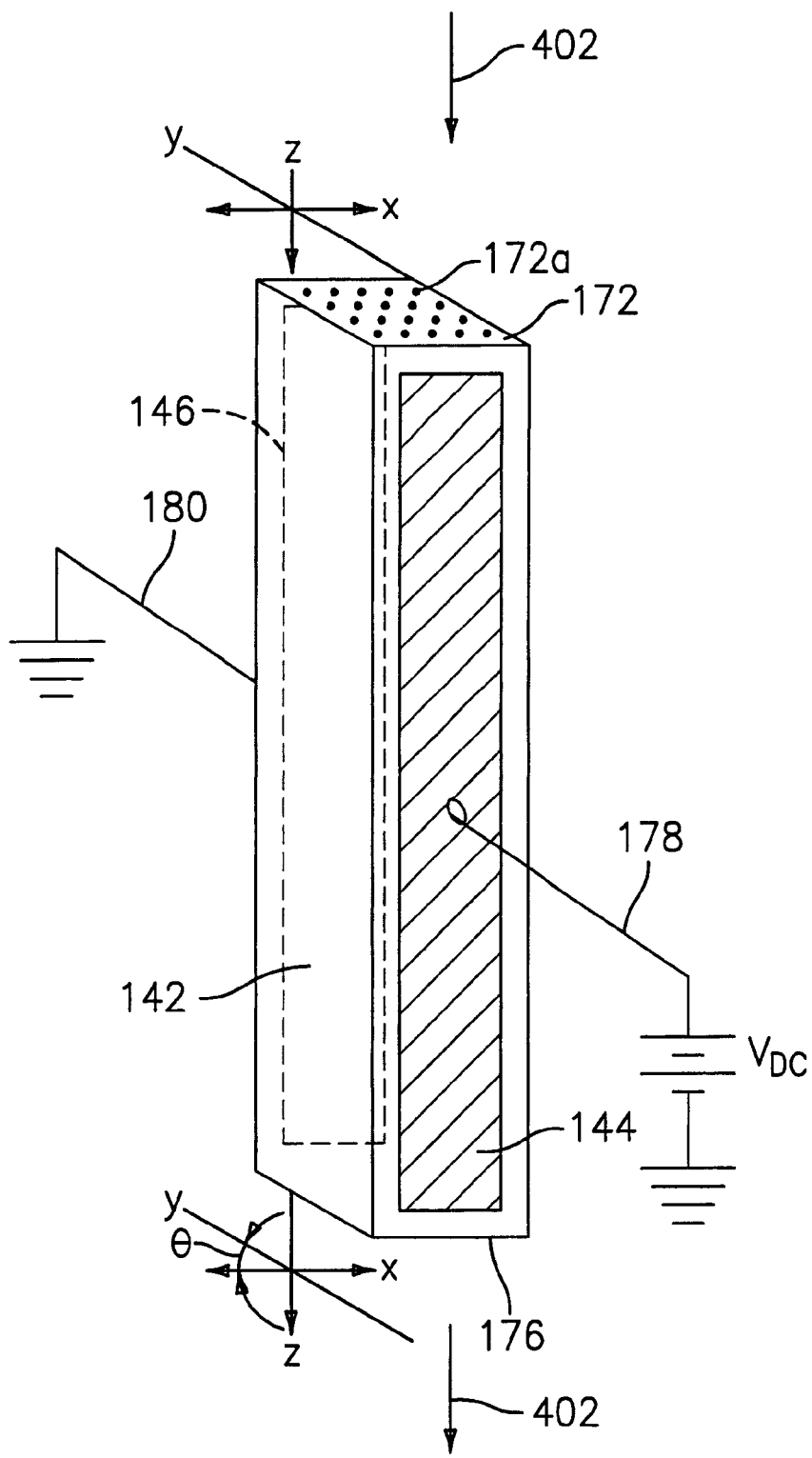
FIG. 22 is a diagram of the arrangement of an electro-optic crystal receptive of a laser beam and subject to a constant applied voltage.

When a DC voltage calculated from Eq. 1 is applied across a crystal 142, as illustrated by FIG. 22, the residing charge carriers within the crystal 142 move slowly through the crystal 142 and become captured within the unevenly distributed traps caused by the aforesaid impurities. Besides being unevenly distributed, the sizes of the traps also vary. These localized, captured charges set-up a DC bias within the crystal 142. This in turn causes variations in the phase retardation suffered by the radiation propagating through the crystal 142 as a function of the location of the propagation path through the crystal 142. In addition, these internally generated phase retardations vary with ambient temperature and with time. The yield in producing crystals that do not demonstrate these effects is low and consequently the cost is high for obtaining crystals having acceptable performance. These problems have been a big influence toward limiting the application of Q-switched CO$_2$ lasers to primarily military applications and not toward industrial applications.

An approach that addresses the difficulties discussed above in order to obtain a Q-switched CO$_2$ laser suitable for industrial material processing applications is disclosed that ensures that an external DC bias is not required on the EO crystal 142 in order to obtain a high loss state within the laser cavity 406, 408. FIG. 22 illustrates an experimental arrangement to determine the effects, at various locations across the face 172 of a crystal 142, of the trapped charges on the polarization of the optical radiation propagating through a CdTe crystal 142, at a given time and temperature, when subjected to a ½ λ retardation DC voltage. Such a variation in polarization across the face of the crystal 142 is indicated by the surface 182 of FIG. 23. If the crystal were perfect, one would obtain a 180° rotation of the polarization vector such that the polarization exiting of the crystal would equal the >polarization entering the crystal 142. Instead a rotation of the polarization by a phase angle, θ, varying from spot to spot 172a across the face 172 of the crystal 142 is found.

Figure 23:
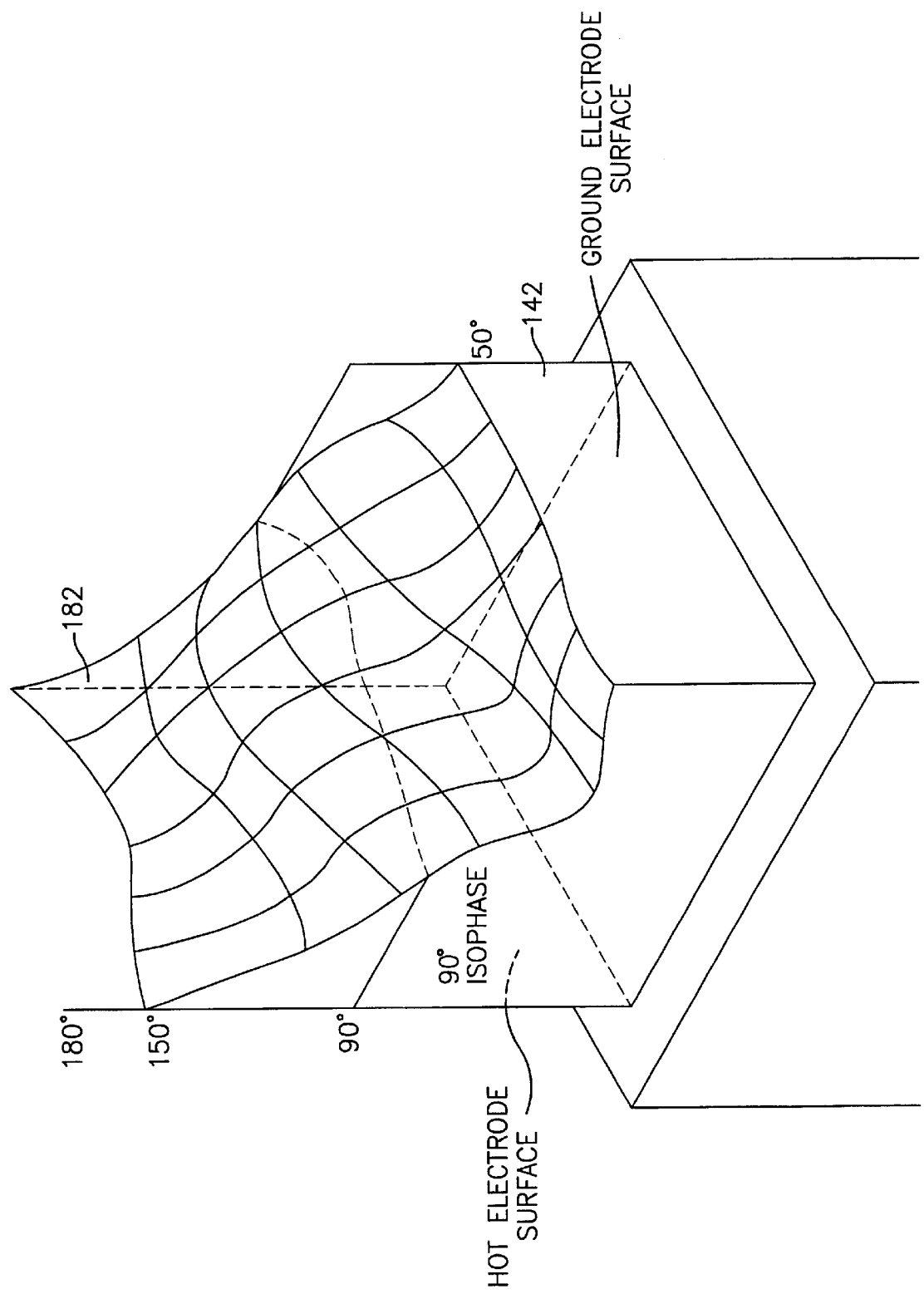
FIG. 23 is a graphical depiction of the variation in the optical phase shift in the laser beam passing through the electro-optical crystal of FIG. 22 as a function of position across the face of the electro-optical crystal.

FIG. 23 illustrates phase retardation data taken on a CdTe crystal subjected to a 4,400V DC bias voltage. Note the large variation away from the uniform 180° phase retardation that would be expected from a perfect crystal. Under this situation, one has no choice but to select a given location over the face of the crystal and adjust the voltage to obtain the desired phase retardation. This results in the use of a narrow laser beam whose diameter is much smaller than the cross sectional area of the crystal. If a large beam is used, then different portions of the cross section of the beam would experience different phase retardations as the beam progresses through the crystal. This effect would also require that each Q-switched laser must have the voltage and location across the EO crystal be individually adjusted to obtain the required phase retardation. Because of the nature of the trapped charges not being tightly captured and the fact that they have a slow mobility, the phase retardation shown in FIG. 23 varies with time and the temperature of the crystal. This compounds the difficulty of using EO Q-switched lasers in industrial applications. In addition, if the polarity of the applied DC voltage is reversed, an entirely different phase retardation pattern across the face of the crystal is obtained.

One approach to getting around these CdTe material problems in order to obtain a CO$_2$ Q-switched laser suitable for industrial material processing applications comprises operating the EO modulator under a zero DC voltage condition during the high cavity optical loss portion of the pumping interval of the Q-switching cycle indicated in FIGS. 47A and 47B. The DC voltage is only applied to the CdTe crystal 142 during the short time of the pulse output interval shown in FIGS. 47A and 47B when the cavity loss is low (i.e. the cavity has a high Q). The short time that the voltage is applied to the crystal prevents the charge carriers from congregating in traps and generating an internal DC bias unevenly across the crystal 142.

The arrangement for operating CdTe crystals 142 with no external DC voltage applied to the EO modulator crystal 142 and inserted within a Q-switched laser is shown schematically in FIG. 24A. The output beam of a CO$_2$ laser having highly reflecting mirrors 406 and 408 is polarized parallel to the plane of the metal electrode 730 that is exposed to the gas discharge within the laser gain medium 726 as it leaves the laser gain medium. Consequently, in the side view shown in FIG. 24A, the optical electric field is polarized perpendicular to the plane of the paper as shown with the dots "●" in FIG. 24A. A thin film polarizer (TFP) 404, is inserted between the laser gain medium 726 and the high optical damage threshold EO modulator assembly 140 as shown in FIGS. 24A and 24B. The TFP 404 is positioned so that the optical radiation 402 polarized perpendicular to the plane of the paper propagates through the TFP 404 with minimum optical losses (FIGS. 24A and 24B). However, optical radiation 402 polarized in the plane of the paper does not propagate through TFP 404 (FIG. 24A). Polarization in the plane of the paper is shown by the arrows "⇆" and "↕" Radiation exiting to the left of TFP 404 passes through the laser gain medium 726, partially reflected back into the laser gain medium 726 by the partially reflecting mirror 406, and back through TFP 404 into the CdTe EOM assembly 140.

In FIG. 24A, the radiation 402 polarized perpendicular to the plane of the paper emitted by the laser gain medium 726 propagates through the TFP 404 and continues through the high damage threshold ZnSe/CdTe/ZnSe EO modulator assembly 140 of FIGS. 19, 20, 21 and 22 and a polarization rotator 412 such as a quarter wave plate. The ¼λ plate 412 is utilized to convert linear polarization to circular polarization as shown by the circular arrows "↺," "↻." Other polarization rotating devices can also be used, such as quarter wave rhombs, prisms or reflective phase retarders.

The linearly polarized beam 402 propagating through the ¼λ plate 412 in FIG. 24A becomes circularly polarized and is in turn reflected off the reflecting mirror 408 back through the ¼λ plate 412 thereby experiencing another 90-degree rotation in polarization. The optical radiation propagating back toward the ZnSe/CdTe/ZnSe EO modulator assembly 140 is now polarized parallel to plane of the paper. This radiation propagates through the EO modulator assembly 140 back toward the TFP 404. The TFP 404 reflects this polarization component out of the laser cavity 406, 408. This in effect maintains a high loss condition for the laser cavity 406, 408 with no voltage applied to the EO crystal 142. This high loss condition prevents the laser from oscillating which in turn enables the population (i.e. the gain) in the upper laser level to build-up to a much larger than normal value. This population build-up acts as an optical energy storage process for the laser. This optical stored energy is released by applying a voltage to the EO modulator crystal 142 in order to induce a ¼λ (i.e. 90 degree) polarization rotation. This arrangement avoids the phase retardation variation problems caused by the impurities within the CdTe material as mentioned previously.

The switch to a low cavity loss condition of the laser cavity 406, 408 can be made to occur as follows. The spontaneous emission radiation emitted by the laser gain medium 726 that is polarized perpendicular to the plane of the paper as shown in FIG. 24B, propagates through the TFP 404 and through the high optical threshold ZnSe/CdTe/ZnSe EO modulator assembly 140. The difference this time is that a voltage applied to the EO modulator 140 provides a 90-degree (i.e. ¼λ) polarization rotation to the radiation exiting to the right of the EO crystal 142. The voltage applied in this arrangement is ½ of $V_o$ of Eq. 1 because the radiation makes two passes through the EOM crystal 142. Consequently, the radiation leaving the EO modulator 140 is circularly polarized. When this circularly polarized radiation propagates through the ¼λ plate 412, it becomes linearly polarized in the plane of the paper as shown in FIG. 24B. This linearly polarized radiation is reflected from the reflecting mirror 408 as linearly polarized light, back through the ¼λ plate 412, which again rotates the radiation by 90 degrees and converts it to circular polarization. This circularly polarized light is directed back through the EO crystal 142. Since a ¼λ voltage is still experienced by the CdTe crystal 142, the circular polarization is again rotated by 90 degrees, which converts the radiation back to the original polarization perpendicular to the plane of the paper as seen in FIG. 24B. This polarized radiation is propagated through the TFP 404 into the laser gain medium 726 and amplified therein. The optical intensity within the laser cavity 406, 408 can now build up rapidly thereby depleting the larger than normal optical energy stored in the upper laser level which results in a short, high peak power laser output pulse 402a. By the above described process, the radiation is rotated 360 degree by making two passes through the EO modulator 140 and the quarter wave plate 412. This radiation build up constitutes the Q-switched process of a simultaneously Q-switched cavity dumped laser operation. The removal of the voltage from the EOM crystal converts the laser cavity to a high loss condition by dumping the Q-switched pulse radiation out of the cavity by the TFP 404. This output pulse constitutes the cavity dumped pulse.

Reflective phase retarders have found extensive applications in the laser material processing industry to avoid variation in the Kerf width (or cross-section of the laser cut) caused by how the linearly polarized laser beam making the cut in the material is oriented with respect to the direction in which the beam is traveling. It is well known that the orientation of the polarization in relation to the direction of the cut significantly affects the cut cross-section. The conversion of the linear polarization into circular polarization eliminates the cross-section variation of the laser cut with direction of travel of the laser beam. RPRs are capable of handling the intensity within a laser cavity and are preferred for use in Q-switched $CO_2$ lasers suitable for industrial material processing applications. FIGS. 25A and 25B illustrate the use of a RPR 410 in place of the ¼λ plate 412 of FIGS. 24A and 24B. The explanation for the RPR 410 is the same as for the quarter wave plate 412.

FIGS. 25A and 25B illustrate the operation of a Q-switched cavity dumped laser with a 90 degree reflective phase retarder device 410 in place of the ¼λ plate of FIGS. 24A and 24B. The alignment of the RPR 410 is not very sensitive where as the alignment of the laser's reflecting mirror 408 with the lasers partially reflecting mirror 406 is sensitive. Consequently, the reflecting mirror 408 and the RPR 410 can be pre-aligned and placed in one housing (not shown). This housing can then be aligned with respect to the partially reflecting mirror 406.

The above paragraphs describe the low loss condition of FIG. 47A. FIG. 47B shows the corresponding time sequence of the CWRF power and the high voltage applied to the EOM in the Q-switched laser operation. The ¼λ DC voltage can be applied and subsequently removed in a periodic or random "on-command" pulsed format to obtain trains of cavity dumped pulses. The low loss enables the large energy stored in the upper state of the laser medium and within the cavity to be emitted in a single cavity dumped pulse of radiation with several orders of magnitude greater peak power over the continuous wave average power and more than one order of magnitude greater peak power over the RF super pulsed pumped operation of $CO_2$ lasers. The pulse widths obtained in the cavity dumped mode of operation is equal to the round trip time light requires to transit between the feedback cavity mirrors 406, 408.

Multiple Passes to Reduce EO Crystal Size and Voltage Requirements

The larger the EO crystal that is required, the more difficult it is to obtain good quality crystals. Furthermore, the cost of the crystal increases with size. On the other hand, the smaller the ratio of d/l, in Eq. 1, the lower the voltage, $V_o$, required to be applied across the crystal to obtain the desired polarization rotation. Consequently, making two or more passes through the crystal is, in many cases, advantageous from the standpoint of cost or from the standpoint of the reduction in the DC voltage applied across the crystal. This is so in spite of the additional optical losses suffered by multiple passes through the window/crystal/window assembly; assuming that one does not increase d appreciably in order to utilize the multiple pass approach.

Figure 26A:
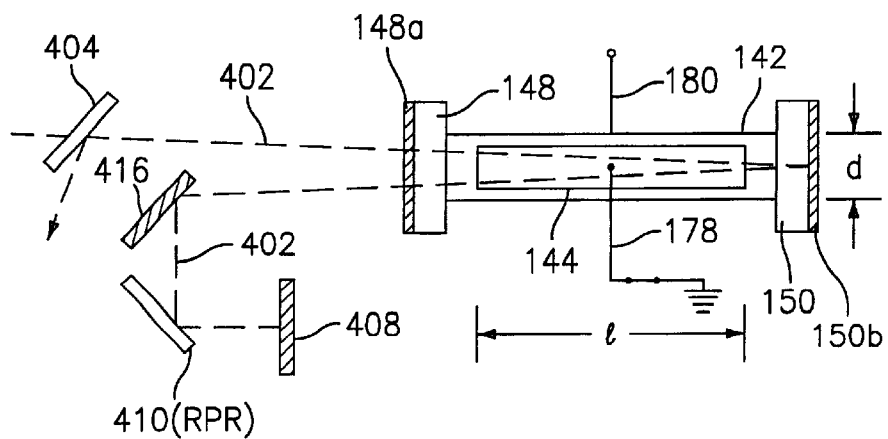
FIGS. 26A, 26B and 26C depict multiple pass configurations of the electro-optical modulator of FIGS. 24A–25B.
Figure 26B:
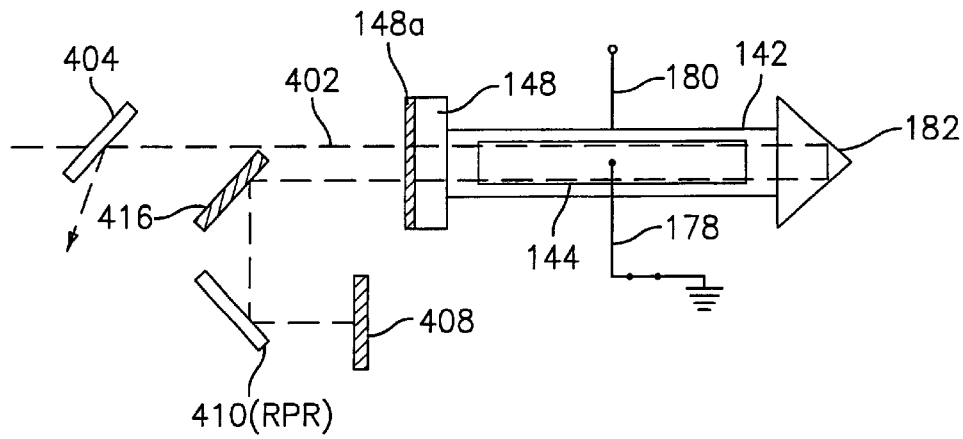
Figure 26C:
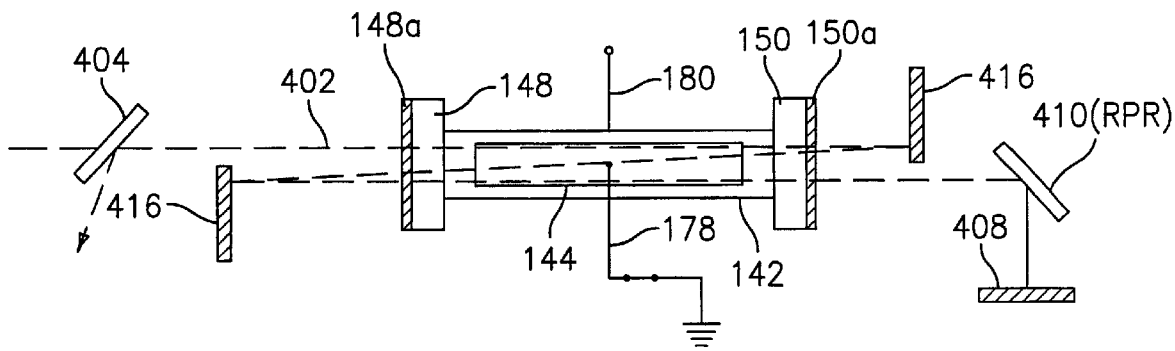

FIGS. 26A, 26B and 26C illustrate some multiple pass configurations in a side view format. FIG. 26A illustrates a double pass configuration with a high reflection coating 150b deposited on the outer surface of the ZnSe window 150 furthest from the gain medium 726. The ZnSe window 148 closest to the laser gain medium 726 is coated with an anti-reflection coating 148a. If d remains the same as in the single pass configuration of FIGS. 24A, 24B, 25A and 25B, then one has the choice of reducing l by ½ so that a shorter crystal is utilized, or, if l remains the same, as in the above single pass configurations, then the double pass configuration of FIGS. 26A and 26B reduces the voltage, $V_o$, by ½ for the same phase retardation. By this process one can reduce the voltage by ⅓ for the triple pass configuration of FIG. 26C.

FIG. 26B illustrates another version of the double pass EO modulator 140. This version utilizes a ZnSe prism 182 replacing the ZnSe window 150 and the reflecting coatings 150b thereon shown in FIG. 26A. The double pass versions require ½ $V_o$ of Eq. 1 to be applied to the EO crystal 142 for an 180 degree phase retardation, whereas the triple pass version of FIG. 26C requires ⅓ $V_o$ to be applied; assuming the d/l ratio of the EO crystal 142 is maintained constant. For a 90 degree phase retardation, the voltages required are ¼ $V_o$ for a double pass and ⅙ $V_o$ for a triple pass arrangement of the crystal 142.

The inclusions of the TFP 404 and the RPR 410 optical components are also indicated in FIGS. 26A, 26B and 26C. The ¼λ plate 412 of FIGS. 24A and 24B or other polarization retardation devices can also be used in place of the RPR devices 410.

Automatic Down Delay Circuit

Figure 27:
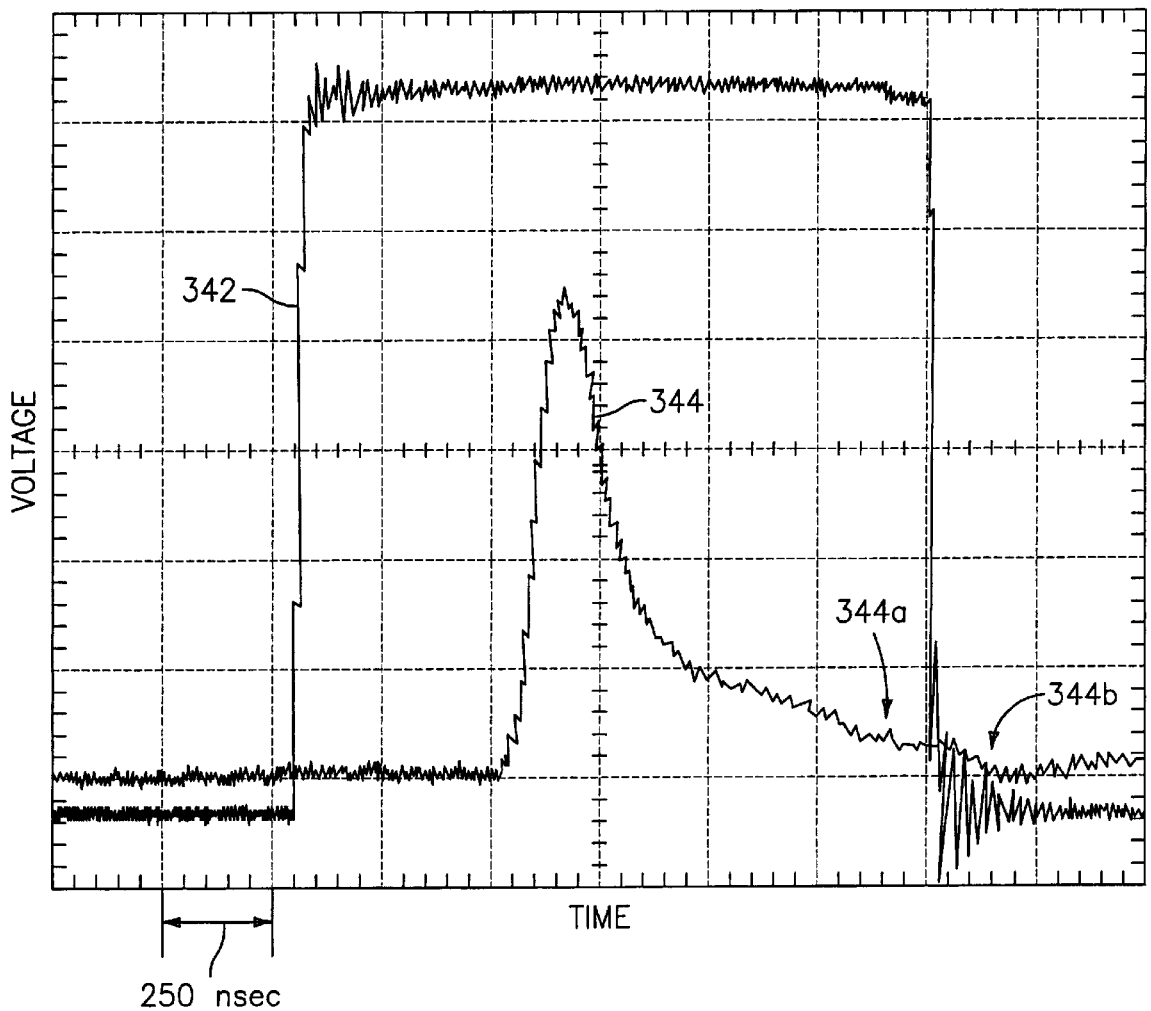
FIG. 27 is a first graphical depiction of oscilloscope traces of a high voltage pulse applied to an electro-optical crystal in a Q-switched laser and the resultant output pulse of the laser.

FIG. 27 illustrates the experimental operation of a RF CW pumped Q-switched laser system. The square shaped waveform 342 is the high voltage pulse applied to the CdTe EO crystal 142 by the switching circuit 206 of FIGS. 13 and 18. The pulse-like waveform 344 of FIG. 27 is the Q-switched output pulse of the laser displaying a long tail 344a. The horizontal scale is 250 nsec per major division. Both waveforms are bandwidth limited in this figure. The peak voltage of the high voltage pulse 342 applied to the CdTe EO crystal 142 is 2.7 kV and its width is approximately 1.5 microsec. Approximately 500 nsec after this voltage is applied to the EO crystal 142, laser action is initiated. The average power of the Q-switched output pulse 344 of the laser, at a 20 kHz pulse repitition frequency (PRF) for the voltage pulse applied to the crystal 142, and with a long tail, is approximately 15 W for 110 nsec wide pulses. This yields about 6.8 kW of peak power per pulse (15W. ($110 \times 10^{-9}$ sec$\times 2 \times 10^4$ Hz)). The energy per pulse is approximately ¾ mJ. Notice that the pulse 342 extends out to beyond 1 microsecond because of the long tail 344a. This tail 344a contains appreciable energy which can circumvent the advantages of using short laser pulses to drill holes or mark or encode stressed glass containers or surfaces, or to perforate or drill small holes in paper or plastic. Notice also that when the high voltage 344 applied to the EO modulator crystal 142 goes to zero the laser pulse 344 is clipped or truncated at 344b. At 20 kHz, and with tail clipping such that liffle or no pulse tail occurs, the average laser power experimentally obtained was 10 W with pulse energies of approximately 0.5 mJ per pulse.

A function of the Automatic Down Delay Circuit (ADDC) 306 of FIGS. 13 and 18 is to realize the full benefit of short Q-switched laser pulses in material processing applications, such as drilling, by truncating the long tails 344a of the Q-switched laser pulses. In the simultaneously Q-switched cavity dumped arrangement, the ADDC is used to remove the voltage from the EOM, thereby dunping the radiation out of the laser feedback cavity as previously described in FIGS. 5, 7, 8, 12, 13 and 18. In the cavity dumped mode arrangement a long tail does not occur. This prevents unnecessary heating of the material during processing, such as hole drilling. The use of Q-switched pulses with tail clipping has not been previously utilized in industrial material processing applications such as via hole drilling of printed circuit boards.

Figure 28:
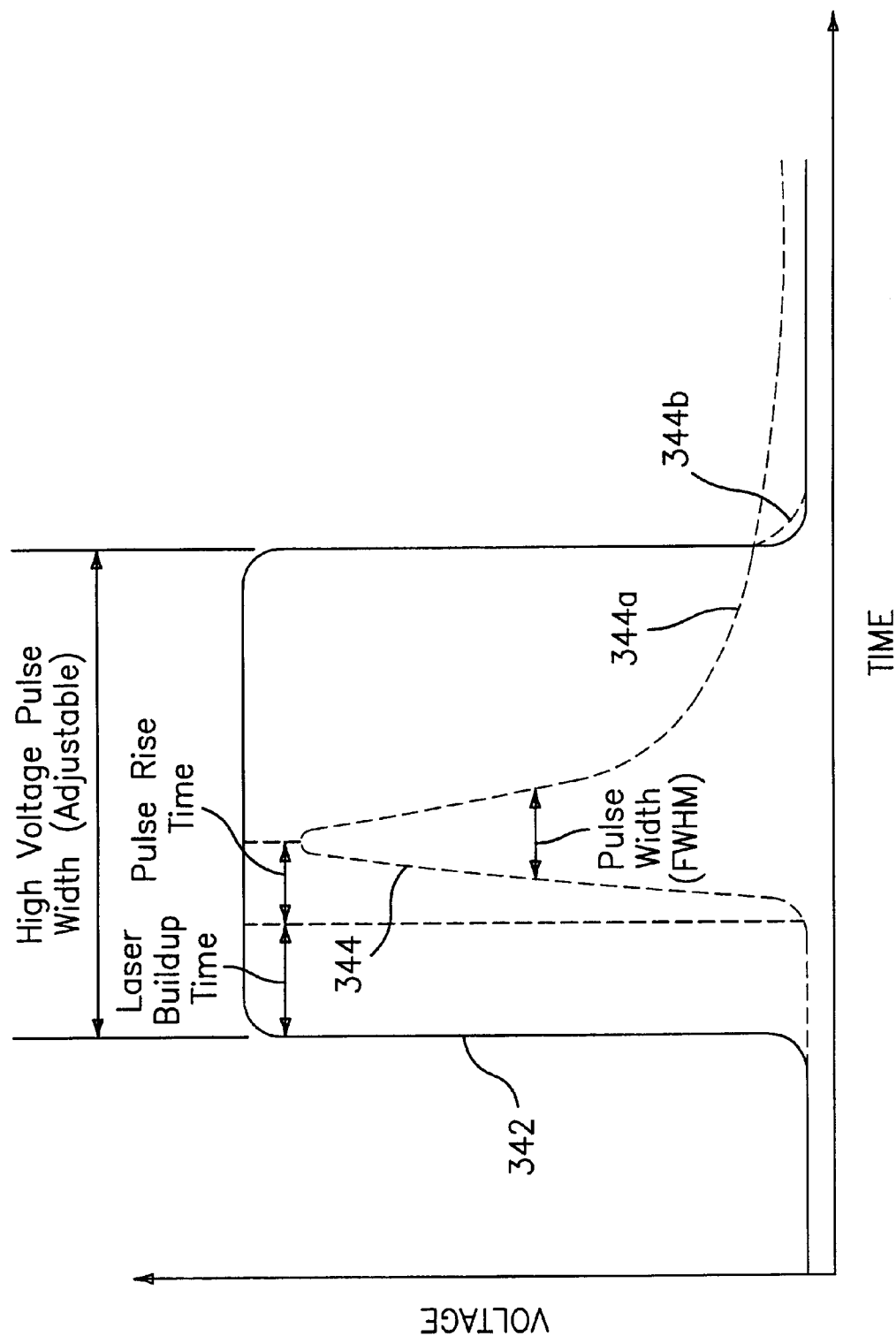
FIG. 28 is a second graphical depiction of a high voltage pulse applied to an electro-optical crystal in a Q-switched laser and the resultant output pulse of the laser.

One method by which to clip or truncate the tail of the laser pulses 344 in the laser system of FIGS. 13 and 18 is depicted by FIG. 28. FIG. 28 follows the data shown in FIG. 27. The width of the high voltage pulse 342 applied to the EO crystal 142 is preselected or adjusted at a set value so as to obtain approximately the desired amount of tail clipping of the long tail Q-switched laser pulse 344. This is accomplished when the switching circuit 206 turns off the pulse 342. The turning off of the high voltage pulse 342, causes the laser to transition from a low loss state to a high loss state, thereby causing laser oscillation to cease. By preselecting or adjusting the width of the high voltage pulse 344, the amount of tail clipping can be preselected or varied as desired, yielding a laser shape and pulse width (LPW) at the half power points as shown in FIG. 28. FIG. 31 again shows the tail clipping that can be accomplished with the ADDC circuit in a Q-switched laser. It is apparent from FIG. 28 that if the clipping occurs at the peak of the Q-switched pulse, then the front end of the pulse stored within the laser cavity is available to be dumped out of the cavity in a time equal to the round trip time light propagates within the cavity of the systems illustrated in FIGS. 13 and 18.

For some applications this Q-switched pulse width preselection or adjustment approach may not be suitable because of the variation that can occur in the laser oscillation build time (BT), which generates the Q-switched pulse 344, and pulse rise time (PRT). BT is the time required for the Q-switched pulse 344 to build up out of spontaneous emission after the laser has transitioned from a high loss state to a low loss state by the application of the high voltage pulse 344 to the EO crystal 142. The laser pulse rise time (PRT) and the laser buildup time (BT) can vary primarily due to gain changes that can occur within the laser medium. This can be caused by the aging of the laser, variations in the temperature of the laser head 400, varying the pulse repetition rate, loss changes within the laser feedback cavity 406, 408, the amount of applied RF power 716 driving the laser head 400 because of power line variations, and in the variation in the polarization of the laser radiation 402 caused by changes in the EO modulator 140. All of these effects will cause a variation in the amount of laser pulse tail clipping that will occur when utilizing the preselected high voltage pulse width approach. The largest variation will occur when the pulse repetition rate of the laser is changed.

Figures 29A, 29B:
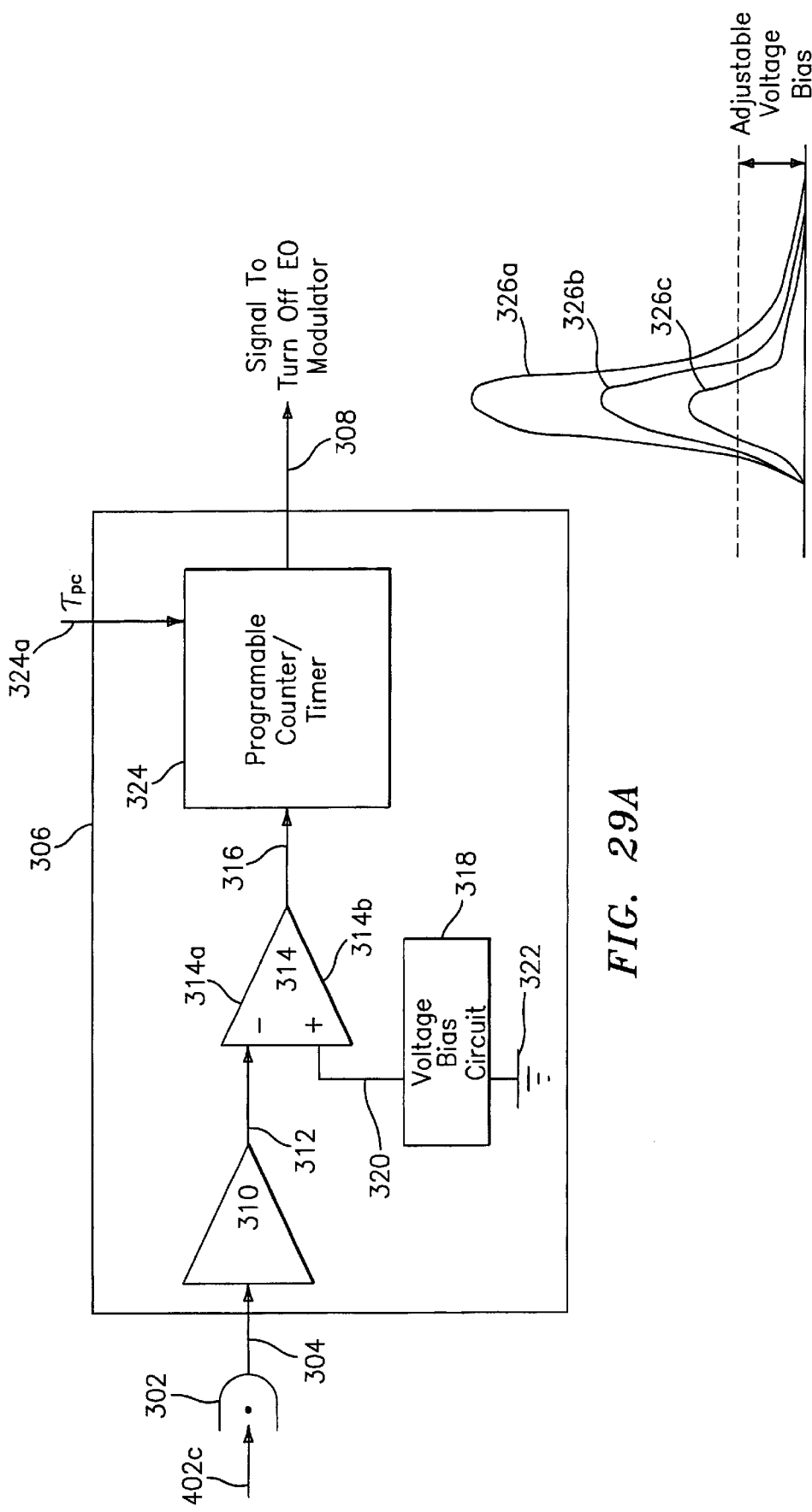
FIG. 29A is a first schematic diagram of an electronic circuit for truncating a portion of the output pulse in a $CO_2$ Q-switched laser.
FIG. 29B is a graphical depiction of the variations in the triggering of the output of the circuit of FIG. 29A as a function of the variations in the rise time and amplitude of the output pulse in a $CO_2$ Q-switched laser.

Another method of tail clipping in Q-switched lasers is illustrated by FIGS. 29A and 29B. This laser pulse tail clipping approach offers less variation in pulse length with changes in laser gains and/or pulse repetition rate. This approach can be utilized in the laser systems depicted in FIGS. 13 and 18 for industrial material processing applications.

In the ADDC of FIG. 29A, radiation 402c emitted by either mirror 414 in FIG. 13 or FBM 408 of FIG. 18 is detected by an optical detector 302 such as a pyro-detector.

An output electrical signal 304 of the detector 302 is applied to the input of one or more cascaded preamplifiers 310. The output signal 312 from the preamplifier 310 is applied to one input terminal 314a of a voltage comparator 314. An adjustable DC bias 318, 320 is applied to the other input terminal 314b of the voltage comparator 314. When the pulsed signal 312 from the preamplifier 310 exceeds the voltage bias level 320, the voltage comparator 314 provides an output signal 316 to a programmable timer 324. Programmable gate arrays can be configured to perform the programmable timing or counting function of the timer 324. Provision is made at 324a to allow the laser operator to manually provide the appropriate time delay, $\tau_{pc}$, of the programmable timer 324, thereby enabling the laser operator to select how much of the Q-switched tail 344a is clipped. After the selected time delay, $\tau_{pc}$, the programmable timer 324 emits a signal 308 to the pulse receiver 202 or the switching circuit 206 of FIGS. 13 and 18. This turns off the high voltage 342 applied to the EO crystal 142 thereby transitioning the laser from a low loss state to a high loss state and causing the laser action to cease.

Since the beginning of the sequence for issuing the signal 308 to clip the tail 344a of the Q-switched pulse 344 is started by detecting the Q-switched pulse itself and not by the beginning of the high voltage pulse 342 as in FIG. 28, the approach of FIG. 29A is not sensitive to the laser oscillation build up time (BT) of FIG. 28 and therefore provides a better control of the laser pulse width (LPW).

As illustrated in FIG. 29B, as the Q-switched pulse rise time and/or Q-switched pulse amplitude changes, shown at 326a, 326b and 326c, there is some variation in the time at which the timer 324 starts running because of changes in the laser pulse rise time (PRT). Changes in the laser pulse rise time and amplitude will occur because of the same reasons given above. This approach will cause a much smaller variation in the laser pulse width (LPW) than the approach of FIG. 28.

If the LPW variation provided by the approach of FIGS. 29A and 29B still cannot be tolerated in the application of interest, a third method of tail clipping is illustrated by FIGS. 30A and 30B. In FIG. 30A, the comparator 314 issues a signal 316 at a pre-selected position on the Q-switched pulse. Examples of possible pre-selected pulse positions are at 50% of the pulse rise time or at the peak of the pulse. In FIG. 30A, a detector 302 is used to detect the Q-switched pulse 402c. The electrical output signal 304 of the detector 302 is provided to one or more cascaded preamplifiers 310. The output signal 312 of the preamplifier 310 is split in two signals 312a, 312b. One signal 312a is propagated through a time delay, $\tau_S$ device 328, which yields a signal $S_1$ 330 as shown. Signal $S_1$ has the pulse shape shown at 340a in FIG. 30B. The time delay, $\tau_S$, of up to about 60 nsec was found to be adequate. The other signal 312b is propagated through an attenuator 336, which provides a signal $S_2$ 338 as shown. Signal $S_2$ has the pulse shape shown at 340b in FIG. 30B. Signal $S_1$ along with a negative DC bias voltage 334 is applied to one input terminal 314a of the voltage comparator 314. Signal $S_2$ is applied to the other input terminal 314b of the comparator 314. When the value of signal $S_1$ equals the value of the signal $S_2$ (340c of FIG. 30B), the voltage comparator 314 issues a signal 316 to the timer 324. After the time delay, $\tau_{pc}$, at 324a, the programmable timer 324 issues the signal 308 to the pulse receiver 202 or switching circuit 206 of FIGS. 13 and 18 to turn off the high voltage 342 being applied to the EO modulator 140 of FIGS. 13 and 18. The turning off of the high voltage 342 applied to the EO modulator 140 causes the laser cavity to transition from a low loss state to a high loss state, thereby stopping the laser action and clipping the Q-switched laser pulse tail 344a. The amount of the tail clipped is determined by the time, $\tau_{pc}$, applied to the programmable timer 324 at 324a by the operator of the laser system. Currently, none of these pulse tail clipping approaches have been used in material processing applications. FIG. 31B illustrates the relationship of the signals S1 and S2 provided to the voltage comparator 314.

Figure 31A:
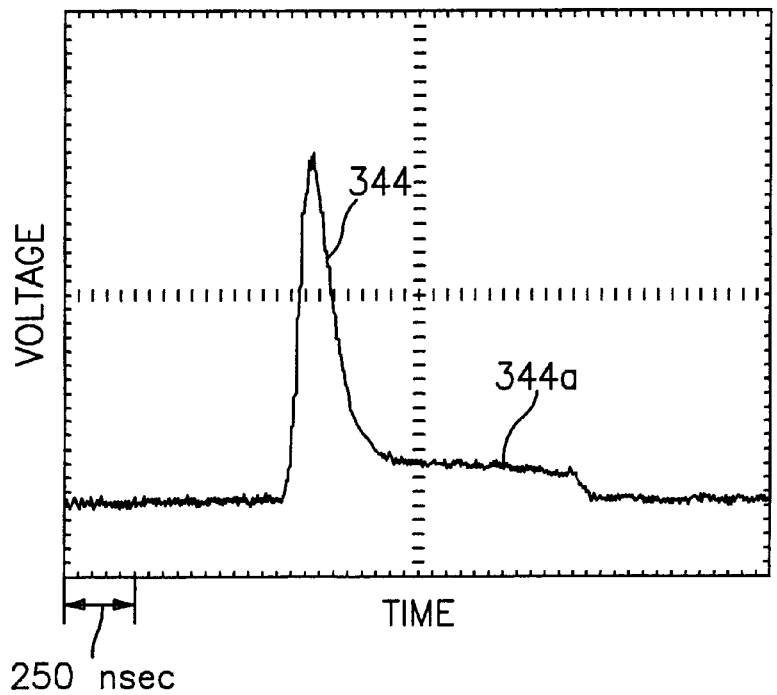
FIG. 31A is a graphical depiction of an oscilloscope trace of the output pulse of a $CO_2$ Q-switched laser with a long tail.
Figure 31B:
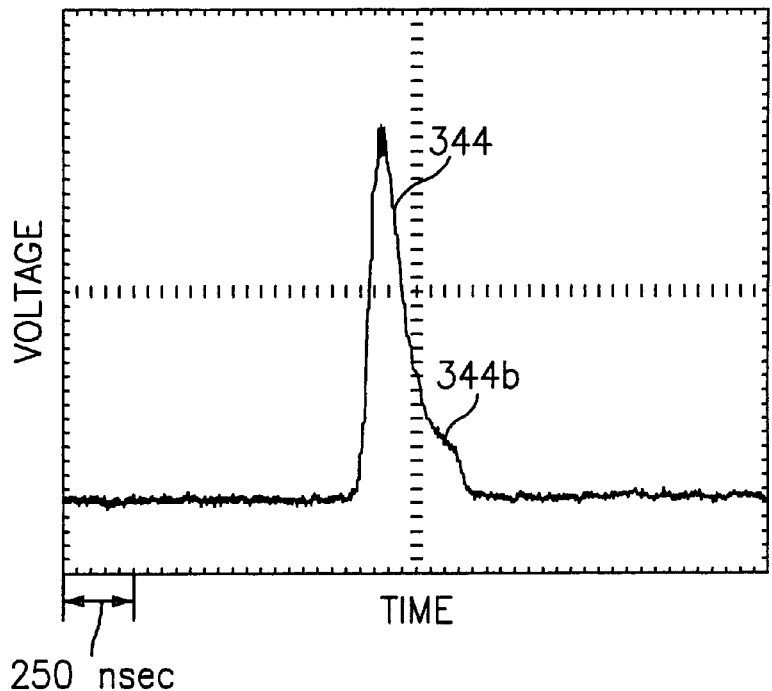
FIG. 31B is a graphical depiction of an oscilloscope trace of the output pulse of a $CO_2$ Q-switched laser with a truncated tail.
Figure 33A:
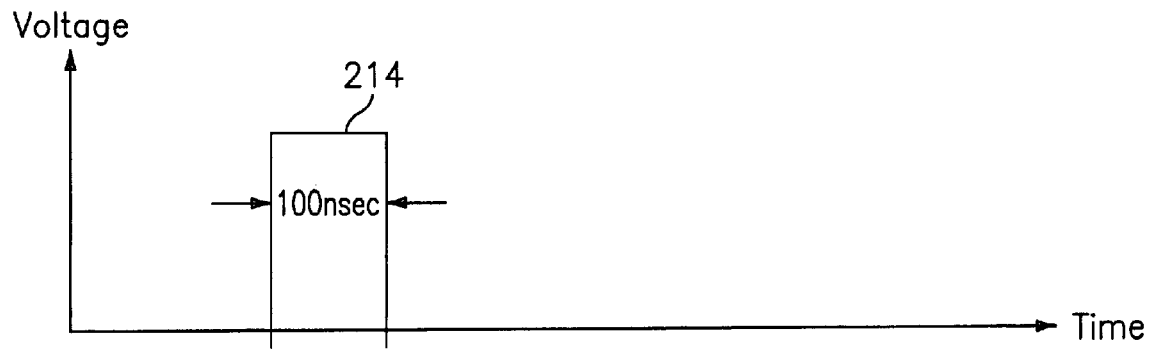
FIGS. 33A, 33B, 33C and 33D are graphical depictions of the relative timing of the charging and discharging signals, the high voltage signal applied to an electro-optical modulator and the resultant output pulse of a Q-switched laser.
Figure 33B:
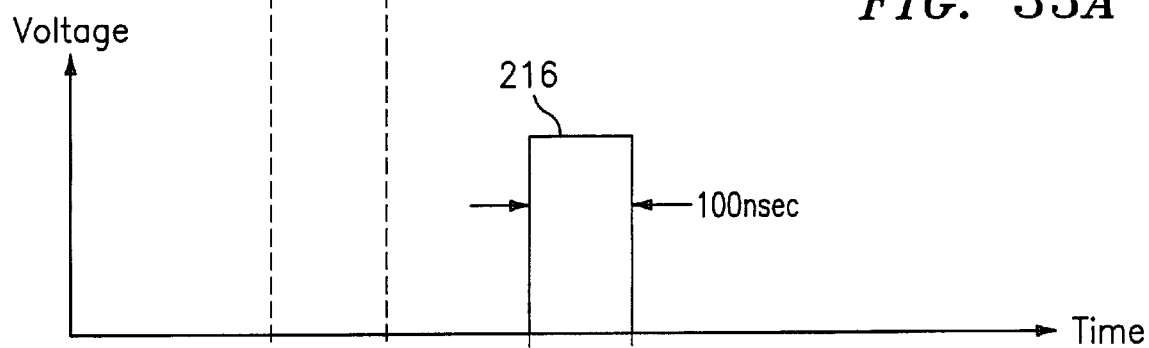
Figure 33C:
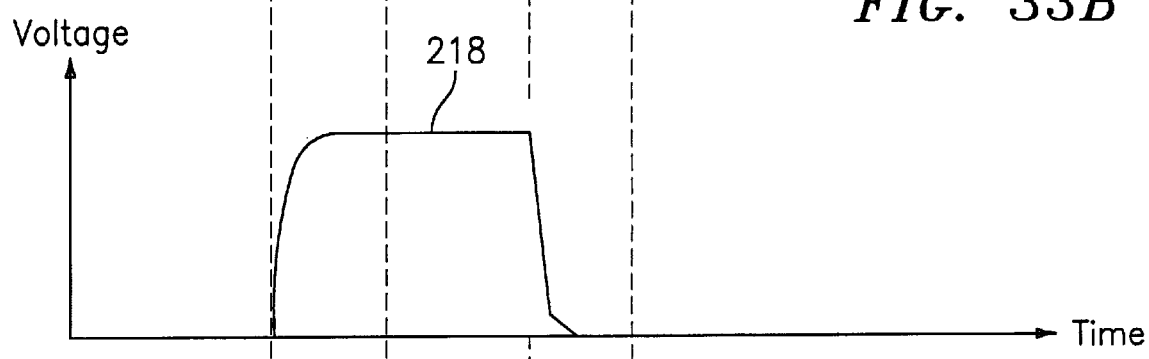
Figure 33D:
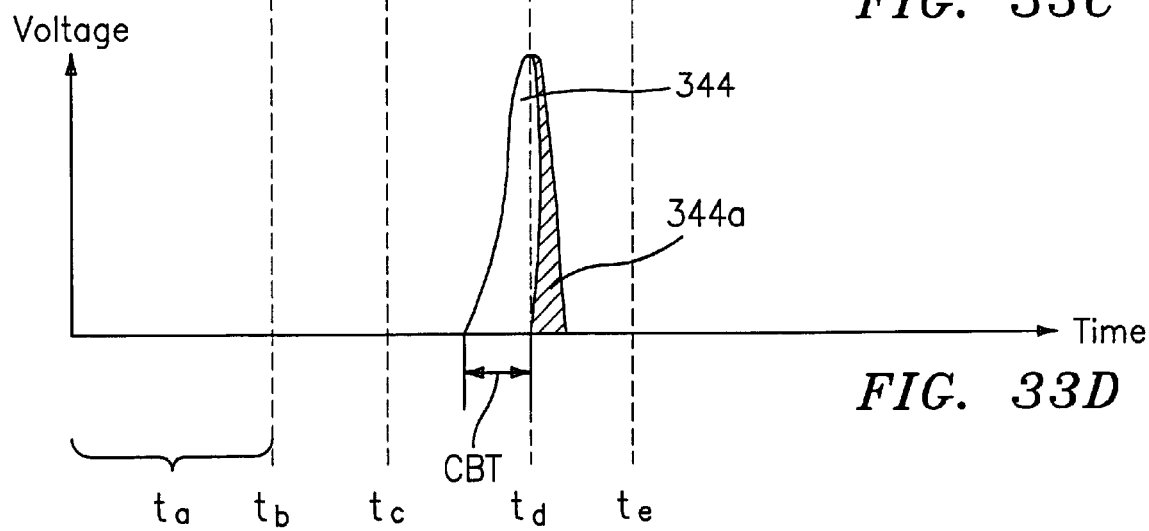

FIGS. 31A and 31B illustrate typical Q-switched pulses utilizing the ADDC 306 of FIG. 30A. The data is not bandwidth limited. The data was taken with a HgCdTe detector (not shown) at the output of the laser housing 102 of FIG. 13 or 18. FIG. 31A shows an approximately 1.1 microsecond pulse length at the baseline including the long tail. By decreasing the value of the delay, $\tau_{pc}$, in the programmable timer, a short pulse tail 344b is obtained as illustrated in FIG. 31B. In this case, the total Q-switched pulse width at the baseline is now about 450 nsec. The Q-switched pulse width at the half power points of the pulse is 100 nsec for both cases. The data in FIGS. 31A and 31B was taken at a PRF of 20 kHz for the voltage 342 applied to the electro-optic crystal 142.

In the housing arrangement for the ADDC 306, high electromagnetic interference (EMI) immunity is desired because of the closeness of the nearby high voltage pulse circuitry required to drive the EO crystal 142. The EMI immunity is obtained by inserting the detector 302 and the rest of the ADDC circuitry 306 within a tightly sealed metal housing 346 and its cover 348 and making exceptionally good electrical contact to the covers and electrical connectors that enclose the circuitry 306 within the metal housing 346 and its cover 348.

Figure 34:
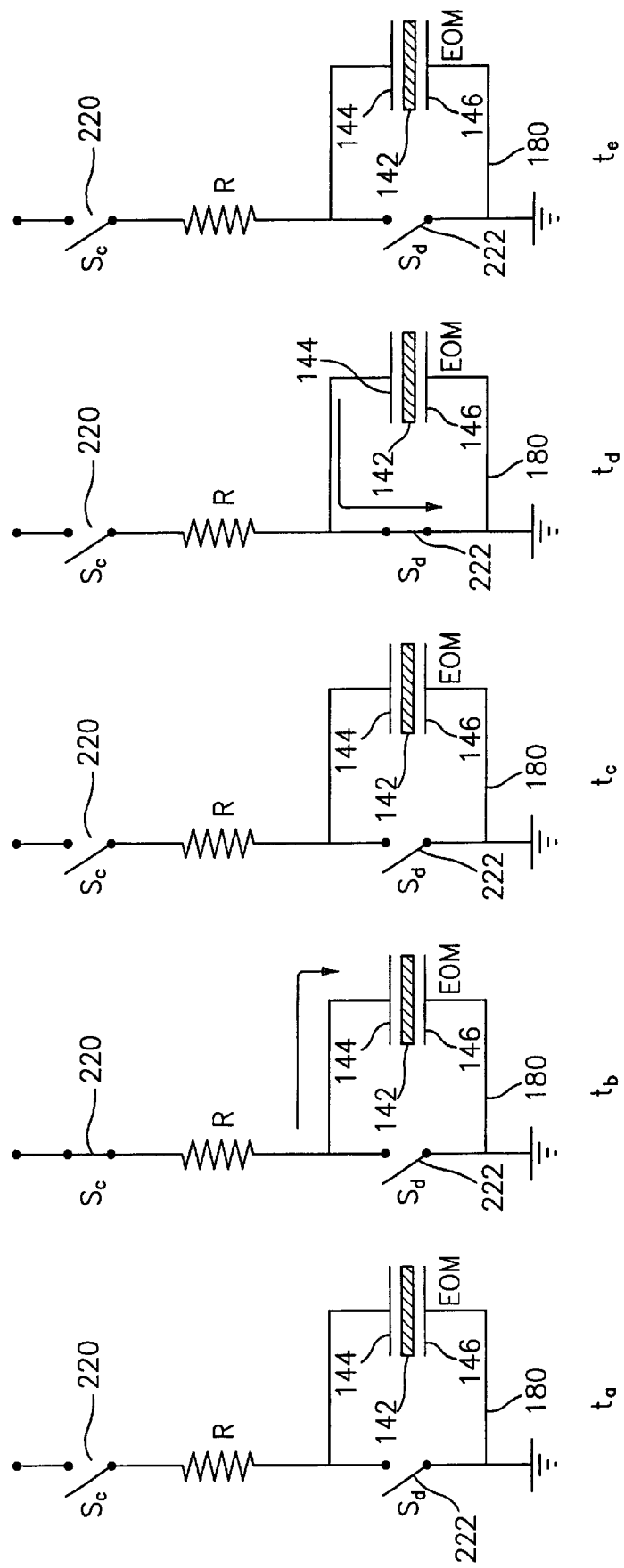
FIG. 34 is an electrically equivalent schematic diagram corresponding to FIG. 33 utilizing the positions of mechanical charging and discharging switches to explain the switching circuit processes for an electro-optic modulator in a Q-switched laser.

FIGS. 32A and 32B present a side and end views that illustrate where the ADDC 306 components are placed within the metal housing 346. In FIG. 32A, item 348 is the top metal cover and item 356 is the rear metal cover. These are tightly bolted onto the metal housing 346 with good electrical contact gaskets (not shown) between the covers 348, 356 and the housing 346 to eliminate spurious electrical signals from getting into or out of the housing 346. Item 350 is a DC to DC converter to convert 28 volts DC from the controller 104 to the appropriate DC voltage value to power all the circuits of the ADDC 306. The DC to DC converter 350 is placed on the signal processing printed circuit board 352. This printed circuit board 352 contains the programmable gate arrays and associated components comprising the programmable timer 324. Item 354 is an electrical connector that provides electrical signal access into and out of the laser housing 102. The Q-switched laser pulse tail-clipping signal 308 from the ADDC 306 is delivered to the pulse receiver 202 through this EMI protected connector 354. Item 358 is the printed circuit board that contains the preamplifiers 310, the time delay, $\tau_S$, 328 the attenuator 336, the DC bias 332 and the voltage comparator 314 circuits illustrated in FIGS. 29A and 30A. Item 360 is a bottom height adjustment plate. Item 302 is the optical detector which can be a pyro-electric detector as illustrated in FIGS. 29A and 30A. Item 364 is an optical diffuser to ensure uniform illumination of the pyro-detector 302. Item 364 is inserted into a separate optical component barrel housing 372 which fits into the main ADDC housing 346. Inserted in the optical component barrel housing 372 is an aperture 370, an optical attenuator 368 and a beam-concentrating lens 366. Items 368, 346 and 364 are inserted only if needed. Item 374 is a BNC coaxial connector, which provides an output signal from the detector 302 so that one can monitor the Q-switched laser pulse 344 outside the ADDC assembly housing 346. High Voltage EO Crystal Electronics Design FIGS. 33A–33D illustrate the operation sequence of the high voltage switching circuit 206 for the EO crystal 142 of FIGS. 13, 18, 19, 20 and 21. FIGS. 33A–33D show the relative timing relationships between the waveform signals to command the charging 214 of the EOM 140, to discharge 216 the EOM 140, the high voltage 218 applied to the EOM 140 and the resultant Q-switched pulse 344 emitted by the laser. The fundamental operation of the high voltage switching circuit 206 is illustrated in FIG. 34 with cross-reference to FIGS. 33A–33D. During the period of time denoted by "$t_a$" in FIGS. 33A–33D, there is no signal applied by the high voltage switching circuit 206 to the EOM of FIGS. 13 and 18. Consequently, in FIG. 34 the charging switch 220 and the discharging switch 222 are both open and the EOM 140 is not charged-up (i.e. no voltage is applied to the EOM 140). When a signal 214 to charge-up the capacitance of the EOM 140 is provided by the system controller 104 of FIGS. 13 and 18, charging switch Sc 220 in FIG. 34(b) is closed at time "$t_b$" thereby permitting the capacitance of the EOM 140 to be charged up to the full high voltage value available from the HV switching circuit 206 of FIGS. 13 and 18. After approximately 100 nsec, signal 214 to charge the EOM 140 is turned off at time "$t_c$." The EOM 140 is fully charged and switch 220 is opened as illustrated at "$t_c$" in FIG. 34(c). The laser is now in a low cavity loss condition and laser oscillation is initiated and begins to build up within the laser cavity. The laser radiation is contained within the cavity because of the high reflectivity of the end mirrors 406, 408 of FIGS. 24, 18, 5 and 3. After the cavity build-up time (i.e. CBT of FIG. 33D) the Q-switched laser pulse 344 begins to build up within the laser cavity as shown. At approximately the peak of the internally trapped laser pulse at time "$t_d$", the signal 308 from the ADDC 306 of FIG. 13 or 18 or FIG. 8A, discharges the EOM 140 by closing switch 222 as shown at "$t_d$" in FIG. 34(d). This action converts the cavity to a high loss state and dumps the radiation out of the cavity. After approximately 100 nsec, signal 216 to discharge the EOM 140 is turned off and switch 222 is opened at time "$t_e$," thereby leaving the high voltage switch 206 as in FIG. 34(e), which is the same as in the original state during the time "$t_a$"

Figure 35:
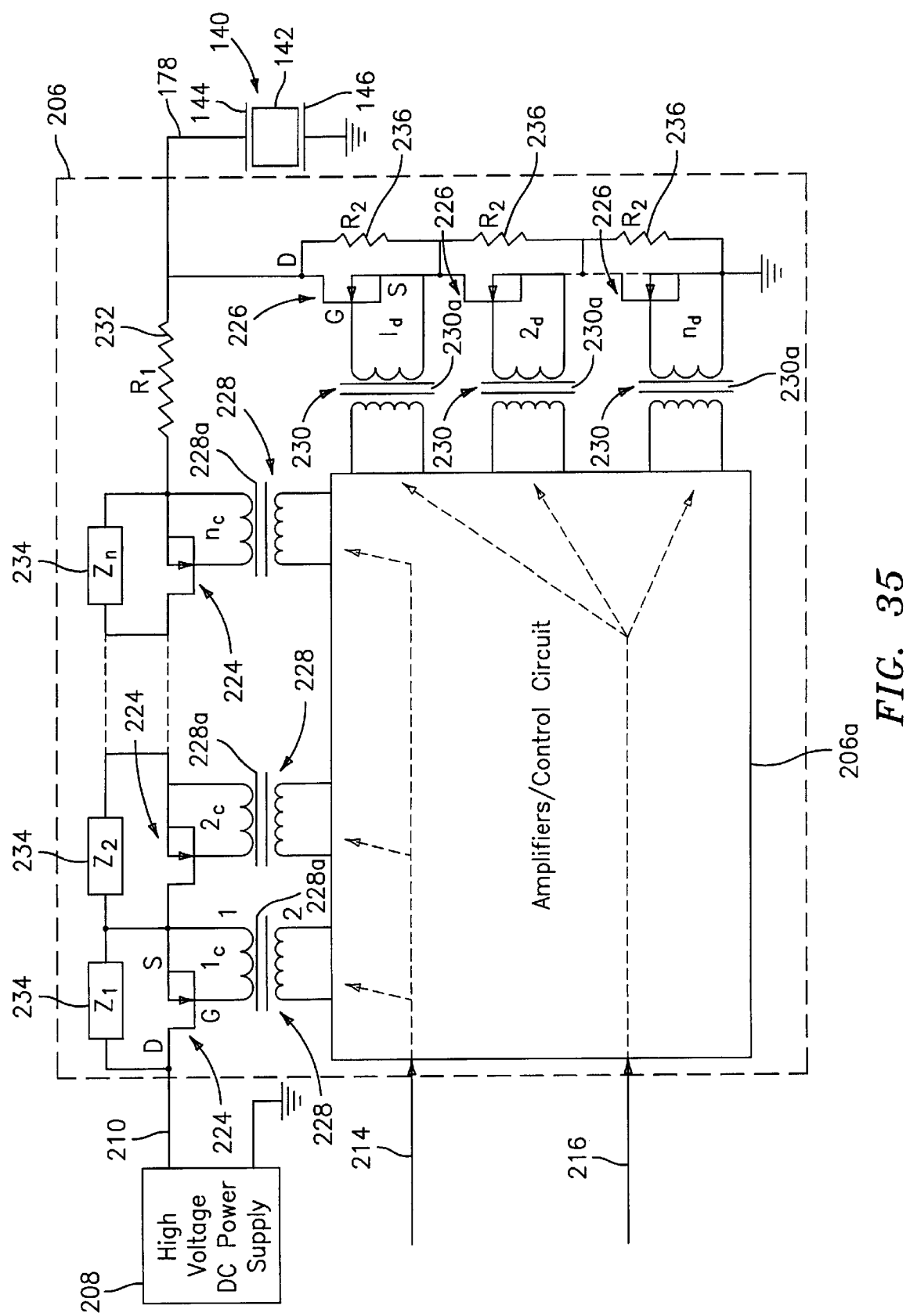
FIG. 35 is a more detailed schematic diagram of the switching circuit in FIG. 34.

FIG. 35 illustrates the electronic implementation of FIG. 34. The high voltage pulse switching circuit 206 operates in conjunction with the Automatic Down Delay Circuit (ADDC) 306 of FIG. 8A to generate the high voltage waveform required for driving the EO modulator crystal 142 to produce the Q-switched laser pulse 344 within the laser cavity. The high voltage pulsed signal generation system 200 of FIGS. 13 and 18 includes a high voltage DC power supply 208 and the high voltage switching circuit 206 as shown in detail in FIG. 35. The HV switching circuit 206 accepts either a pulsed signal 214 to charge the EO modulator 140 or a pulsed signal 216 from the ADDC 306 to discharge the EO modulator 140.

The pulsed signal 214 to charge the EO modulator 140 initiates a charge cycle, which applies high voltage to the EO modulator crystal 142 as depicted in time "$t_b$" of FIGS. 33A–33D. The pulsed signal 216 to discharge the EO modulator 140 initiates a discharge cycle where the EO modulator voltage is returned to zero as depicted in time "$t_d$" of FIGS. 33A–33D.

In order to produce fast high voltage pulse rise times of less than about 10 ns, the design of the high voltage pulse switch 206 requires careful attention in minimizing parasitic capacitance and inductance while still providing the necessary high voltage insulation to prevent electrical arcing. In addition, reducing parasitic capacitance results in lower power dissipation, which significantly effects the thermal management and ultimately overall size of the high voltage switching circuit 206.

The desirable features for the high voltage switching circuit 206 driving the EO crystals 142 are: 1) reliable high voltage operation in a small size and at high PRFs, 2) low parasitic capacitance for fast pulses rise times and reduced power dissipation, 3) low propagation delay to allow Q-switched or cavity dumped operation and 4) the ability to adjust the optical pulse amplitude by varying the high voltage pulse amplitude.

To achieve the above performance, the high voltage switching circuit 206 is constructed using a plurality of high voltage power MOSFETs 224, 226 of FIG. 35 for charging and discharging the EO crystal 142. The high voltage power MOSFETS 224, 226 fulfill the functions of the mechanical switches 220, 222 of FIG. 34. The switching MOSFETs 224, 226 are selected for their high operating speeds and avalanche high energy capabilities. The high speed characteristic is used to generate fast high voltage pulses while the latter characteristic is used to obtain reliable, fault tolerant operation. For example, MOSFET's such as Philips Electronics BUK 456 are suitable for this application. Drive for the charging MOSFET switches 224 is provided by a series arrangement of $n_c$ wideband pulse transformers 228. These transformers 228 are constructed on toroidal ferrite cores 228a using high voltage wire and potting compounds to obtain the required high voltage insulation. FIG. 35 illustrates a plurality of $n_c$ step down pulsed transformers 228 with a n: 1 ratio such as 2 to 1 or 3 to 1 in order to obtain current gain. When a "charge" pulsed signal 214 is applied to the pulse generation switching circuit 206 through the amplifier/control circuit 206a, these transformers 228 provide a positive signal to the gate (G) and a negative signal to the source (S) connectors of each of the $n_c$ charging MOSFETs 224. This causes current to flow from the high voltage DC power supply 208 through the drain (D) to the source (S) of each of the MOSFETs 224 then through the resistor 232 and on to the EO crystal 142. The number of charging MOSFET switches 224 used in the circuit 206 is determined by the voltage rating of the MOSFETs 224 divided into the maximum voltage applied to the EO crystal 142 plus a factor to ensure high reliability. For a voltage of 4 kV, five to six MOSFSETs of the Philips BUK 456 variety appears to suffice. When the charge pulse signal 214 goes to zero, the MOSFETs 224 are turned off as illustrated at time "$t_c$" of FIGS. 33A–33D and 34 and the EO modulator 140 maintains its charge until it is commanded to discharge by signal 216.

When the discharge pulse signal 216 is applied to the high voltage generation switching circuit 206 through the amplifier/control circuit 206a, a pulsed signal 216 is applied to each of the $n_d$ step down transformers 230 which in turn applies a turn on signal across the Gate (G) and Source (S) connections of each of the "$n_d$" discharge MOSFETs 226. This enables current to discharge from the EO modulator crystal 142 through each of the "$n_d$" discharge MOSFETs 226 to ground as schematically illustrated at time "$t_d$" of FIGS. 33A–33D and 26. When the discharge signal 216 goes to zero, the MOSFETs 226 are turned off and the status of the switching circuit 206 is as depicted at time "$t_e$" of FIGS. 33A–33D and 26.

An impedance, $Z_n$, 234 can be connected across each of the $n_c$ charging MOSFETs 224 to provide a voltage balance across the MOSFETs 224. The resistive part of the impedance 234 across each of the charging MOSFETs 224 can typically each have a 10 megaohm value to balance the DC between each of the charging MOSFETs 224. If the avalanche properties of the charging MOSFET 224 present a problem then a capacitor across each of the resistors can be used. The value of the required capacitance across each of the charging MOSFETs 224, needs to be different. The capacitors are also a balance for the AC portion of the charging signals 214. From a cost standpoint the capacitor can be done away with if the charging MOSFETs 224 are selected not to be sensitive to avalanching problems.

Resistors 236 (typically 150 kilo ohms) are used to ensure DC balancing during the EO modulator 140 discharge portion of the cycle. The charging resistor 232 in FIG. 35 serves the purpose of minimizing cross conduction problems between the charging and discharging portion of the circuits.

Discussed above are the basic elements of this high voltage switching circuit 206. Variations upon these basic elements are possible to those versed in the fast electronic circuits state of the art. For example, a single transformer with multiple secondary windings can be used to drive the MOSFETs instead of individual cores as shown in FIG. 35. Positive feedback windings can also be added to produce faster pulse transitions. Various opto-isolated gate drive techniques could also be applied. Active off drive of the non-conduction MOSFETs can also be employed which allows this isolation resistor to be minimized or eliminated. Resonant charging techniques can also be used to reduce power consumption.

The high voltage pulse output from the high voltage switching circuit 206 may be varied in order to obtain a desired output optical power from the Q-switched laser pulse 344. This can be accomplished by varying the output voltage of the high voltage power supply 208 in either an open or closed electrical loop fashion. In addition, the ADDC circuit 306 allows extended variability in the output optical pulse width thereby permitting pulse energy variation on a pulse-to-pulse basis.

Figure 5:
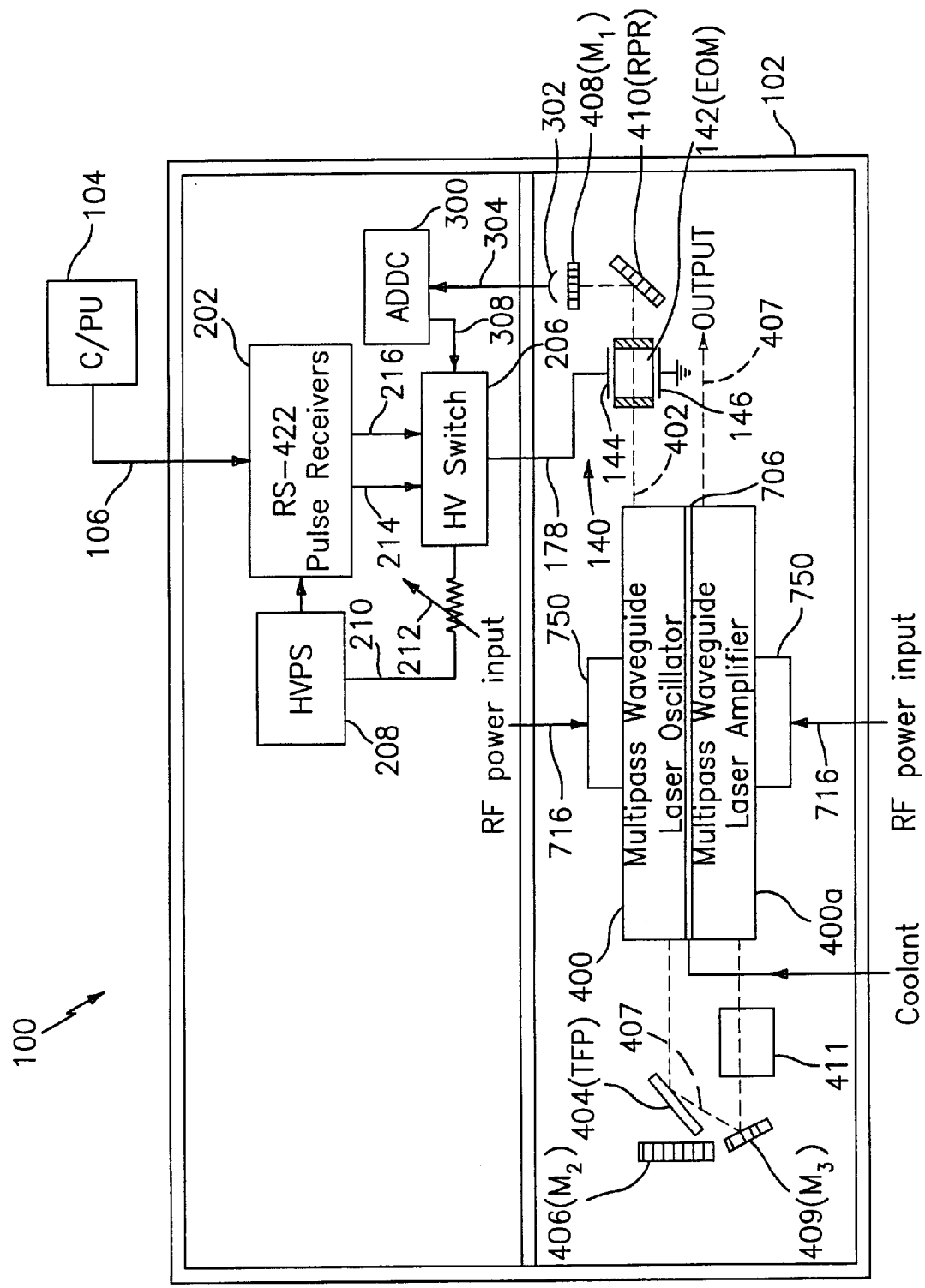
FIG. 5 is a schematic representation of a $CO_2$ cavity dumped laser system with a multipass laser amplifier.
Figure 36:
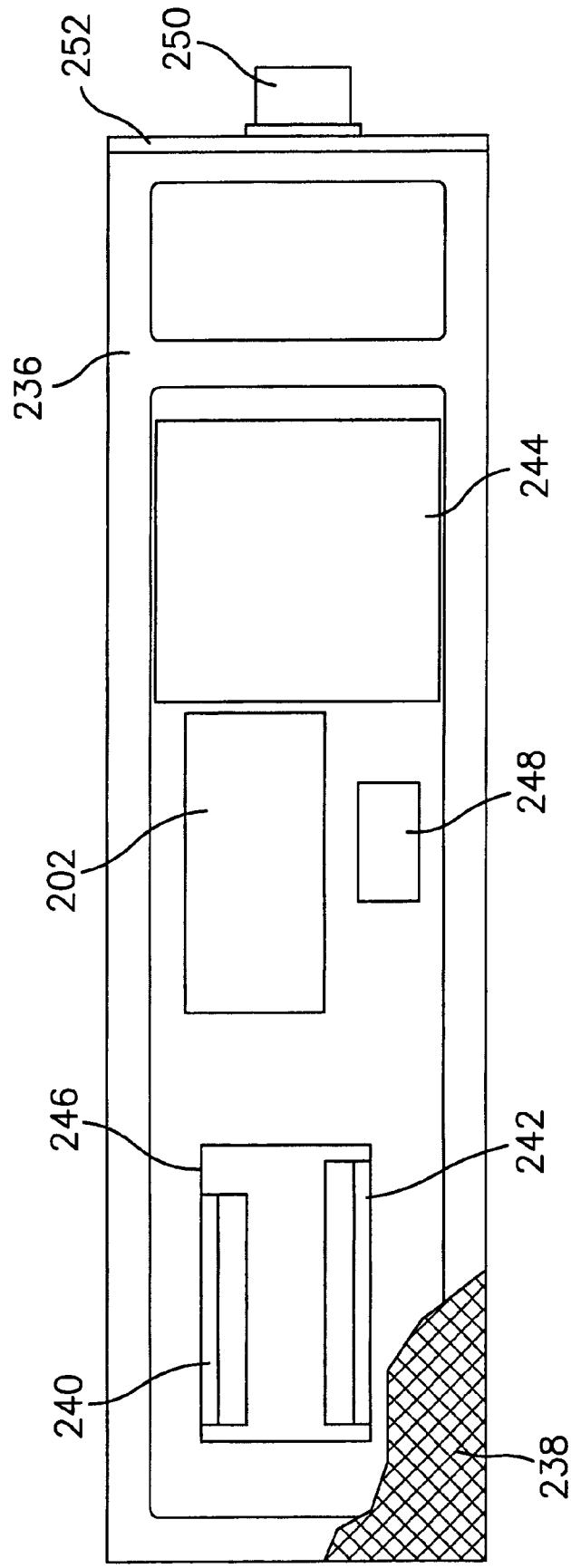
FIG. 36 is a schematic diagram of the housing and the placement of the assembly of the elements of the switching circuit of FIG. 35.

The pulse receiver 202, the high voltage DC supply 208 and the high voltage switching circuit 206 of FIGS. 5, 13 and 18 are packaged in a metal housing 236 as illustrated in FIG. 36. Because of EMI considerations, careful attention is given to preventing electromagnetic radiation from either leaking out of or into the metal housing by techniques well known in the art. Item 238 is a cover for the housing 236. Items 240 and 242 are heat sinks for the high voltage switching circuit printed circuit board. Item 202 is the printed circuit board containing the pulse receiver. Item 244 is a filter capacitor and item 246 is the box containing the high voltage DC power supply 208 such as an Ultra volt Model 4C24-P60. Item 250 is the input/output electrical connector and Item 252 is the end plate.

Automatic Stop Drilling (ASD) Module

Figure 37:
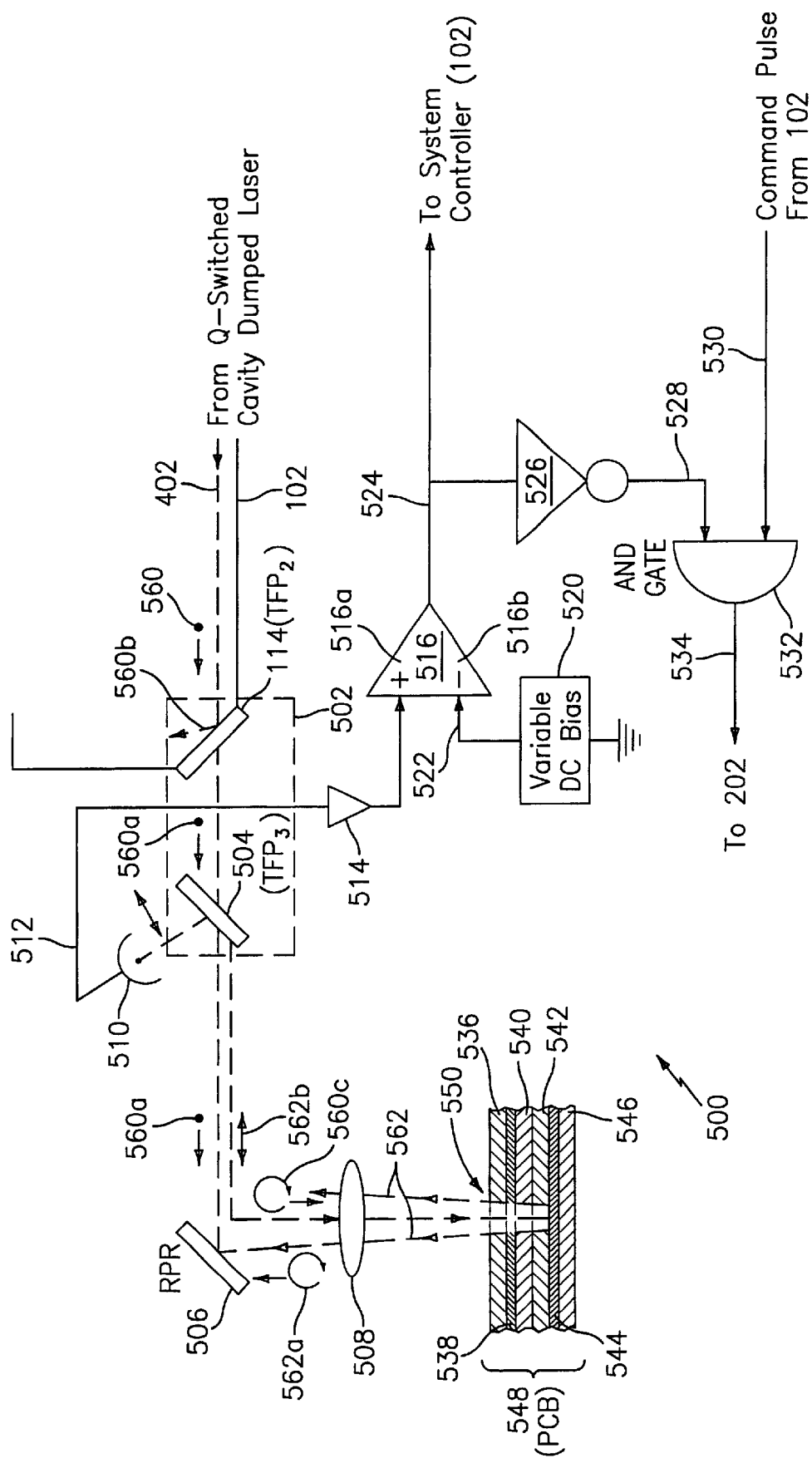
FIG. 37 is a schematic diagram of an automatic laser stop circuit for a simultaneously Q-switched cavity dumped laser used in drilling blind via holes.

An attractive addition to a via hole laser drilling system that uses repetitive laser pulses, such as a Q-switched and simultaneously Q-switched cavity dumped laser, an acousto-optic gated cell, a gated or super pulsed laser, or a TEA laser, is an automatic stop drilling (or stop processing) system operative to direct the laser to stop drilling operations, thus, stopping the process when a reflective surface, such as copper or other metal, is reached in the drilling processing. Such a stop drilling feature also detects back reflection radiation from the workpiece and blocks it from coupling back into the laser cavity, thereby damaging the optics therein. For example, an automatic stop drilling (ASD) (e.g., an automatic stop laser operation) system may utilize the large back reflectance from copper or other metals when the laser has drilled through a dielectric material in a printed circuit board. The detection of the signal from the back reflected radiation provides a signal to the laser to stop pulsing at that location on a work piece and to start pulsing again after the laser beam has been moved to another spot on the work piece. Such an ASD system prevents wasted time thereby increasing the throughput of the via hole drilling system and also provides protection to the laser from back reflected radiation entering and building up within the laser cavity. FIG. 37 illustrates a schematic of an ASD system 500 that can be connected together a Q-switched or simultaneously Q-switched cavity dumped laser housing 102 of FIG. 18.

FIG. 37 illustrates one method of implementing such an ASD system. It also illustrates, as an example, how a pulsed via hole drilling laser has drilled through a work piece 548. As an example, the work piece 548, such as a printed circuit board, has four dielectric layers 536, 540, 542, 546, one opened copper interconnect 538 and a second copper interconnect 544 from which a strong back reflected signal is detected. The polarized pulsed laser beam is directed onto the work piece by the RPR 506 and a focusing lens 508. The pulsed laser beam drills through the first dielectric layer 536, past the opened copper interconnect, 538 and through dielectric layers 540 and 542 until the laser beam 402 is stopped by copper interconnect line 544. Once the copper interconnect line 544 is reached a large amount of radiation is reflected back out of the via hole 550 toward the focusing lens 508 and back toward the laser. The ASD system 500 detects this back-reflected radiation and generates a signal to automatically stop the laser from continuing to pulse at this location. The laser re-initiates pulsing and therefore drilling action again after it is moved to a new location and commanded to restart pulsing.

The ASD system 500 functions as follows. The laser pulse 402 from the simultaneously Q-switched cavity dumped laser is polarized in the plane of the paper as shown at 560 in FIG. 37. The laser pulse 402 passes through TFP 114 which is part of the laser housing 102 of FIGS. 13 and 18. TFP 114 then passes that radiation 560a polarized perpendicular to the plane of the paper with little loss, and reflects out other polarization components 560b of the radiation. The same occurs for TFP 504. Consequently, by rotating the TFP 504, one can vary the attenuation of the laser beam propagating onto the work piece 548. This is a manual option that can be incorporated into the laser housing 102 if a manual attenuation adjustment module is desired instead of adjusting the voltage applied to the EO crystal 142 as previously described either in a closed loop format or by manually adjusting a variable resistor 212 of FIGS. 13 and 18. The two TFPs 114, 504 are positioned as indicated (i.e. tipped toward each other) in order to maintain a straight line alignment from the laser head 400 to the RPR 506. If the option for such a manual attenuation beam adjustment is not selected, then only TFP 114 is required in FIG. 37. In either case, TFP 114 is used to pass the radiation onto RPR 506, onto the focusing lens 508 and then onto the work piece 548. The RPR 506 converts the polarization 560a that is perpendicular to the plane of the paper into a circularly polarized beam 560c so that when the circularly polarized radiation 562a is reflected 562 from the work piece 548 is again reflected by the RPR 506, the radiation is translated into radiation 562b whose polarization is parallel to the plane of the paper. This polarization is reflected by the TFP 504 as shown. This action provides protection to the laser from back reflected radiation from the workpiece. The radiation reflected from TFP 504 is detected by a suitable detector 510, such as a pyro-electric detector.

The electrical signal 512 from the detector 510 is applied to a preamplifier 514 and then to one input 516a of a voltage comparator 516. A variable DC bias 520, 522 is applied to the second input 516b. In order to avoid false alarms, the bias voltage 522 is adjusted to a high enough voltage so as to have the voltage comparator 516 emit an output signal 524 only on strong back-reflected signals arising from the metal reflection and not from the much weaker reflection from the dielectric. The output signal 524 emitted by the voltage comparator 516 is larger than the bias voltage 522. The electrical signal from the voltage comparator 524 is used to inform the system controller 102 that a "stop laser pulsing" command has been sent to the EO modulator switching circuit 206. This action provides additional protection fro the laser from back reflected radiation. This allows the system controller 102 to move the laser beam to another spot and reinitiate drilling action. The signal from the voltage comparator 516 is also applied to an inverter 526 and then to a logic AND gate 532. The AND gate 532 supplies a "stop drilling" signal 534 to the pulse receiver 202, which insures that no voltage is applied to the EO crystal 142, if the signal 528 from the inverter 526 and a command pulse 530 from the pulse receiver 202 both applied to the AND gate 532.

The Automatic Stop Drilling System 500 of FIG. 37 operates as follows. If the drilling operation has not reached the second copper interconnect line 544, then there is no back reflected signal detected at the detector 510. As a consequence there is no input signal 512 provided to the comparator 516, nor signal output 524 from the comparator 516, i.e., the output 524 of the comparator 516 is at a "logic low." However, if the drilling operation has not reached the second copper interconnect line 544, the laser system 100 must continue drilling. In order for the laser system 100 to continue drilling, there must be an input 528 to the logical AND gate 532 so that the AND gate 532 can provide an output signal 534. This can occur because the inverter 526 converts the "logic low" of signal 524 to a "logic high" 528. Thus, the inverter 526 converts a "logic low" 524 to a "logic high" 528. The AND gate 532 logically ANDs the "logic high" of signal 528 with the "logic high" of signal 530 and the output 534 of the AND gate 532 directs the laser system 100 to continue drilling. If the drilling operation has reached the second copper interconnect line 544, then there is a large back reflected signal detected by the detector 510. As a consequence, there is an input signal 512 provided to the comparator 516 through the preamplifier 514 and an output signal 524 from the comparator 516, i.e., the output signal 524 of the comparator 516 is now at a "logic high." However, if the drilling operation has reached the second copper interconnect line 544, the laser system 100 must discontinue drilling. In order for the laser system 100 to discontinue drilling, the output 534 of the logical AND gate 532 must be a "logic low." Thus, the inverter 526 converts a "logic high" 524 to a "logic low" 528. The AND gate 532 logically ANDs the "logic low" of signal 528 with the "logic high" of signal 530 and the lack of an output signal 534 from the AND gate 532 results in no signal to the pulse receiver so that no voltage is provided to the EOM crystal 142, thereby directing the laser system 100 to discontinue drilling.

Simultaneously Super-Pulsed Q-Switched and Cavity Dumped Laser Operation

Figure 38A:
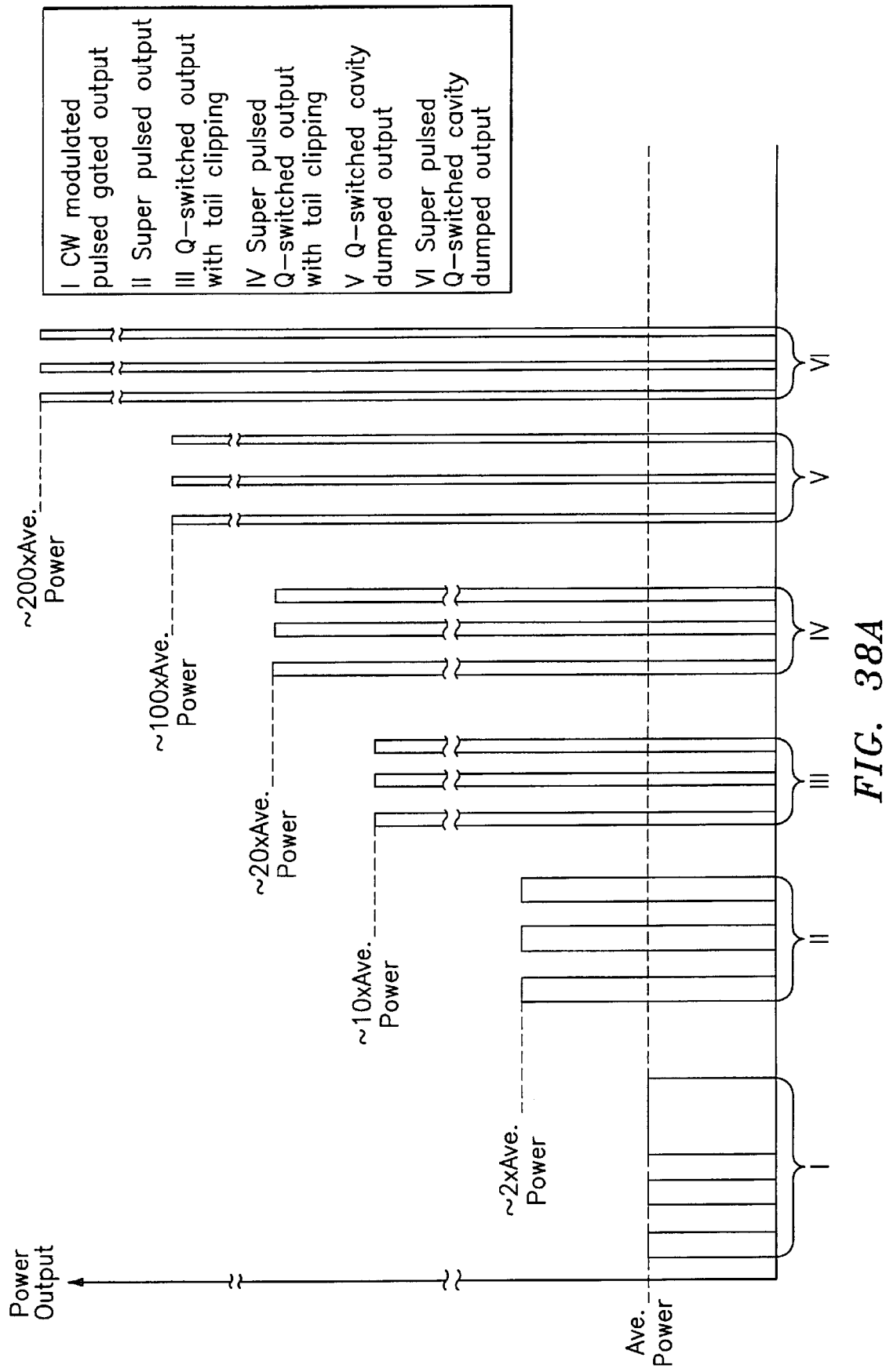
FIG. 38A is a graphical depiction of the laser output powers for various modulation techniques wherein format I is for CW modulated and pulsed gated; format II is for gain switched super pulsed; format III is for Q-switched with tail clipping; format IV is for super pulsed Q-switched with tail clipping; format V is for simultaneously Q-switched cavity dumped and format VI is for simultaneously super pulsed, Q-switched, cavity dumped operation.

In FIG. 38A pulse formats I and II summarize the various straight forward, commonly used $CO_2$ laser pulse techniques, such as CW modulated or pulsed gated operations and super-pulsed operation that are presently used to drill or perforate materials. Format I generates peak power pulses equal to the CW power where the super-pulsed (II) can generate peak powers of approximately twice the CW powers for an RF pulsed power duty cycle of approximately one half and with pulse widths down to a few microseconds. Pulse formats III through VI of FIG. 38A illustrate the shorter pulse, higher peak power approaches of Q-switched and simultaneously super-pulsed and Q-switched. The advantages arising from the use of short, high peak power, high repetition rate $CO_2$ laser pulses in material processing applications are well recognized. As laser pulses become shorter one obtains cleaner holes and the drilling process is conducted more efficiently with minimum adverse thermal effects on the material. Even though the energy per pulse is lower, the higher peak power and high pulse repetition obtained with Q-switched and cavity dumping techniques increase the speed of the drilling process. Consequently, it is believed that the pulsing formats of VI simultaneously super-pulsed Q-switched and cavity dumped format, and V simultaneously Q-switched and cavity dumped format in FIG. 38A are better than IV and III in drilling via holes (where pulse width for pulsing formats VI and V are 10 to 20 nsec long). The higher peak powers and shorter pulses of format VI over format V make it superior for material processing applications.

Pulse formats IV and III, where the Q-switched approach provides pulse widths of about 0.1 $\mu$sec to 0.2 $\mu$secs, are better than pulse format II. The high repetition rate gain switch approach of pulse format II yields pulse widths of one to tens of microseconds. Pulse format II is better than pulse format I. The pulse gated format I is the normal laser pulsing condition. It yields pulses of a few microseconds duration for CW operation. The disadvantage of the smaller energy per pulse associated with shorter pulses when compared with the wider pulses is made up by the higher repetition rate and higher peak power of the shorter pulses which expel the material out of the via hole being drilled by the laser pulses. This results in better-defined, smaller diameter and smoother via or perforation holes. Which of the formats shown in FIG. 38A is chosen depends on the trade off between the cost of the laser, the speed of the drilling process and the quality of the holes drilled.

Figure 38B:
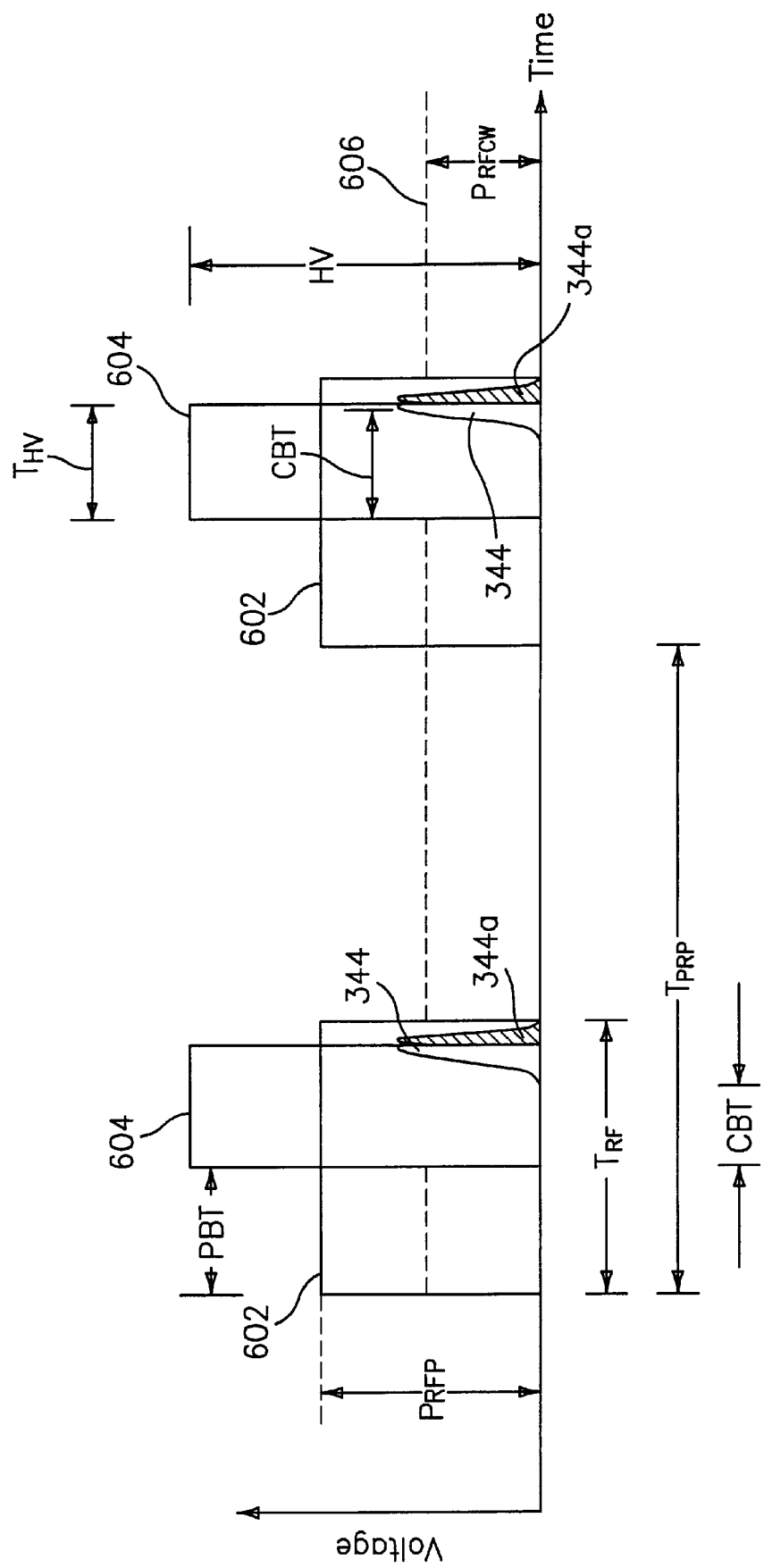
FIG. 38B is a graphical depiction of the relative timing of the application of a super pulsed RF pump power to a laser gain medium and a single pulse applied to an electro-optic crystal in a simultaneously super pulsed pumped and Q-switched laser.

FIG. 38A illustrates the higher peak power advantages realized in operating a laser in a simultaneous super pulsed and Q-switched mode and also in a simultaneous super pulsed, Q-switched cavity dumped mode. Advantages include higher peak power, higher energy per pulse, and faster laser pulse rise time outputs for the same average RF power 606 supplied to the laser head 400 at 716. The higher RF drive power also enables $CO_2$ lasers to operate at higher gas pressures which can yield higher energy per output pulse over non-super pulsed operation. FIG. 38B illustrates the simultaneously super pulsed operation at a duty cycle of one half for Q-switched and cavity dumped waveforms. In particular, FIG. 38B shows the RF peak pulse ($P_{RFP}$) 602 applied to the $CO_2$ gain medium 726 (at 716 in FIGS. 13 and 18), the high voltage pulse 604 applied to the EO crystal 142, the maximum average RF power (i.e., continuous wave radio frequency power 606 ($P_{RFCW}$)) that can be applied to the laser gain medium 726 and the resultant Q-switched laser output pulse 344, and their respective timing relationship with each other at a duty cycle of approximately 50%. In this example, one simultaneously Q-switched cavity dumped pulse 344 is generated per super RF pulse 602 exciting the $CO_2$ laser discharge (gain medium 726).

The laser drilling system operator determines the laser's super pulsed repetition frequency, $P_{RF}$, and the duty cycle $\eta$. FIG. 38B illustrates the condition where the peak power of the RF pulse ($P_{RFP}$) 602 is about twice the average RF power capability of the power supply (PRFcw) 606. This is typical for a duty cycle of 50%. The high voltage 604 applied to the EO crystal 142 is selected to provide a 90-degree polarization rotation as described for FIGS. 24A–25B, 13 and 18. The high voltage 604 applied to the EO crystal 142 is turned on, after allowing time, PBT, to elapse in order for the gain to rise for an optimum time, which is about one to two population decay times, $\tau_d$, of the upper laser level. This time is denoted as the population build-up time (PBT) in FIG. 38B. The high voltage 604 causes the laser cavity 406, 408 to switch from a high loss state to a low loss state thereby allowing laser action to take place. This results in a Q-switched pulse radiation build up within the laser cavity. At the peak of this contained radiation buildup, the voltage 604 to the EOM is reduced to zero, which dumps the trapped radiation out of the cavity. The system operator determines the delay time PBT between the initiation of the RF super pumping pulse 602 and the initiation of the HV pulse 604 applied to the crystal 142. This is done by inputting this information through the keyboard of FIG. 3 into the system controller, which provides the desired electrical signal to the RS 422 pulse receiver 202 and to the high voltage switch 206.

In FIG. 38B, $T_{RF}$ is the pulse width of the super pulse RF power ($P_{RFP}$) 602, $T_{HV}$ is the pulse width of the high voltage 604 applied across the EOM crystal 142, and $T_{PRP}$ is the super pulse repetition period. The duty cycle is defined as $T_{RF}/T_{PRP}$ and the super pulsed repetition frequency $P_{RF}=1/T_{PRP}$.

If the laser beam 402 is moved from one processing location (i.e. a via) to another processing location on the order of a millisecond or longer, then the super pulse operation can be performed at a much lower duty cycle. The lower duty cycle enables the application of higher RF pulsed power 716 (i.e., 602 of FIG. 38B) to the laser discharge within the folded waveguide 806 during the super pulse operation as well as enabling the use of higher gas pressure in the gain medium. They both result in obtaining higher laser pulse energies. As a general rule, the amount of power $P_{RFP}$, applied to the gas laser discharge can be approximately equal to $P_{RFCW}$/Duty cycle. As an example, for a duty cycle of ⅙, the power $P_{RFP}$ can be up to $6 \times P_{RFCW}$. This enables obtaining higher peak powers and energies per Q-switched pulse over the operation illustrated in FIG. 38B. A low duty cycle super pulsed and Q-switched operation can operate in a single Q-switched pulse operation or in a multiple Q-switched pulse operation during a single super RF excitation pulse 602 duration $T_{RF}$.

Figure 39:
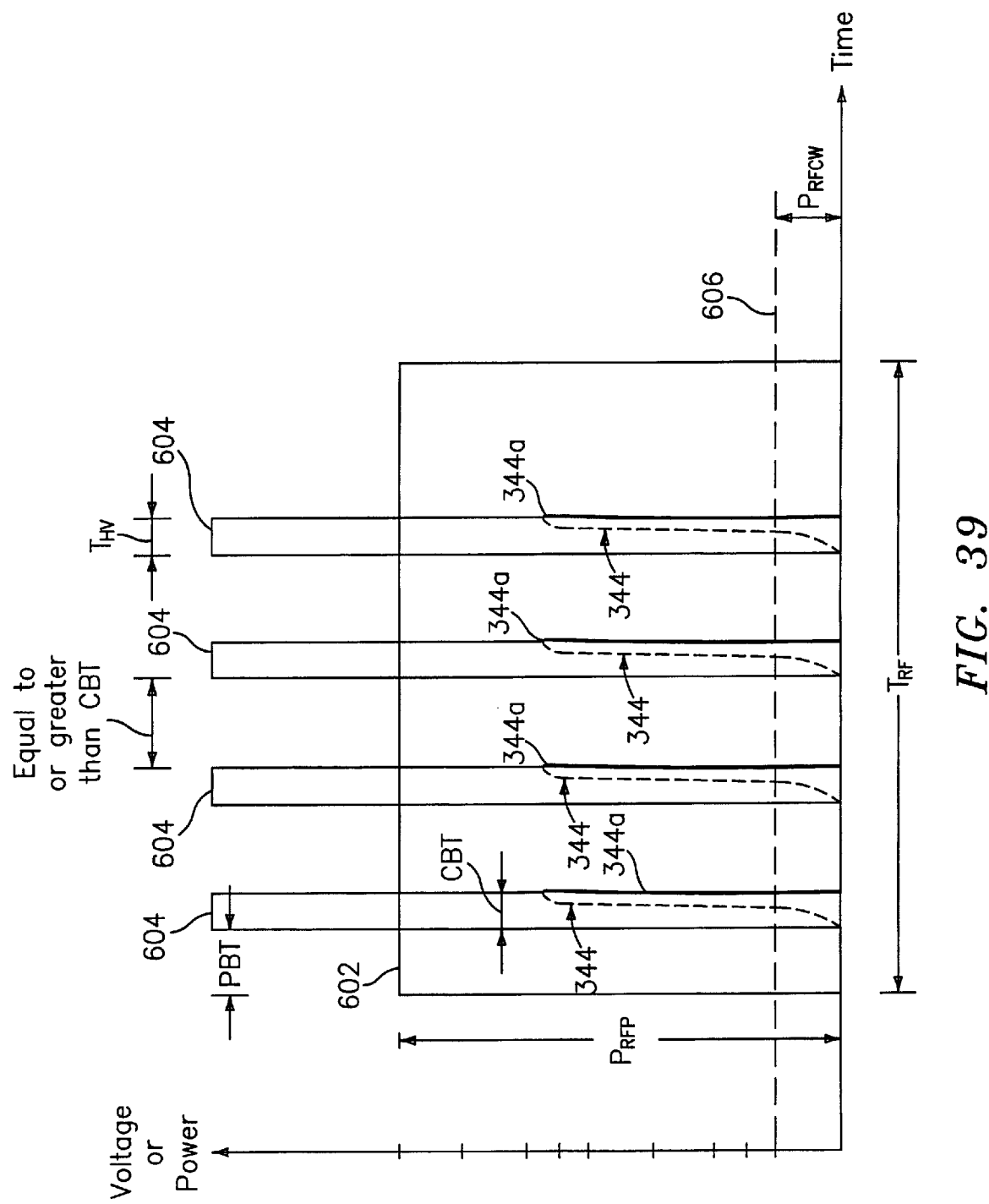
FIG. 39 is a graphical depiction of the relative timing of the application of super pulsed RF pump power to a laser gain medium and the repetitive pulses applied to an electro-optic crystal in a simultaneously super pulsed pumped and repetitively Q-switched laser.

Operation of a RF power low duty cycle, simultaneously repetitive super pulsed Q-switched cavity dumped laser during one super RF pulse excitation of the gain medium 726 is schematically illustrated in FIG. 39. Typical performance parameters obtained for a pulse excitation duty cycle of 0.14 to 0.17, $P_{RFP}$=4 kW to 5 kW and $T_{RF}$=50 μsec are 20 kW to 25 kW peak power for a single Q-switched laser pulse with an energy of 7 to 8 mJ per pulse. For $P_{RFP}$=4 kW to 5 kW, $T^{RF}$=100 μsec, and generating 10 Q-switched pulses during the excitation period $T_{RF}$=100 μsec, the average energy for the 10 pulses was 30 mJ. This output performance repeats at a repetition frequency equal to $1/T_{PRP}$. These results were obtained with the laser system depicted in FIG. 13 or 18. The NV folded waveguide configuration 806 for the $CO_2$ laser head 400 is normally specified as a 100 W output laser when operated continuously.

When the tails 344a of the Q-switched pulse 344 are clipped as in FIG. 31B, the energies normally present in the pulsed long tails 344a of FIG. 31A are not extracted from the laser discharge gain medium 726. Consequently, this non-emitted energy is saved and thus available for extraction in future Q-switched pulses 344, which follow in the repetitive Q-switching operation. The same occurs when the Q-switched radiation contained within the feedback optical cavity is truncated and dumped out of the cavity. The energy which was to be emitted in the back side of the contained Q-switched pulse is saved and available for future extraction. This makes it possible to obtain repetitive cavity dumped output pulses from a laser with a long RF super pulse applied to the $CO_2$ laser medium. With the tail clipped pulse width of FIG. 31B (i.e. 310 nsec wide at the base of the pulse) and with $T_{RF}$=100 μsec, and assuming a cavity build-up time of 500 nsec, as many as 123 cavity dumped pulses can be repetitively obtained if one allows a 810 nsec time interval between the train of Q-switched pulses (i.e. $100 \times 10^{-6} / 810 \times 10^{-9} = 123$).

The output energies available from such a repetitive Q-switched cavity dumped pulse train during a super pulse excitation is sufficient to drill the most difficult plastic materials such as those impregnated with glass fibers (e.g., FR4 printed circuit board materials).

FIG. 39 schematically illustrates the operational events that occur for example where $P_{RFP}=7 \times P_{RFCW}$ and a RF pulse excitation 602, of duration $T_{RF}$, driving the laser discharge 726 with four repetitive Q-switched pulses 344 occurring during TRF. After the population build-up time (PBT) required to populate the upper laser level of the discharge 726 under the PRFP RF pulse power, high voltage is applied to the EOM crystal 142 thereby turning the laser cavity 406, 408 from a high loss state to a low loss state. This in turn causes laser action to begin and, after the cavity build-up time (CBT), a Q-switched laser pulse 344 rises rapidly to a peak value and is contained within the feedback cavity. After a time duration $T_{HV}$, the high voltage pulse 604 applied to the EOM crystal 142 is turned off, thereby converting the laser cavity 408, 408 from a low loss state to a high loss state. This in turns stops dumps the radiation out of the cavity. Switching the cavity to a high loss state stops the depopulation of the upper laser level, thereby enabling the population of the upper laser level to again begin to build-up under the RF super pulse excitation 602 of the discharge 726. FIG. 39 schematically illustrates obtaining four cavity dumped laser pulses from one super RF power pulse.

Figure 40:
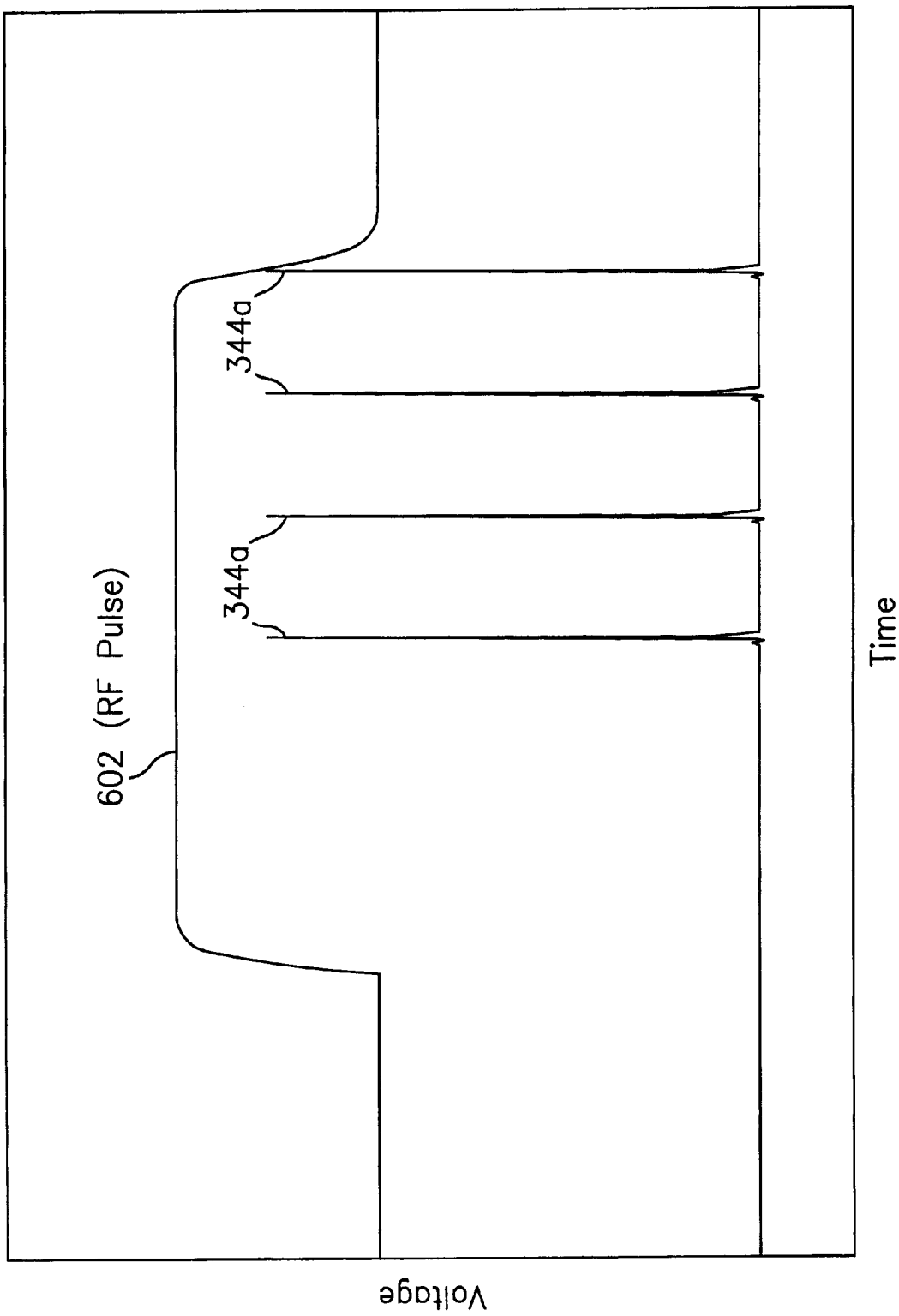
FIG. 40 is a graphical depiction of oscilloscope traces of the experimental results of the application of super pulsed RF pumped power to a laser gain medium and the repetitive Q-switched output laser pulses resulting from repetitive electrical pulses applied to an electro-optic crystal in a simultaneously super pulsed pumped and Q-switched $CO_2$ laser whose output was depicted in of FIG. 39.

FIG. 40 illustrates four simultaneously Q-switched cavity dumped pulses 344a at a 100 kHz PRF during one super RF pulse 602 excitation of the laser discharge having a duration of approximately 60 μsec.

Figure 41:
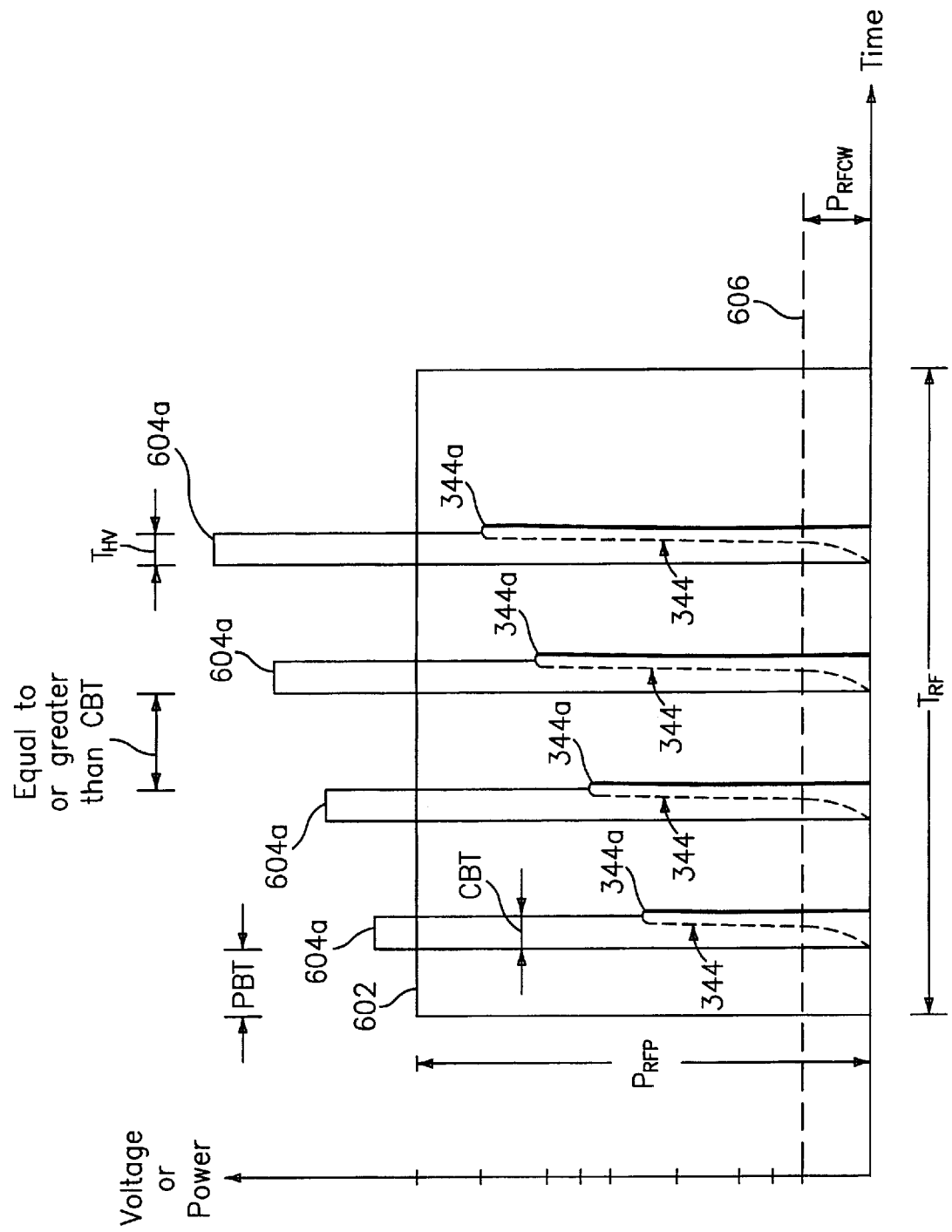
FIG. 41 is a graphical depiction of the relative timing of the application of super pulsed RF pump power to a laser gain medium and the increasing amplitude of repetitive pulses applied to an electro-optic crystal in a simultaneously super pulsed pumped and repetitively Q-switched laser with the Q-switched pulses increasing in amplitude.

Laser pulse trains comprising repetitive short pulses contained within a single super RF power pulse envelope are superior in drilling materials compared to a single pulse. (Steve Maynard, *Structured Pulses: Advantages in Percussion Drilling; Convergent Prima Newsletter*, The Laser's Edge, Vol. 11, Winter 2000, pg. 1–4, which is incorporated herein by reference). These laser pulse trains can be repeated over time. Such structured pulse trains are known to achieve higher drilling speed, better hole taper control, better debris control, and enable finer tuning or adjustment of the drilling process when the pulse amplitude is sequentially increased from the beginning to the end of the laser pulse train. The use of electro-optic modulation to obtain repetitive Q-switched and cavity dumped laser pulse trains can provide the flexibility to generate structured pulse trains for hole drilling applications (see FIGS. 38A, 38B, 39 and 41 for repetitive pulse train examples). Additional examples are schematically illustrated in FIG. 38A. They are CWRF pumped or gated laser pulses, super RF pulsed laser pulses (II), Q-switched pulse trains (III), super pulsed RF pumped Q-switched pulse trains (IV),n simultaneously Q-switched cavity dumped (V), and simultaneously super pulsed Q-switched cavity dumped laser pulses (VI). By varying the amplitude of the high voltage 604 applied to the EOM crystal 142a convenient non-mechanical, and therefore fast, variation of the amplitudes of the individual Q-switched pulses can be obtained (FIG. 41). This requires an electronic control of the voltage output of the high voltage power supply 208 of FIG. 13 or 18. This will be described later in this disclosure.

The first Q-switched cavity dumped laser pulse starting the drilling of a hole does not require as much energy as the last Q-switched cavity dumped laser pulse. This is so because the last laser pulse is drilling deeper within the material. A larger pulse energy is required for drilling deeper within a material because it takes more laser energy to vaporize the material out of the hole. By sequentially increasing the laser energy as the pulse train progresses, the surface debris can be better controlled and excessive tapering of the hole can be prevented. Drilling with a structured pulse train results in the ability to begin drilling with low energy per pulse, which causes little or no "bell mouthing" of the hole, and minimal debris splattering. Once below the surface of the material, the energy of the pulses can be increased incrementally as shown in FIG. 41 and the drilling process continues with minimum tapering.

Figure 44:
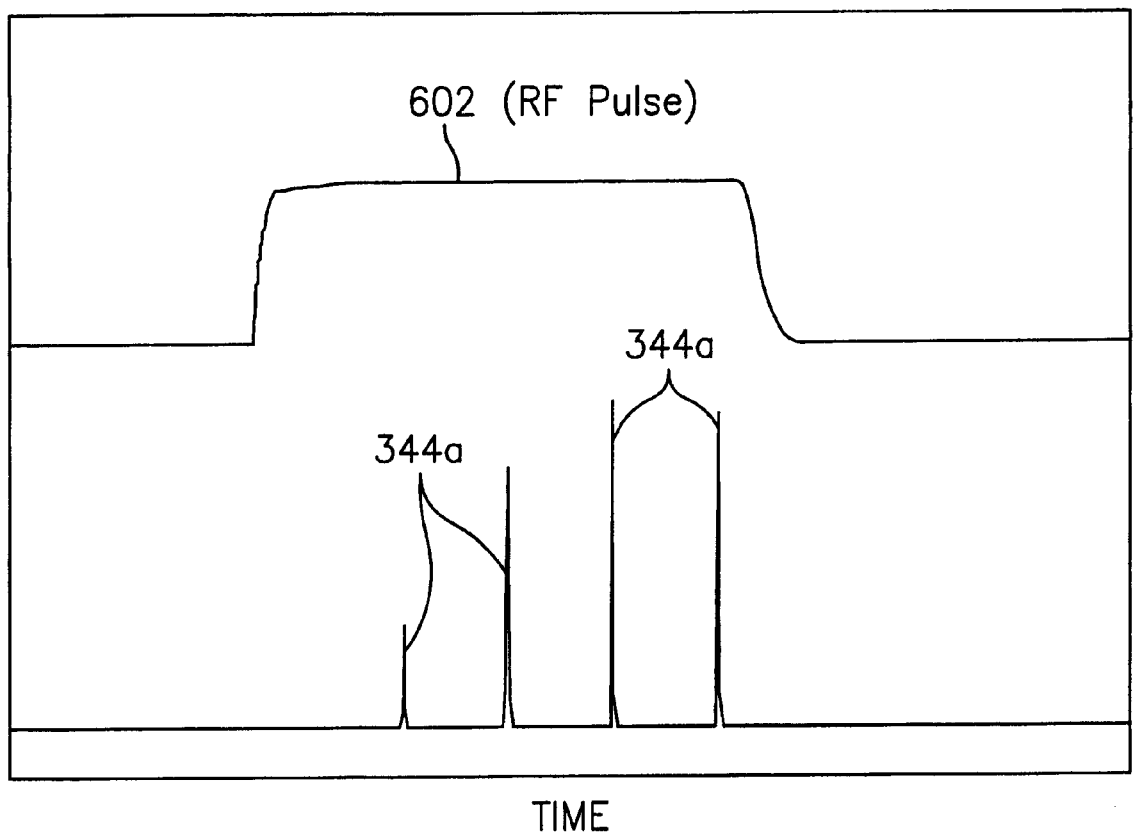
FIG. 44 is a first graphical depiction of simultaneously super pulsed RF pulsed pumped, Q-switched and cavity dumped $CO_2$ laser with increasing amplitude output pulses.

FIG. 41 schematically illustrates the events during the simultaneously RF gated super RF pulsed power and repetitive Q-switched cavity dumped pulse train with progressively increasing laser pulse peak power under a single RF super pulse excitation of the laser medium. FIG. 44 illustrates the operation of a Q-switched cavity dumped laser in this mode of operation.

Another method of adjusting the output power of the laser is to provide means for manually rotating TFP 504 of FIG. 37 about its center axis thus varying the amount of polarized laser radiation that can leave the laser housing. This mechanical adjustment is slow and does not allow the adjustment of peak power from pulse to pulse, except for very slow pulse repetition rates.

Control of Output of Individual Q-Switched Cavity Dumped Pulse Peak Power

Figure 42:
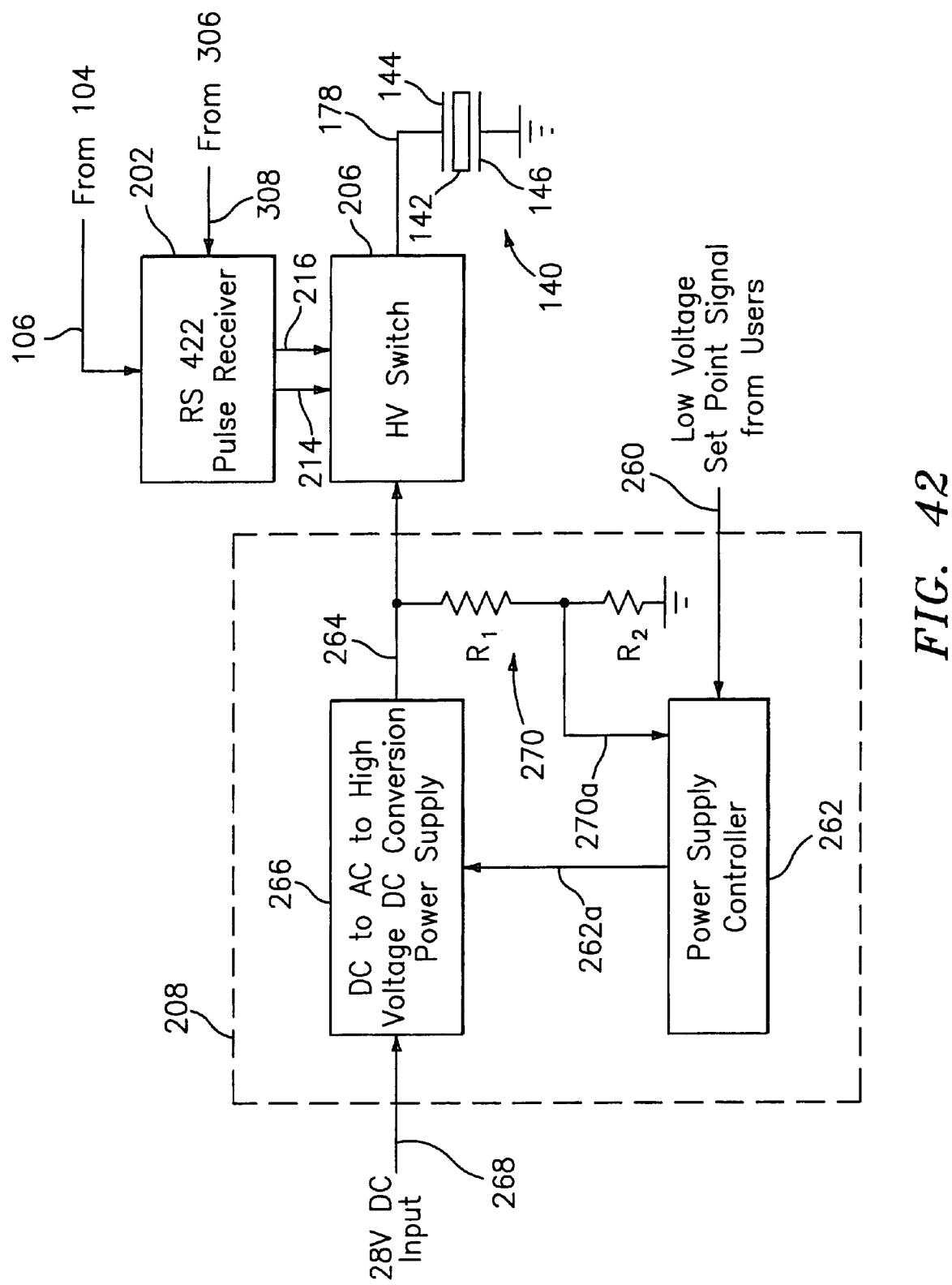
FIG. 42 is a schematic block diagram of the electronic circuit controlling the high voltage applied to the electro-optic modulator of FIGS. 13 and 18 for controlling the peak output pulse power of a Q-switched laser.

By the use of the subsystem shown in FIG. 42, one can vary the peak power or amplitude of the laser output pulse 344 by varying the voltage 604 applied to the EO crystal 142 thereby not permitting a full 90-degree polarization rotation of the radiation within the laser cavity 406, 408. The voltage 604 applied to the EO crystal 142 can be changed by applying a signal to the high voltage power supply (HVPS) 208 to lower the voltage supplied to the high voltage switch which applies voltage to the EOM crystal 142 (see FIGS. 13 and 18). This can provide a fast, prescribed variation in the output Q-switched peak power from pulse to pulse.

Figure 1:
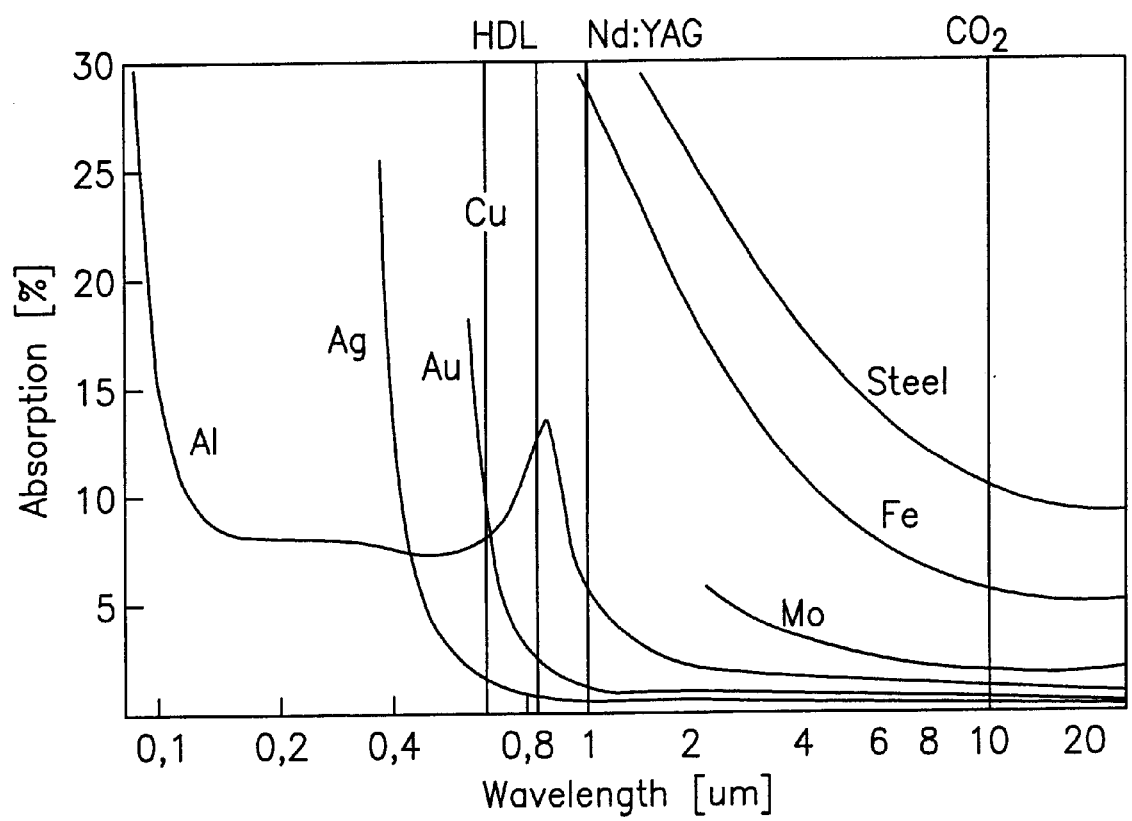
FIG. 1 is a graphical depiction of a comparison between the absorption rate of several different metals as a function of wavelength for several laser sources.
Figure 2:
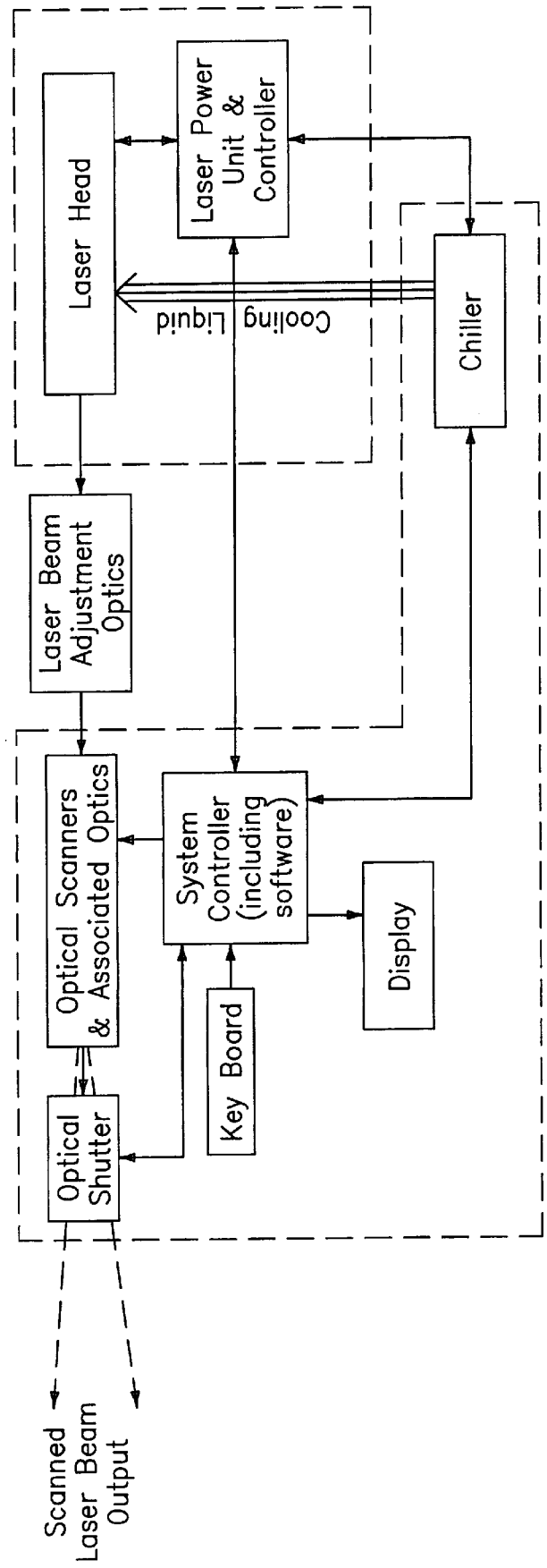
FIG. 2 is a block diagram of a generalized laser material working system.
Figure 3:
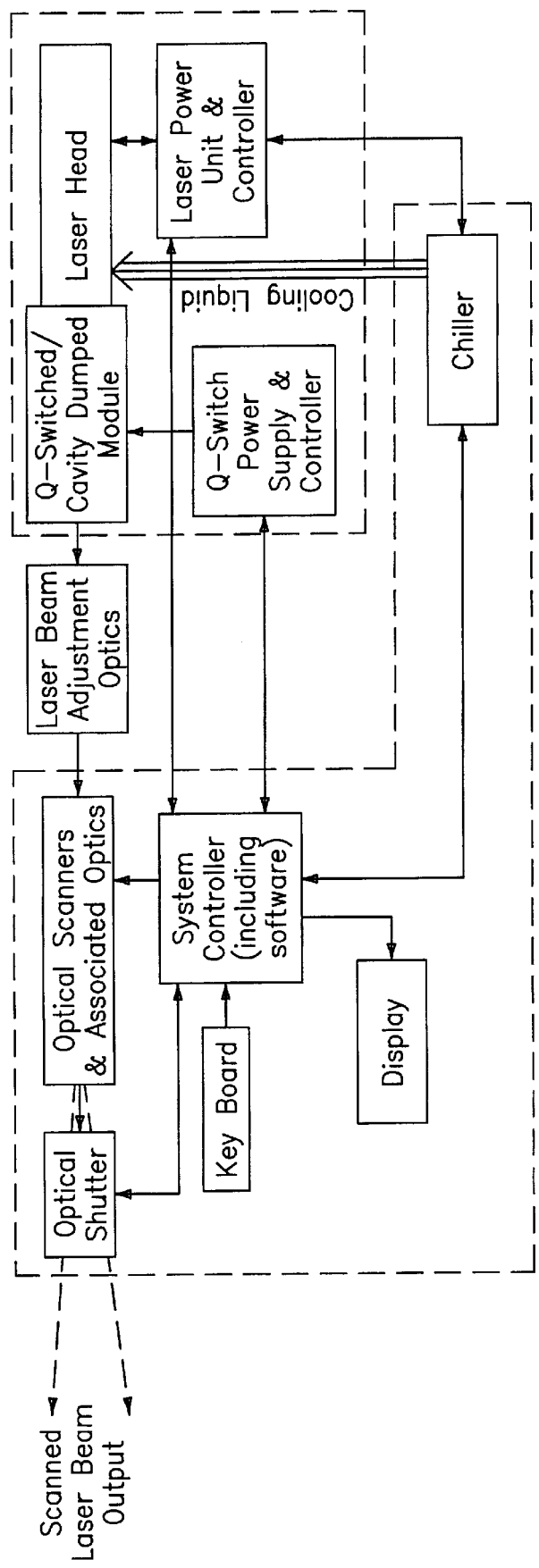
FIG. 3 is a block diagram of a generalized Q-switched or a simultaneously Q-switched cavity dumped laser material working system.
Figure 4:
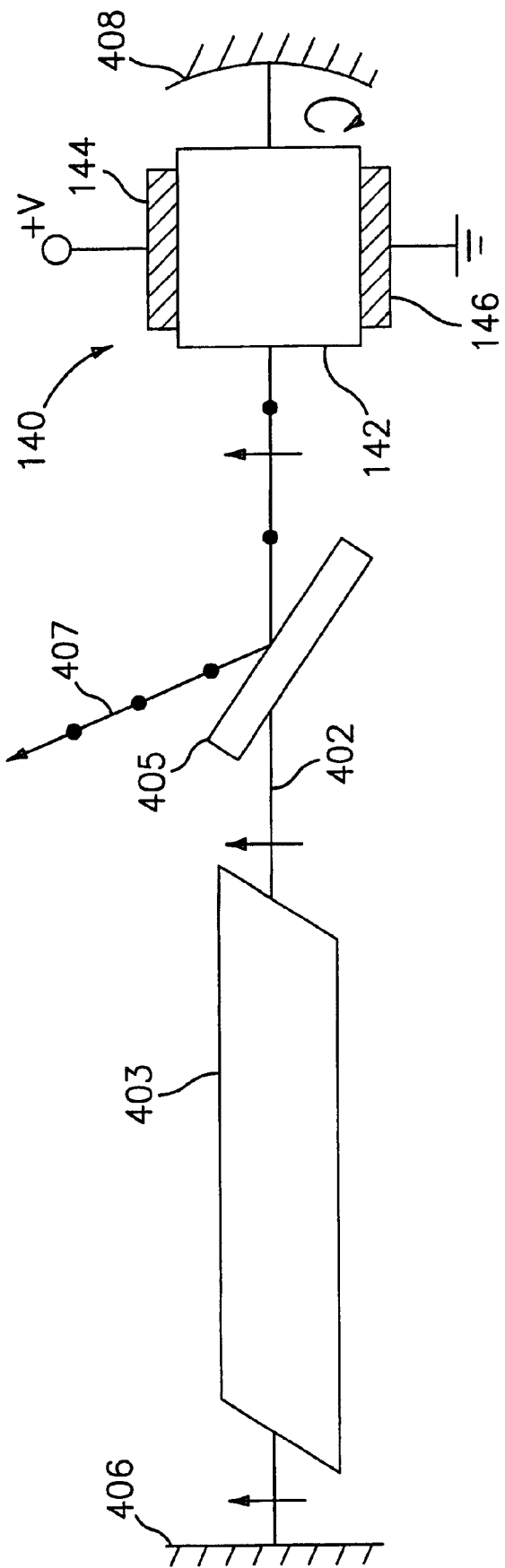
FIG. 4 is a schematic representation of a laser system generating an output beam by cavity dumping.

The output optical power from a laser is a relatively sensitive function of the laser intra-cavity losses. As such, using a method that allows the intra-cavity losses to be adjusted would permit the user to vary the laser output power in response to process demands. Since a Q-switched and simultaneously Q-switched cavity dumped laser utilizes an internal variable optical loss modulator, such as the EOM 140, one method for accomplishing this task is to control the amplitude of the high voltage pulse applied to the electro-optic modulator 140. One method of varying the pulse amplitude of the laser output is to adjust the output of a low voltage DC-to-AC-to-high voltage DC power converter power supply 266 shown in FIG. 42. This drives the EOM crystal 142 through the HV switching circuit 206 of FIGS. 13 and 18. In this approach, the operator of the laser material processing system of FIG. 4 supplies a low voltage DC setpoint command 260 to a power supply controller 262 which then adjusts the high voltage output 264 of the power converter 266 to minimize the difference between the output voltage 264 and the user supplied setpoint 260 by way of the voltage divider 270. This is illustrated in the block diagram 208 of FIG. 42.

It should be noted that the power converter 266 can be a linear regulator, switching regulator, or a hybrid. In addition, in cases where a free running power conversion stage is employed, the user setpoint 260 can be used to adjust the input supply voltage 268, which feeds the power converter 266. Since this approach adjusts the output 264 of the power converter 266 in response to user supplied setpoint command 260 the response time will be relatively slow, e.g., 10 kHz and lower. The power converter 266 plus the power supply controller 262 and the voltage divider network 270 comprise the high voltage power supply (HVPS) 208 of FIGS. 13 and 18.

The high voltage output 264 from the power converter 266 is applied to the high voltage switching circuit 206 of FIGS. 13 and 18 which turns the high voltage radio signal 178 across the EOM modulator 140 on and off as explained for FIGS. 13 and 18. The operation of the electronics schematically illustrated by FIG. 42 enables one to vary the Q-switched pulse 604a amplitudes of each pulse within the pulse train as exemplified by FIG. 41. This variation in Q-switched pulse amplitude contained within the laser feedback cavity will be replicated in the amplitude variation of the cavity dumped pulses emitted by the laser.

Figure 43:
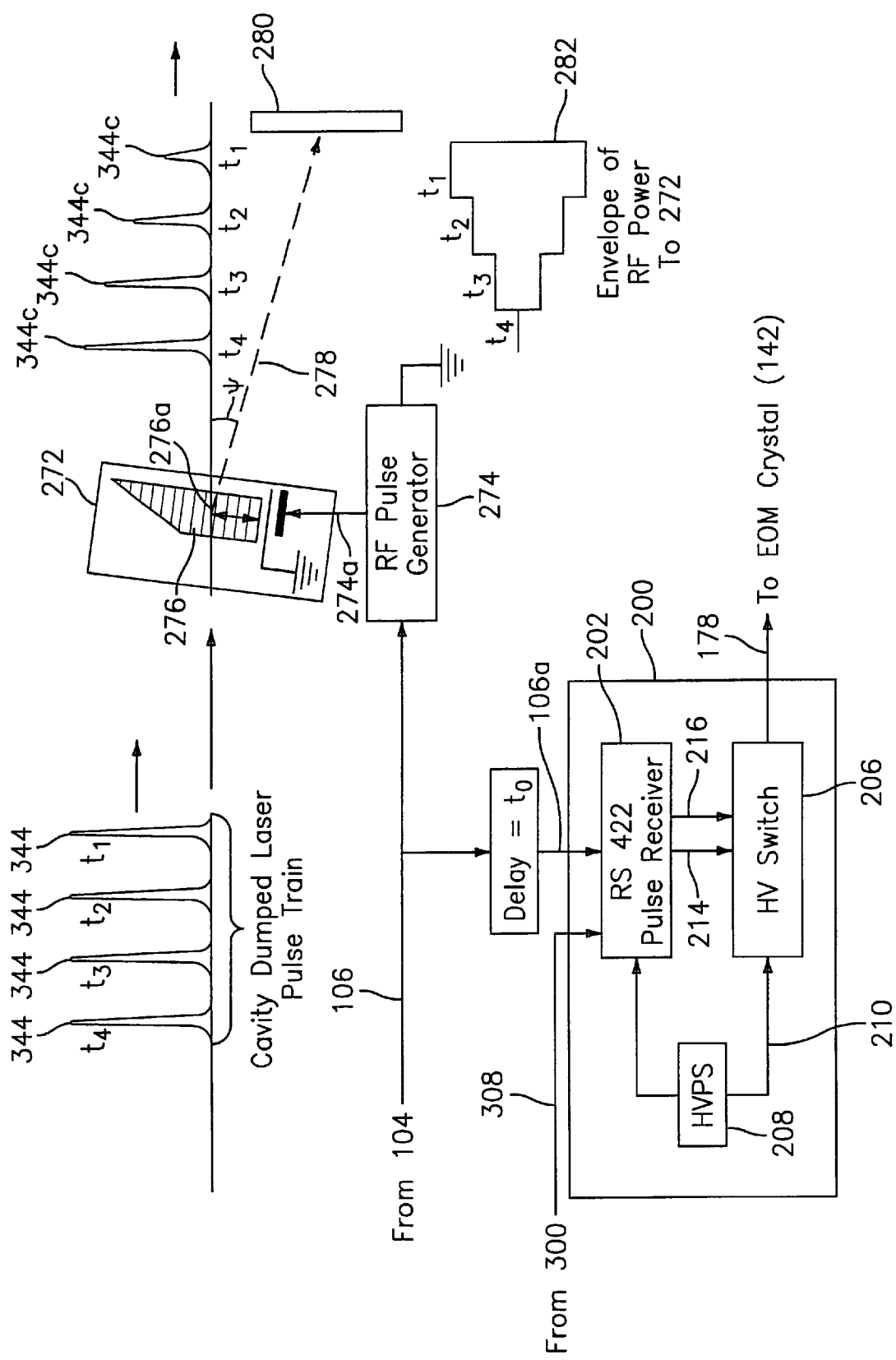
FIG. 43 is a schematic diagram of an acousto-optic system for controlling the output peak power of a Q-switched $CO_2$ laser.

Control of the Output of Individual Simultaneously Q-Switched and Cavity Dumped Pulses within a Train with an Acousto-Optic Cell An alternative method of varying the amplitude of individual Q-switched or simultaneously Q-switched cavity dumped laser pulses 344, within the train of pulses 604, 604a in FIGS. 39 and 41, is to use an optical loss modulator located external to the laser cavity 406, 408 of FIGS. 13 and 18 in order to obtain low taper in holes drilled by the laser. FIG. 43 schematically illustrates one approach by the use of an acousto-optic cell 272.

The Q-switched or simultaneously Q-switched cavity dumped pulse train 344 emitted by the laser is transmitted through an acousto-optic (AO) cell 272. Germanium (Ge) is a good AO cell material for $CO_2$ laser radiationbut its transmission loss is too high for use inside the laser cavity. The higher optical loss and slower switching times of AO cells when compared with EO modulators does not recommend them for intra-cavity loss modulation applications in $CO_2$ lasers utilized in industrial applications. Varying the RF signal 274a applied to the AO cell 272, varies the strength of an optical phase grating 276 generated within the Ge material. Such an optical phase grating 276 is generated by the ultrasonic wave propagating through the Ge material as is well known in the art. The optical phase grating 276 diffracts laser radiation 278 at the Bragg angle, ψ, out of the laser radiation 402 propagating through the AO cell 272. The Bragg angle, ψ, is determined by the ratio of the laser wavelength to the ultrasonic wavelength as is well known in the art. The higher the RF power 274a applied to the AO cell 272, the greater the amount of radiation 278 diffracted out of the laser beam 402 which is performing the drilling into a side order of the acoustically variable optical phase grating 276. This results in progressively larger amplitudes of the Q-switched pulses 344c, as seen at times $t_1$, $t_2$, $t_3$, and $t_4$. The diffracted laser beam is diverted onto an optical absorber or stop 280.

By synchronizing the RF power 274a applied to the AO cell 272, at a prescribed power level, to coincide with the arrival at 276a of a prescribed Q-switched laser pulse 344 propagating through the AO cell 272, one can vary the amplitude of each laser pulse 344 to a desired level. Since there is a time delay, to, necessary for the acoustic radiation to travel to the point 276a where the laser beam 402 passes through the AO cell 272, a comparable delay is induced in the signal 106 applied to the pulse receive 202, so as to obtain synchronization between the laser pulse train 344 and the RF power 274a applied to the AO cell 272 as shown in FIG. 43. This results in the increasing amplitudes of the repetitive pulse train 344c as time increases from $t_1$ to $t_2$ to $t_3$ to t4. The envelope of the RF power applied to the AO cell 272 is shown at 282 in FIG. 43. As can be seen, at time $t_1$ the envelope 282 of RF power is relatively high and the corresponding laser output pulse 344c at time $t_1$ is relatively small. However, as the magnitude of the envelope 282 diminishes at times $t_2$, $t_3$ and $t_4$, the corresponding amplitudes of the repetitive pulse train 344c increase respectively. The envelope of the RF power applied to the AO cell 272 is shown at 282 in FIG. 43. As can be seen, at time $t_1$ the envelope 282 of RF power is relatively high so that it causes the corresponding laser output pulse 344c at time $t_1$ to be relatively small because of the large diffraction out of the laser pulse by the acoustic wave generated by the RF power when the acoustic wave intersects the laser pulse in the AO cell. However, as the magnitude of the RF envelope 282 diminishes at times $t_2$, $t_3$ and t4, the corresponding amplitudes of the Q-switched pulse train 344c increase respectively because of the smaller amount of diffraction caused by the lower amplitude acoustic waves generated by the decreasing RF power envelope 282.

Control Of Individual Q-switched Cavity Dumped Pulse Peak Power By Control of Timing Between the RF Super Pulse Exciting The Discharge and the High Voltage Applied to the EOM Another method for obtaining variable peak power in the laser output pulse 344 as in FIG. 41 and the upper portion of FIG. 43 is to utilize the fact that the gain of the laser medium 726 begins to increase up to a maximum value in a time TPBT after the input power 602 (FIGS. 39 and 41) energizing the laser is turned on. Consequently, the timing between the initiation of the input power 602 energizing the laser and the switching of the laser cavity comprising mirrors 406, 408 from a high loss state to the low loss state (i.e. in the Q-switched case) and back again to a high loss state for the simultaneously Q-switched cavity dumped case will vary the peak power of an emitted laser pulse. If a shorter time is provided between the initiation of the laser pumping energy and the switching of the laser cavity 406, 408 from a high loss condition to a low loss condition, then the gain of the laser medium will not have peaked. Consequently the first pulse to be emitted will not have as large a peak power as it could have. After the cavity dumped pulse is emitted by the laser, the gain of the medium has dropped down to the value required to maintain CW oscillation for the cavity loss condition. The gain of the laser medium 726 then begins to build up again when the cavity 406, 408 is switched to a high loss condition. The time required to exceed the laser gain at which the first laser pulse was emitted is now shorter because the gain build up begins at a larger population level than was the case for the first cavity dumped pulse. If one then again switches from the high loss condition to a low loss condition at a time so that the gain is higher then when the first Q-switched pulse radiation contained within the cavity was emitted as a cavity dumped pulse, then the second emitted laser pulse will have a higher peak power than the first pulse. These events can continue for a number of cavity dumped laser pulses, thereby obtaining the increasing peak power of succeeding subsequent pulses until a maximum gain condition is reached. The number of pulses capable of being emitted by the laser is determined by the pumping intensity, the gain threshold of the laser, the time interval desired between the Q-switched pulses, the gas pressure of the laser, the cooling capability of the laser design and the amount of time delay between the initiation of the RF super pulse 602 pumping of the laser and the switching of the laser cavity 406, 408 from a high loss state to a low loss state.

FIG. 44 illustrates the results when the RF super pulse 602 of FIG. 40 is shortened from 60 microsecond to approximately 48 microseconds, the time interval between pulses is maintained at approximately 10 microseconds for both cases, and the time between switching from a high cavity loss to a low cavity loss condition is shortened so that the first Q-switched cavity dumped pulse is emitted approximately 14 microseconds after the initiation of 602 as indicated in FIG. 44. Note that under these conditions, four Q-switched pulse are obtained with each succeeding pulse increasing in amplitude. The advantage of this approach over that of FIGS. 41 and 43 is simplicity and cost. The disadvantage is the loss of flexibility.

Figure 45:
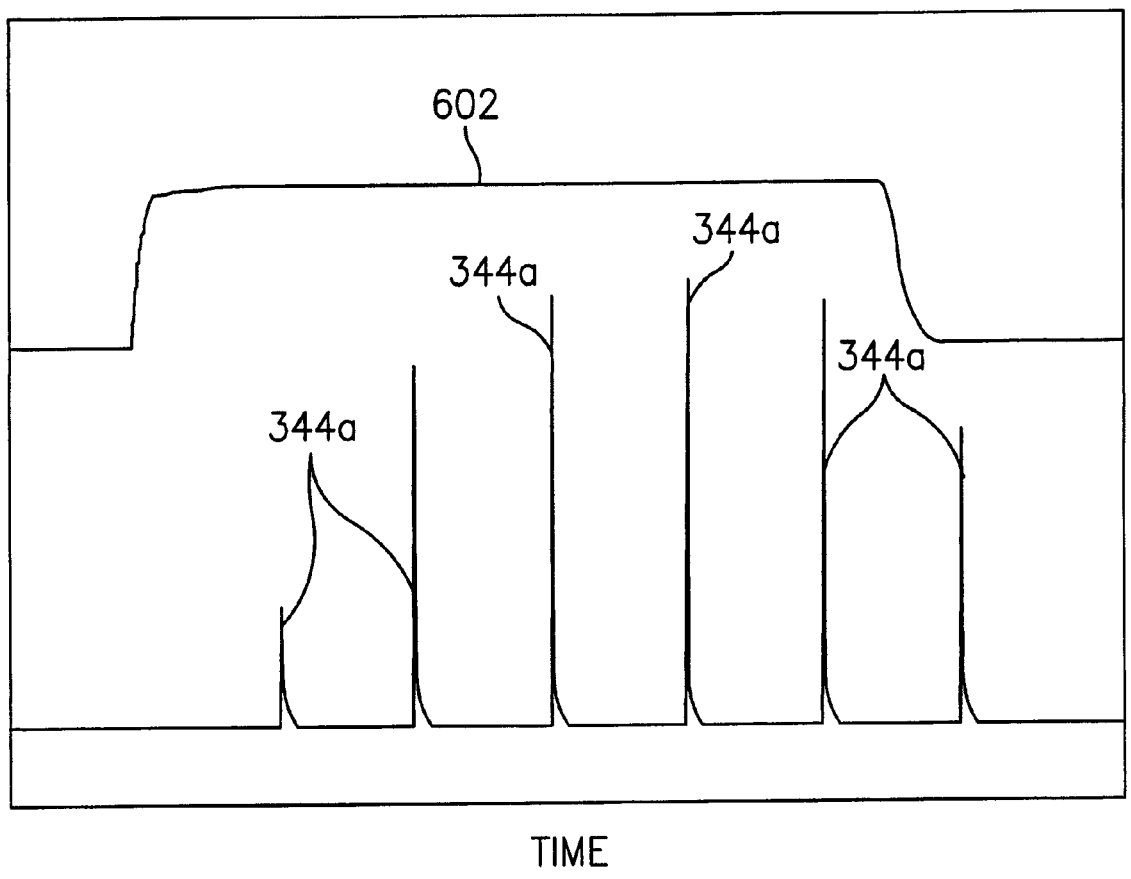
FIG. 45 is a second graphical depiction of a simultaneously super pulsed RF pulsed pumped, Q-switched and cavity dumped $CO_2$ laser showing varying repetitive Q-switched output pulses.

For example, if the RF pumping super pulse 602 is increased to 72 microseconds and the time interval between pulses and the initiation of the high loss to low loss optical cavity switch after the initiation of the RF super pulse pumping process remain essentially the same, then the number of output pulses 344 increases to 6 pulses but the peak power of the last two pulses are decreasing in peak power (see FIG. 45). Such drop off in the amplitude of the latter pulses is generally not desirable in hole drilling operations. The time interval between pulses is selected based on the optimum time for the material removal from the hole before the arrival of the next pulse on the material. The approaches of FIGS. 41 and 43 provide for greater freedom and therefore for simpler optimization of the time interval between emitted laser pulses and more independent control of the peak power of the laser pulses. None-the-less, if the approach of FIG. 44 satisfies the application, it is lower in laser implementation cost.

The concept presented is described in terms of a $CO_2$ Q-switched and simultaneously Q-switched cavity dumped lasers, but the principle is applicable to other lasers such as semiconductor diode pumped or flash lamp pumped solid state laser such as YAG lasers also commonly used in via hole drilling.

Q-Switched/Cavity Dumped Laser with Amplifier Packaging

The apparatus and methods described herein above for FIGS. 13 through 47B are utilized to realize a CW pumped Q-switched, cavity dumped $CO_2$ laser with all the advantages these techniques provided to the Q-switched laser. These techniques can also be utilized to realize a gain switched (i.e. super pulsed), Q-switched, cavity dumped laser while again maintaining all the advantages available to the gain switched (i.e. super pulsed), Q-switched lasers described in FIGS. 38A and 38B.

The laser amplifier (FIG. 6) and the laser head packaging of FIGS. 14, 48A, 48B, 48C can be utilized to obtain a Q-switched, cavity dumped laser in a comparable sized package as for the Q-switched laser.

In the simultaneously Q-switched cavity dumped case, the ADDC 306 provides a signal 308a directly to the HV switch 206 and not to the RS-422 pulse receiver, as may be done in the Q-switched operation, in order to obtain the required fast switching time.

The ADDC approaches of FIGS. 28, 29A, 29B, 30A and 30B may be modified to make them function in a Q-switched, cavity dumped laser system. FIG. 5 schematically illustrates the block diagram of either a RF CW pumped, a RF pulsed pumped, or a super RF pulsed pumped Q-switched, cavity dumped $CO_2$ laser system 100 with an optional multi-pass folded waveguide $CO_2$ laser amplifier mounted as disclosed in U.S. patent application Ser. No. 09/566,547 entitled "A Method and Apparatus for Increasing the Power of a Waveguide Laser" filed on May 8, 2000 and incorporated herein by reference. In the above referenced patent application, a technique was utilized to couple two-gain medium into one laser oscillator. If one or more amplifiers is needed to achieve desired pulse energy, then the approach of U.S. patent application Ser. No. 09/566,547 can be used to obtain rugged, rigid, and small laser/amplifier packages suitable for industrial applications. In U.S. patent application Ser. No. 09/566,547, the technique was used to couple more than two laser gain media together to obtain one laser oscillator of higher power. The approach can be used for the oscillator/amplifier arrangement.

Laser amplifiers are the same as laser oscillators except that no feedback mirrors are utilized in laser amplifiers. Instead of a totally reflecting feedback mirror and a partially reflecting output mirror, laser amplifiers utilize transparent input and output windows 413 as seen FIG. 6. For $CO_2$ lasers, windows of ZnSe are suitable as well as other materials. The windows are fabricated with a small wedge angle in order to eliminate frequency selective etalons effects. This oscillator/amplifier packaging arrangement of FIG. 5 has all the advantages listed in U.S. patent application Ser. No. 09/566,547 that discussed the advantages of mounting two gain media, one on top of the other, to obtain one higher power oscillator and to share the same coolant passages. Besides providing a rigid, compact and rugged package it also provides a symmetric thermal design, which is beneficial from a cavity alignment and beam-pointing viewpoint. One is referred to U.S. patent application Ser. No. 09/566,547 for additional detail of this packaging approach. In this disclosure the package technique is applicable to oscillator/amplifier combinations as well as to the oscillator combinations that were described in U.S. Patent Application No. 09/566,547.

Since the output beam 407 of the Q-switched, cavity dumped laser 100, is rotated 90°, the output beam 407 has to undergo another 90° rotation in order to pass through the waveguide amplifier 400a with low loss. The reason is that the polarization of the output beam 407 has to be parallel to the plane of the metal electrodes 724, 730 (FIG. 13, 18, 24A-25B) placed on either side of the ceramic waveguide 806 for low loss propagation through the waveguide 806 as discussed in U.S. patent application Ser. No. 09/566,547. Such rotation can be accomplished with 2, 3, or 4 mirror polarization rotators 411 as described in U.S. patent application Ser. No. 09/566,547, but other types of polarization rotators can also be used. FIG. 5 illustrates the positioning of the polarization rotator 411 with respect to the output beam 407.

In this configuration, instead of having two reflecting mirrors positioned at 45° as in U.S. patent application Ser. No. 09/566,547, one would use the TFP 404 and mirror $M_3$ 409 of FIG. 5 to redirect the output beam 407 of the oscillator 406 into the laser amplifier 400a. The periscope in this case does not have to be attached to the laser oscillator head 400.

CW Pumped Q-Switched/Cavity Dumped Laser

Figure 6:
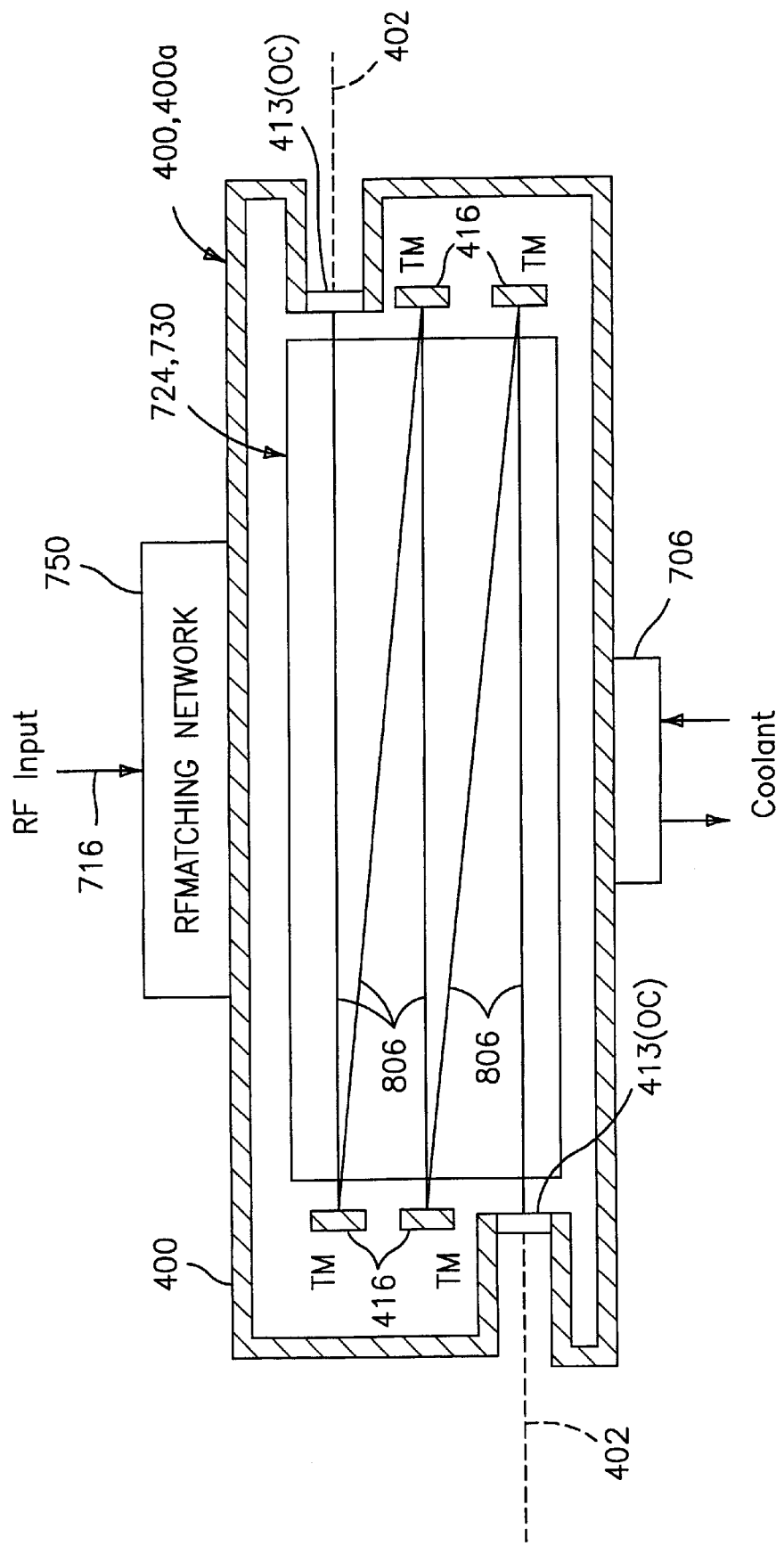
FIG. 6 is a schematic representation of a laser amplifier head of the laser system of FIG. 5 using a folded NV waveguide configuration for the gain region.

The beginning of the explanation of the operation of the Q-switched, cavity dumped laser in the preferred configuration can be provided with the aid of FIGS. 24A, 24B, 25A, 25B. The CdTe EOM crystal 142 is as described for FIGS. 19, 20 and 21. The voltage across the EOM 140 is normally off so that the deleterious effects explained for FIGS. 22 and 23 do not occur. FIG. 6 illustrates the laser folded waveguides and associated mirrors for either the oscillator or the amplifier head. It will be understood that the laser beam can be folded with turning mirrors without the use of waveguides. This invention is applicable to either the folded waveguide or to the folded free space laser beam path. Note that optical output couplers 413 (OC) are transparent windows (e.g. ZnSe are suitable for $CO_2$ lasers for coupling out the laser radiation from the hermetrically sealed portion 400 of the laser head 400). A folded five-pass NV configuration 806 is illustrated in FIGS. 6, 13, and 18 but fewer or larger number of passes can be utilized in a waveguide or a free space arrangement. These windows 413 are hermetically sealed to the laser head 400 package so as to maintain a partial vacuum for the $CO_2:N_2:He$ gas mixture inside the laser head 400 as disclosed in U.S. patent application Ser. No. 09/566,547 and U.S. patent application Ser. No. 09/612,733 entitled "High Power Waveguide Laser" filed on Jul. 10, 2000 and incorporated herein by reference. FIG. 6 represents the multi pass waveguide laser amplifier depicted in FIG. 5.

As explained in FIGS. 24A, 24B, 25A, 25B, and with reference to FIGS. 7 and 12, with zero voltage applied to the CdTe EOM 140 (FIGS. 7A–7C or FIGS. 12A–12C, the laser is in a high loss state because the reflective phase retarder (RPR) 410 rotates the radiation within the feedback within the resonator cavity 406, 408 by 45° on each reflection for a total of 90° in a round trip. Consequently, feedback is prevented from occurring because the thin film polarizer 404, TFP, prevents this polarization from passing through it. In FIGS. 24A, 24B, 25A, 25B the TFP 404 was located at the end of the laser head that was near the CdTe EOM crystal. It is optional on which end of the gain medium it is located. When the high voltage is applied to the CdTe EOM crystal 142 (FIG. 7E or 12E), polarization is rotated by 45° on each pass for a total of 90° rotation. This polarization is able to propagate through the TFP 404 and laser radiation begins to build-up within the optical resonator as explained for FIGS. 27 and 28 (see FIGS. 7F and 12F). This cavity build up time is approximately ½ microsecond for sealed-off $CO_2$ lasers. After a laser cavity build-up time (CBT), strong oscillations build up rapidly within the feedback cavity. The rise time of the laser pulse for sealed-off $CO_2$ lasers is approximately 70 to 100 nsec. Since the feedback mirror 406 is a totally reflecting mirror in the cavity dumped case, and mirror 408 is almost totally reflecting (i.e. 99.5% or higher) essentially no radiation escapes from the optical cavity. Consequently, the radiation builds up a liffle faster in the optical cavity of a cavity dumped laser in the configuration of FIG. 5 than in the Q-switched laser case where FBM 406 is partially reflecting with approximately 50% to 70% reflectivity. This leads to a slightly faster pulse rise time. The cavity build-up time is typically 70 to 100 nsec depending on the gain of the laser medium and losses associated with the optical resonator. After the optical radiation stored within the resonator reaches a maximum, the voltage on the EOM crystal 142 is quickly removed so that the radiation stored within the cavity is "dumped" or coupled out of the cavity by the TFP 404 (see FIG. 7G or 12G). The pulse width of the radiation coupled out of the cavity is approximately equal to the time required for the radiation to make one round trip within the cavity. For a five-pass folded waveguide laser configuration 806 shown in FIG. 6, the pulse width is between 10 to 20 nsec depending on the length of the laser resonator. Simultaneously Q-switched cavity dumped lasers have approximately one order of magnitude shorter pulses than Q-switched $CO_2$ lasers.

The sequence of events that lead up to a Q-switched, cavity dumped output pulse is schematically illustrated by FIGS. 7A through 7G. In FIG. 7A, at a given time "$t_a$," RF power is applied to the laser head. This RF power results in a build up of the population in the upper quantum level of the laser medium as shown in FIG. 7B. Once the population of the upper quantum level reaches steady state at time "$t_b$" (which is on the order of 10 microseconds, depending on various conditions such as pump power, temperature, cavity Q, etc.), a command voltage signal is feed to the RS422 pulse receiver to apply a high voltage to the electrodes 144, 146 of the EOM crystal 142 as illustrated in FIGS. 7C and 7E respectively.

This high voltage allows positive feedback with the optical resonator to develop and optical energy storage begins to build up within the resonator as shown in FIG. 7F. Since the feedback mirrors are highly reflective, little or no radiation leaks out of the laser resonator and the optical radiation stored within the resonator builds up to a very high level. The time, CBT, to build up to a maximum is typically less than 0.5 microseconds (i.e. 300 to 450 nsec). Once the maximum radiation energy storage is reached within the resonator at time "$t_c$", another command voltage signal is supplied to the high voltage switch 206 to remove the high voltage from the CdTe EOM crystal 142 as shown in FIG. 7D As previously described, this rotates the polarization of the radiation within the resonator so that the cavity is converted to a high loss condition by coupling the radiation out of the optical resonator by the TFP 404, of FIG. 5. The dumping of the radiation within the resonator occurs in a time (T) approximately equal to twice the optical length (L) of the optical cavity (L=the unfolded optical path between mirrors $M_1$ and $M_2$) divided by the velocity of light, c. For the laser waveguide 806 illustrated by FIG. 6, T=10 to 20 nsec, with 15 nsec being typical. The peak powers of the output cavity dumped laser pulse can exceed 20 kW in the case of continuously RF pumped sealed-off diffusion cooled waveguide $CO_2$ lasers and much higher under simultaneous RF super pulsed excitation of the discharge.

For the CW RF pumping condition shown in FIGS. 7A through 7G, the energy storage in the upper laser state again achieves steady state at time "$t_e$" shown in FIG. 7B. Consequently, the process can be repeated. For diffusion cooled waveguide $CO_2$ lasers, 100 kHz pulse repletion rates are readily achieved. Cavity dumping automatically eliminates the long tail 344a associated with Q-switched laser pulses. This tail elimination is advantageous in material processing applications.

Figure 8A:
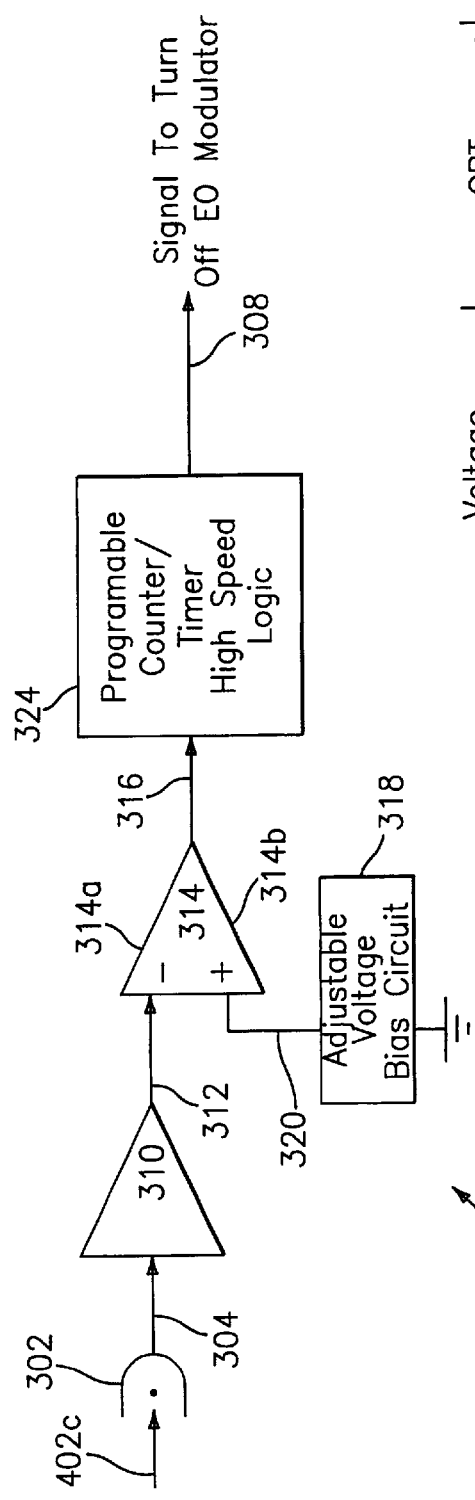
FIG. 8A is a first schematic representation of an electronic circuit for truncating a portion of the radiation contained within the Q-switched laser cavity which then becomes the output pulse in a simultaneously Q-switched and cavity dumped $CO_2$ laser.
Figure 8B:
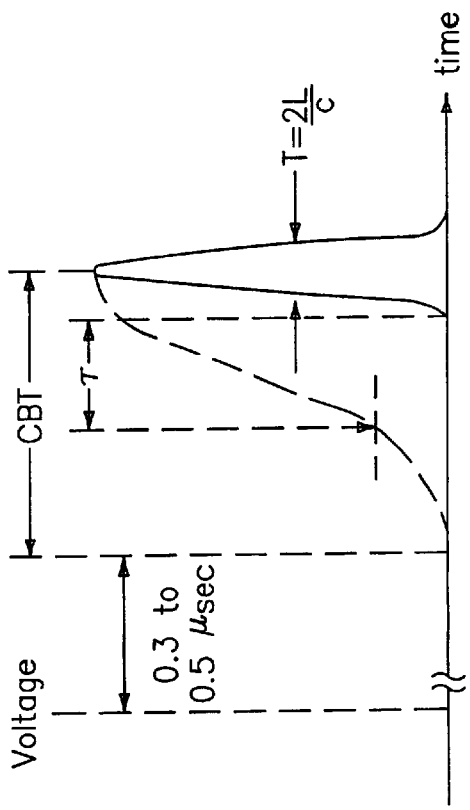
FIG. 8B is a graphical representation of the energy stored within a resonator and a cavity dumped pulse for the electronic circuit of FIG. 8A.
Figure 9:
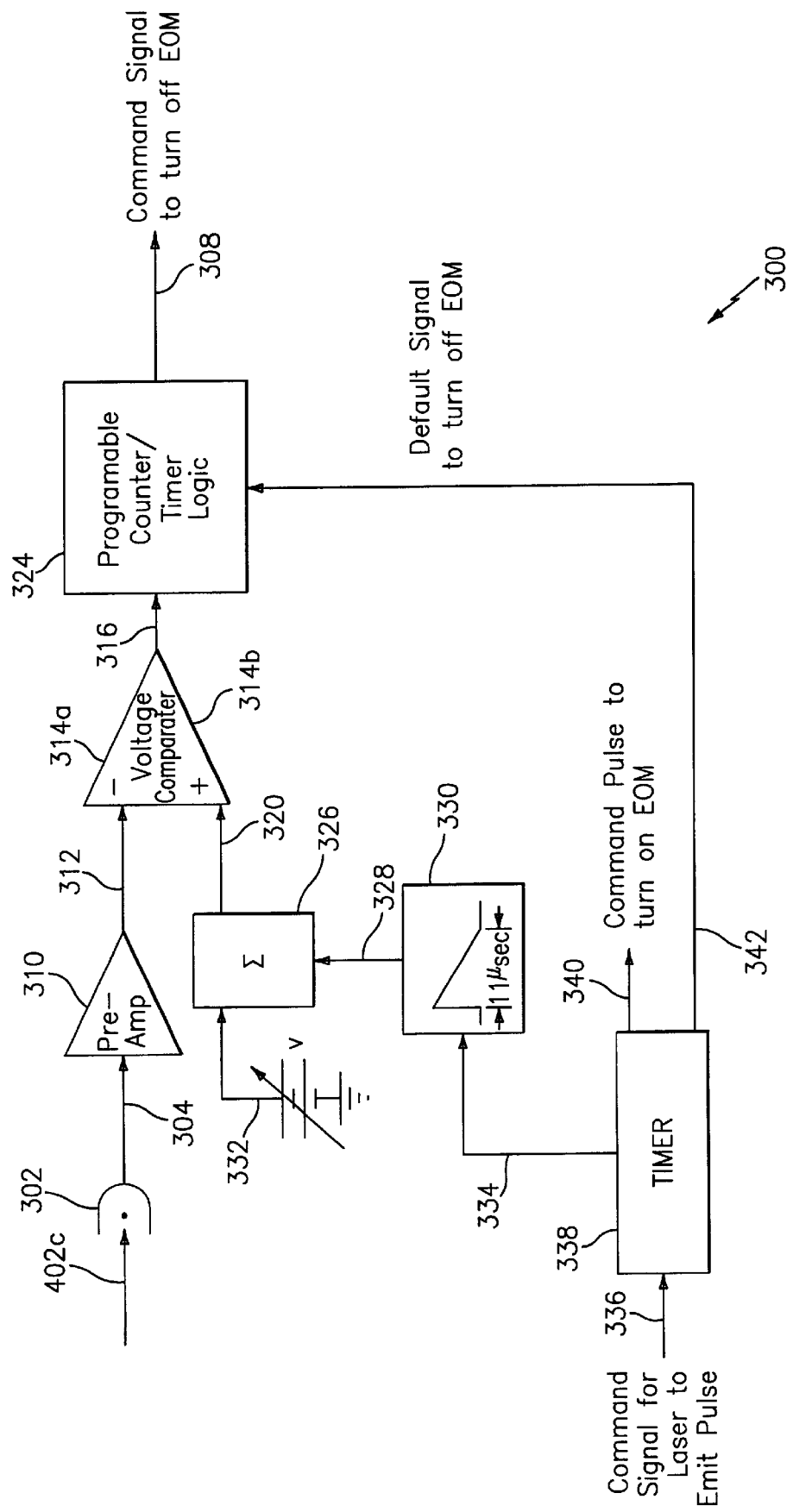
FIG. 9 is a schematic representation of an Automatic Down Delay Circuit for compensating for changes in pulse repetition rate and temperature in a simultaneously Q-switched cavity dumped laser.

Automatic Time Delay Circuits for Simultaneously Q-Switched and Cavity Dumped Lasers One simple circuit for achieving the timing of the command signal of FIG. 7D to coincide with the peak of the resonator energy storage cycle (see FIG. 7F) so as to maximize the energy content of the cavity dumped pulse of FIG. 7G is the circuit of FIG. 8A or 9. Faster electronic components are required (such as emitter coupled logic (ECL) circuits) for the cavity-dumped operation than are used in the Q-switched case. These faster logic circuits are used in the high speed logic block illustrated in FIG. 8A. FIG. 8B illustrates the build-up of the energy stored within the resonator and the subsequent cavity dumped pulse that occurs when the amplified electrical signal, $S_1$, resulting from the Q-switched radiation, building up within the resonator and irradiating detector PDT 302, is applied to a voltage comparator 314 and it becomes greater than a selected voltage bias signal, $S_2$. When $S_1$ becomes larger than $S_2$ the voltage comparator 314 issues a signal 316 to a high speed logic circuit 324 which issues a command signal 308 to the high voltage switch 206 to turn off the voltage to the EOM crystal 142. The electronic propagation time delay, τ, is of the order of 40 to 50 nsec. The optical signal detected by the detector PDT 302 of FIG. 8A is obtained from $M_1$ of FIG. 5 (or from mirror FBM of FIG. 18). When the voltage applied to the EOM 140 is turned off, the energy stored within the resonator is dumped out of the resonator by the TFP 404 to yield a short laser output pulse of 10 to 20 nsec duration.

One problem with the ADDC circuit 300 of FIG. 8A is that it cannot compensate for changing pulse amplitudes that occur because of changes in the laser pulse repetition rates or from second order effects arising from temperature variations. Changes in these parameters cause changes in the quantum population and its quantum build-up time (QPBT), which in turn changes the gain of the laser medium, the cavity build-up time (CBT) and the rise time of the Q-switched radiation building up within the optical resonators. Without timing compensation, variations will occur in the peak power of the cavity dumped pulses as the repetition rate and temperature vary.

FIG. 9 illustrates a ADDC circuit 300, which can compensate for changes in pulse repetition rates and temperature. The use of emitter coupled logic (ECL) components will enable the realization of 40 to 50 nsec electronic propagation times (EPT) from the electrical signal 304 generated by the detector 302 through the preamplifier 310, the voltage comparator 314, the logic circuit 324 and the high voltage switch 206 of FIG. 5. A time varying voltage bias signal 332 in the form of a DC voltage bias plus a ramp signal 330 can be utilized to adjust the signal 320 ($S_2$) fed to the voltage comparator 314. When the amplified signal ($S_1$) 312 from the detector 302 is equal or greater than S2, the logic circuit 324 issues a command signal 308 to remove the high voltage across the CdTe EOM crystal 142 (see FIG. 7D or 12D). The voltage ramp 328, 330 can be linear or nonlinear depending on the exact amount of compensation desired. The voltage ramp 328, 330 can have either a positive slope as in FIGS. 10A through 10C or a negative slope as in FIGS. 11A through 11C or other arrangements.

In FIG. 9, the command pulse 308 is provided to turn on the voltage to the EOM 140 by way of the RS-422 pulse receiver 202 of FIG. 5 as shown in FIGS. 7C and 12C. The timer 338 also provides a signal 334 after an appropriate time delay, as shown between the pulses of FIG. 7C and FIGS. 7D and 12C and 12D, which starts the voltage ramp 328, 330. The summation of the voltage ramp 328 plus the DC bias voltage 332 constitutes the signal $S_2=V\pm\Delta V$ (i.e. the plus or minus sign is selected by the slope and polarity of the ramp voltage 328 and the bias voltage, V 332). The timer 338 issues a default signal 340, after an appropriate delay, to turn off the high voltage applied to the EOM crystal 142 in the event that a fault occurs and the command signal 308 from the high speed logic 324 is not issued to the high voltage switch 206 when the condition $S_1 \geq S_2$ exists.

FIG. 10A illustrates the build-up of the radiation stored within the optical resonator as detected by the detector 302 and corresponding to FIGS. 7F and 12F under various conditions which cause the laser build up time to vary in time as the peak power of the radiation is reduced. The changes in the laser pulse amplitudes and the time delays of the cavity build-up radiation are determined primarily from gain changes that occur in the laser medium arising from variations in RF pump power pulse repetition rate and temperature. For lower gain, the CBT becomes longer and the peak power becomes lower. The electronic propagation time (EPT) is fixed at approximately 40 nsec to 50 nsec. If the high voltage pulse width (HVPT) of FIGS. 7E and 12E is also fixed, then dumping of the radiation within the cavity will not occur at the peak of the Q-switched radiation stored within the optical resonator. This problem associated with the ADDC of FIG. 8A can be compensated with the use of a voltage ramp 328$a$ as indicated in FIG. 10B. The voltage ramp 328$a$ adjusts the time at which $S_1 > S_2$ to compensate for the increase in the laser cavity build-up time (CBT). This automatically adjusts the high voltage pulse width (HVPT) of FIGS. 7E and 12E to insure that optimum peak powers are obtained with changes in CBT. FIG. 10C illustrates the use of a negative voltage ramp 328$b$ with a positive slope so that the condition is satisfied when $S_1 = V - \Delta V$ where V is larger than $\Delta V$. This approach is also applicable in the simultaneous super pulse repetitively Q-switched cavity dumped operation of FIGS. 38, 39 and 12. Normally in the simultaneous super pulse repetitive Q-switched operation succeeding pulses decrease in amplitude and the corrections of FIGS. 10A through 10C, are useful in compensating for this behavior when "cavity dumped" operation is utilized.

One problem that may occur with the circuit of FIG. 9 is electrical noise that could interfere with the low voltage levels at which the condition $S_1 \geq S_2$ is to be satisfied. Because of the high voltage in the fast switching associated with turning on and off the EOM 140, electromagnetic interference (EMI) could make reliable triggering of the logic circuit 324 when $S_1 \geq S_2$ difficult. The voltage ramp configuration 328$c$ of FIGS. 11A through 11C can eliminate this EMI problem by raising the voltage high enough so the $S_1 \geq S_2$ condition occurs above the EMI noise level.

Increasing the speed of the electronics means that smaller EDT can be accommodated which means that triggering higher up on the pulse rise time can be accommodated which in turn reduces the EMI noise problems with this approach.

Figure 11A:
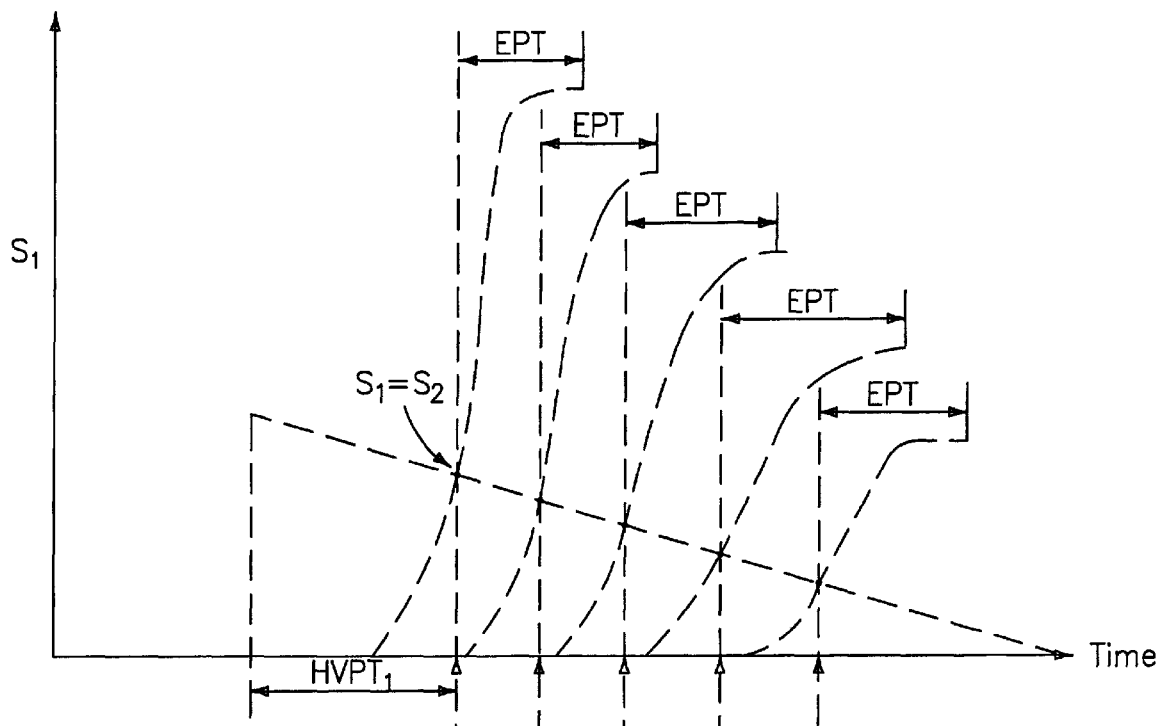
FIG. 11A is a second graphical representation of the temporal characteristics of an electrical signal indicative of the radiation of the laser of FIG. 5.
Figure 11B:
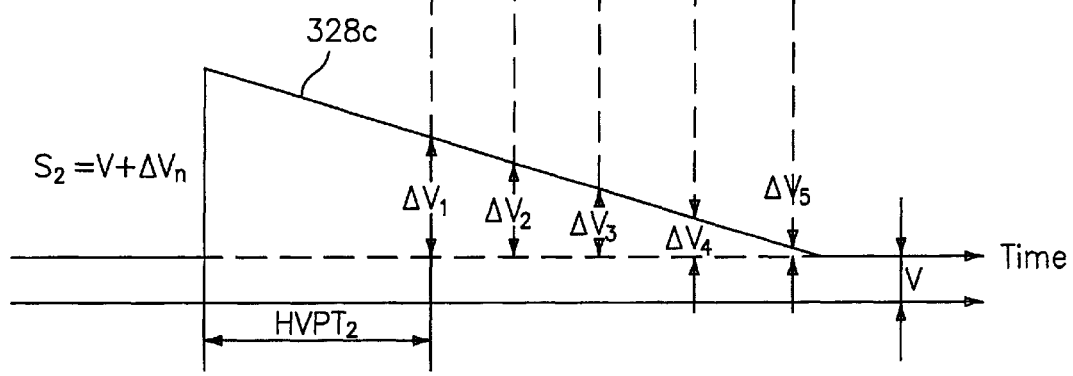
FIGS. 11B and 11C are second graphical representations of the temporal characteristics of bias signals for comparison with the electrical signal of FIG. 11A.
Figure 11C:
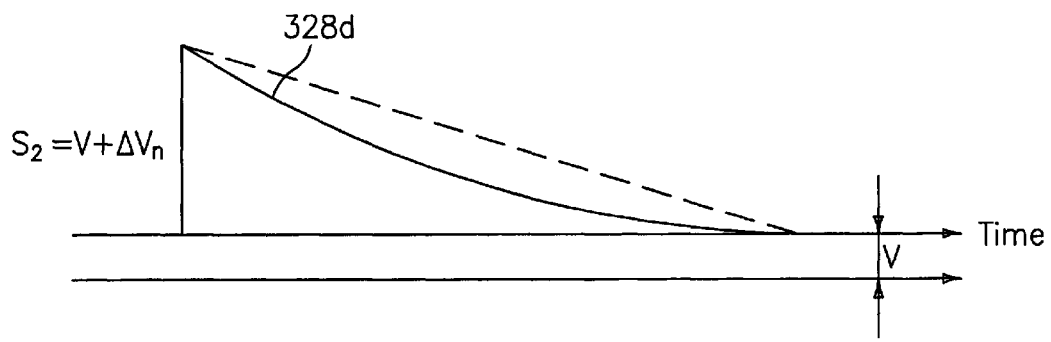

In FIGS. 11A through 11C, a combination of a DC bias and a negatively sloped voltage ramp 328$c$, 328$d$ are used so that $S_2 = V + \Delta V_n$ where n=1, 2, 3 . . . m. Both approaches of FIGS. 10A through 10C and 11A through 11C are able to vary the HVPT high voltage pulse width applied to the EOM 140 to enable the "cavity dump" to occur at approximately the peak of the cavity radiation build-up with a constant EPT. For more accurate compensation, an appropriate concave curvature 328$d$ to the voltage ramp can be used as shown in FIG. 11C. The actual curvature, for example, an exponential decay such as $V(t) = V_o e^{-\beta t}$, is determined by either experiment or analysis to fit the Q-switched, cavity dumped laser model. The approaches of FIGS. 11A through 11C are also useful in the simultaneous super pulse repetitive Q-switch operation of FIGS. 38, 39.

Super Pulse Pumped Q-Switched/Cavity Dumped Laser

The advantages of super pulsed pumping of a simultaneously Q-switched, cavity dumped laser are the same as for the Q-switched laser described in FIGS. 38A, 38B and 39, namely, the ability to greatly increase the energy storage in the upper laser level so as to obtain higher energy in the cavity dumped pulse and correspondingly higher peak powers. Both are desired in short pulse material processing applications. This is achieved with a RF power supply 716 having an average power equal to or less than ½ the pulsed peak power. The high peak power is obtained by operating the power supply 716 at a duty cycle of $V_2$ or less. The ratio of the pulsed peak power to the average power obtainable is determined by the solid-state power devices used and the pulsed duty cycle at which the RF power supply operates. The lower the duty cycle, the higher the RF peak power operation that can be achieved. Considerably higher peak power/average power ratios are obtained by the use of RF vacuum tubes as the power devices inside the RF power supply rather than the use of transistors. The use of higher RF peak power enables the use of higher gas pressures within the laser head 400, than are possible with CW RF power because of the difficulty in initiating a discharge as well as with the occurrence of arching within high-pressure DC discharges. Such arching is deleterious to laser action. The use of higher RF frequencies also enables the use of higher gas pressures but at added expense, especially with solid-state devices. A decrease in the diffusion cooling of the gas occurs with increasing pressures. To compensate for this reduced cooling at higher pressures, lower super pulse repetition frequencies are used. The lower cost advantages gained by utilizing super pulsed laser operation to obtain higher energy per pulse makes the use of super RF pulse excitation of the gas medium worthwhile. Consequently, simultaneously super-pulsed operation with Q-switching and cavity dumping is advantageous.

FIGS. 12A through 12F illustrate the sequence of events for super pulsed pumped Q-switched, cavity dumped laser operation; whereas FIGS. 7A–7G illustrate the sequence of events for CW pumped Q-switched cavity dumped operation. Except for changes in FIGS. 12A and 12B, the operation is essentially the same as that described in FIGS. 7A through 7G. The discussion for the ADDC 300 is the same as for FIGS. 8A and 8B, 9, 10A, 10B, 10C and 11A, 11B and 11C. These same ADDC circuits 300 are also usable with the super pulsed cavity dumped approach. FIGS. 12A through 12G uses a super RF pulse excitation duty cycle of 12 as an example.

FIG. 12A illustrates, as an example, a super pulse power ($P_{RFP}$) equal to twice the continuous wave (i.e. average) power ($P_{RFCW}$) capability of the RF power supplied to a diffusion-cooled laser. The duty cycle shown is ½ of the average power. This quoted duty cycle serves only as an example. Lower duty cycles with corresponding higher peak powers can be utilized with the use of vacuum tubes or advanced technology transistors. When the RF power is turned on at time "$t_a$," over population of the upper laser level begins and after a quantum population build-up time (QPBT), the population reaches a steady state at time "$t_b$." For a RF super pulsed operation having a duty cycle of ½, the average power for a diffusion cooled laser having an output power capability of 100 W under normal continuous operation and subjected to the losses associated with the optical components inserted in the optical resonator indicated in FIGS. 5, 6 and 13, the QPBT is typically less than 10 microseconds. Pumping the discharge harder would further decrease this time.

When the steady state is reached at point "$t_b$" or soon after, a command pulse (FIG. 12C) is issued to turn on the high voltage to the EOM crystal 142 (FIG. 12E). Applying high voltage to the EOM 140 causes laser action to begin, thereby causing optical radiation to build-up within the laser resonator. This typically has a time between 300 to 450 nsec for the conditions stated. When the Q-switched radiation within the laser cavity builds to a peak at time "$t_c$" (i.e. the cavity build-up time, CBT) as shown in FIG. 12F, a voltage pulse issued by the ADDC of either FIGS. 8A, 9, 10A, 10B and 10C, or 11A, 11B and 11C and 12D causes the high voltage across the EOM 140 to drop to zero as illustrated by FIGS. 12E. This causes the radiation stored within the resonator to be dumped out of the resonator, as shown in FIG. 12G, by the TFP 404 of FIG. 5 in a equal to approximately the optical round trip time within the optical resonator (i.e. typically 10 to 20 nsec). This causes the radiation within the resonator to drop essentially to zero at time "$t_d$" since the RF excitation pulse is also terminated at approximately time "$t_c$." This process can be repeated by again turning on the super pulse at time "$t_e$" as in FIG. 12A, etc to achieve the desired repetition rate. Pulse repetition rates upto and exceeding 100 kHz can be obtained.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A Q-switched, cavity dumped $CO_2$ laser system comprising:
   a plurality of mirrors defining an optical cavity;
   a gain medium positioned within the optical cavity for generating laser beam radiation;
   Q-switch within the optical cavity and including an optical crystal and operative to create a high loss state in the cavity when zero voltage is applied to the crystal and a low loss state when a prescribed non-zero voltage is applied to the crystal;
   a pulsed signal generation system connected to the Q-switch for delivering pulsed signals to the Q-switch thereby controlling the state of optical loss within the optical cavity;
   a time delay circuit for detecting a portion of the laser beam radiation and generating a timing signal in response thereto and
   a laser beam output coupler providing cavity dumping by directing laser energy out of the optical cavity when the optical cavity is in a high optical loss condition whereby in operation, the Q-switch is set to create a high loss state during which time the gain in the gain medium increases and thereafter the Q-switch is set to create a low loss state during which time the optical intensity in the cavity is increased depleting the gain in the gain medium to create a high peak power Q-switched pulse and thereafter the Q-switch is set to a create high loss state so that the Q-switched pulse is coupled out of the cavity and with the length of the Q-switched pulse coupled out of the cavity being controlled by said time delay circuit which supplies timing signals to said pulsed signal generation system.

2. The laser system as set forth in claim 1 further comprising:
   a polarization rotator receptive of the laser pulses directed Out of the optical cavity and operative to rotate the state of polarization of the laser beam; and
   an amplifier receptive of the laser pulses from the polarization rotator for amplifying the laser pulses.

3. The laser system as set forth in claim 2 further comprising a reflective device receptive of the laser pulses directed out of the optical cavity and operative to direct said laser pulses to the polarization rotator.

4. The laser system as set forth in claim 2 further comprising a heat exchanger positioned between the gain medium and the amplifier for conducting heat away from the gain medium and the amplifier.

5. The laser system as set forth in claim 1 wherein the time delay circuit comprises:
   a detector receptive of the portion of the laser beam providing thereby an output signal indicative of the laser pulses;
   a bias circuit providing as output a reference signal;
   a comparator for comparing the output signal of the detector with the reference signal providing thereby an output signal indicative of the greater or lesser of the detector output signal or the reference signal; and
   a first timing device receptive of the comparator output signal and operative to provide a command signal to the pulsed signal generation system for controlling the duration of the pulsed signals delivered to the cavity loss modulator Q-switch.

6. The laser system as set forth in claim 5 further comprising a signal amplifier receptive of the detector output signal providing thereby an amplified detector output signal to the comparator.

7. The laser system as set forth in claim 5 wherein the bias circuit comprises a DC voltage.

8. The laser system as set forth in claim 7 wherein the bias circuit further comprises:
   a signal generator generating a ramp signal;
   a summing device for summing the ramp signal and the DC voltage.

9. The laser system as set forth in claim 8 further comprising a second timing device receptive of a signal commanding the laser to emit a pulse and operative to provide as output:
   a first signal to generate the ramp signal;
   a second signal to energize the cavity loss modulator Q-switch; and
   a default signal directed to the first timing device to deenergize the Q-switch in the event that the command signal from the first timing device is not generated when the output signal of the detector indicative of the laser pulses is greater than or equal to the reference signal.

10. The laser system as set forth in claim 1 further comprising a system for automatically terminating the generation of the laser beam including:
   a first polarizing device receptive of the laser beam in a first state of polarization and operative to pass the laser beam in the first state of polarization;
   a polarization rotator receptive of the laser beam from the first polarizing device in the first state of polarization and operative to change the polarization of the laser beam to a second state of polarization and further operative to direct the laser beam to a workpiece;
   wherein the polarization rotator is receptive of the laser beam reflected from the work piece in the second state of polarization and operative thereby to change the state of polarization of the laser beam to a third state of polarization; and
   wherein the first polarization device is receptive of the laser beam from the polarization rotator in the third state of polarization;
   a detector receptive of the laser beam from the first polarizing device providing thereby an output signal indicative of the reflectance of the work piece; and
   a comparator for comparing the output signal of the detector with a reference signal, providing thereby an output signal indicative of the greater or lesser of the detector output signal or the reference signal.

11. The laser system as set forth in claim 10 further comprising a bias circuit for setting the value of the reference signal.

12. The laser system as set forth in claim 10 further comprising a lens for focusing the laser beam from the polarization rotator in the first state of polarization to the work piece and receptive of the laser beam reflected from the work piece.

13. The laser system as set forth in claim 10 further comprising a signal amplifier receptive of the detector output signal and providing thereby an amplified detector output signal.

14. The laser system as set forth in claim 10 further comprising a logic circuit receptive of the comparator output signal for controlling the laser.

15. The laser system as set forth in claim 14 wherein the logic circuit comprises:
    a signal inverter for inverting the comparator output signal; and
    a logical AND gate receptive of the inverted comparator signal and the command pulse providing thereby an output stop signal to the pulsed signal generation system.

16. The laser system as set forth in claim 10 further comprising a second polarizing device receptive of the laser beam from the first polarizing device in the first state of polarization and operative to pass the laser beam in the first state of polarization and further receptive of the laser beam from the polarization rotator in the third state of polarization and further operative thereby to reflect polarization components of the laser beam in the third state of polarization to the detector;
    wherein the second polarizing device is rotatable with respect to the first polarizing device to attenuate the laser beam.

17. The laser system as set forth in claim 1 wherein the pulsed signal generation system comprises:
    a pulse receiver;
    a switching circuit receptive of pulsed signals from, the pulse receiver operative thereby to charge or discharge the Q-switch
    and
    a power supply for the pulse receiver and the switching circuit.

18. The laser system as set forth in claim 17 wherein the power supply comprises:
    a power converter connected to the switching circuit and receptive of a constant voltage input signal providing thereby a high voltage output signal to the switching circuit;
    a power supply controller for controlling the power converter and receptive of a low voltage set point signal;
    a voltage divider connected to the power converter at the high voltage output signal and to the power controller at the divided voltage and operative thereby to minimize the difference between the high voltage output signal and the low voltage set point.

19. The laser system as set forth in claim 17 wherein the switching circuit comprises:
    a first switch connected to the power supply and to the Q-switch receptive of a first pulsed signal from the pulse receiver and operative thereby to charge the Q-switch when the first switch is in the closed position;
    a second switch connected across the Q-switch and receptive of a second pulsed signal from the pulse clipping circuit and operative thereby to discharge the Q-switch when the second switch is in the closed position.

20. The laser system as set forth in claim 19 further including an impedance connected to the first and second switch and the Q-switch.

21. The laser system as set forth in claim 20 further comprising an amplifier-control circuit for amplifying and controlling the first and second pulsed signals to the first and second switch.

22. The laser system as set forth in claim 19 wherein the first and second switches comprise a metal oxide semiconductor field effect transistor connected to a transformer.

23. The laser system as set forth in claim 22 further comprising an impedance connected across the first and second switches.

24. The laser system as set forth in claim 1 further comprising a phase grating receptive of the laser beam and operative to diffract a portion of the laser beam away from the laser beam at a prescribed optical diffraction order.

25. The laser system as set forth in claim 24 wherein the phase grating comprises an acousto-optic cell connected to a signal generator receptive of a pulsed signal from a control unit and operative to generate an acoustically variable phase grating in the acousto-optic cell.

26. The laser system as set forth in claim 25 further comprising a signal delay device receptive of the pulsed signal from the control unit providing a delayed signal to the pulsed signal generation system for synchronizing the acoustically variable phase grating and the laser pulses.

27. The laser system as set forth in claim 1 wherein the mirrors are substantially one hundred percent reflecting mirrors.

28. The laser system as set forth in claim 27 further comprising:
    a first polarizing device positioned within the optical cavity and receptive of the laser beam for polarizing the laser beam; and
    a polarization rotator positioned within the optical cavity and receptive of the laser beam for changing the polarization of the laser beam.

29. The laser system as set forth in claim 28 wherein the polarization rotator is operative to change the polarization of the laser beam from a first state of polarization to a second state of polarization and from the second state of polarization to a third state of polarization.

30. The laser system as set forth in claim 29 wherein the polarization rotator is operative to change the polarization of the laser beam from a first state of polarization to a second state of polarization and from the second state of polarization to a third state of polarization when no pulsed signals are delivered to the Q-switch by the pulsed signal generation system.

31. The laser system as set forth in claim 29 wherein the polarization rotator is operative to change the polarization of the laser beam from the third state of polarization to the second state of polarization when a non-zero pulsed signal is delivered to the Q-switch by the pulsed signal generation system.

32. The laser system as set forth in claim 28 wherein the first polarizing device is a thin film polarizer operative to allow passage of the laser beam therethrough in a first direction within the optical cavity when in the first state of polarization and to reflect the laser beam in a second direction within the optical cavity when in the third state of polarization when the optical cavity is in a high optical loss condition and further operative to allow passage of the laser beam therethrough in the first and second direction within the optical cavity when the optical cavity is in a low optical loss condition.

33. The laser system as set forth in claim 28 wherein the polarization rotator is a quarter wave plate.

34. The laser system as set forth in claim 28 wherein the polarization rotator is a reflective phase retarder.

35. The laser system as set forth in claim 1 wherein the optical crystal of the Q-switch has an entrance surface receptive of the laser beam and an opposing laser beam exit surface, and wherein the Q-switch further includes:

a first optical window having an optical entrance surface receptive of the laser beam and an opposing laser beam exit surface, the exit surface of the first optical window being in physical contact with the entrance surface of the optical crystal thereby defining a first optical interface; and an optical reflector in physical contact with the laser beam exit surface of the optical crystal thereby defining a second optical interface, the optical reflector receptive of the laser beam from the optical crystal and operative to redirect the laser beam into the optical crystal.

36. The laser system as set forth in claim 35 wherein the optical reflector comprises a prism.

37. The laser system as set forth in claim 35 wherein the optical reflector comprises a second optical window having an optical entrance surface receptive of the laser beam and an opposing reflective surface, the entrance surface of the second optical window being in physical contact with the exit surface of the active optical crystal thereby defining a second optical interface.

38. The laser system as set forth in claim 37 wherein the reflective surface comprises a reflecting thin film coating.

39. The laser system as set forth in claim 1 wherein the optical cavity includes a multiple pass optical assembly for directing the laser beam through the Q-switch multiple times.

40. The laser system as set forth in claim 39 wherein the multiple pass optical assembly comprises:

a first reflective device positioned within the optical cavity and receptive of the laser beam from the Q-switch and operative to redirect the laser beam into the Q-switch; and a second reflective device positioned within the optical cavity and receptive of the laser beam from the Q-switch and an optical cavity mirror and operative to redirect the laser beam into the Q-switch.

41. The laser system as set forth in claim 40 further comprising:

a first polarizing device positioned within the cavity for polarizing the laser beam; and a second polarizing device positioned within the cavity for changing the polarization of the laser beam.

42. The laser system as set forth in claim 41 wherein the first polarizing device is a thin film polarizer.

43. The laser system as set forth in claim 41 wherein the second polarizing device is a reflective phase retarder.

44. The laser system as set forth in claim 40 wherein the first reflective device is a reflecting thin film or a prism.

45. The laser system as set forth in claim 40 wherein the second reflective device is a mirror.

* * * * *